US012378264B2

(12) United States Patent
Eldred et al.

(10) Patent No.: US 12,378,264 B2
(45) Date of Patent: Aug. 5, 2025

(54) MULTIFUNCTIONAL ORGANOSILICON COMPOUND AND RELATED METHODS, COMPOUNDS, AND COMPOSITIONS

(71) Applicant: Dow Silicones Corporation, Midland, MI (US)

(72) Inventors: Donald Eldred, Midland, MI (US); Matthew Jeletic, Midland, MI (US); Eric Joffre, Midland, MI (US); Nanguo Liu, Midland, MI (US); Cameron Kadleck, Midland, MI (US); Matthew Olsen, Midland, MI (US); John Roberts, Midland, MI (US); Nick E. Shephard, Midland, MI (US); Ryan Thomas, Midland, MI (US); Zachary Wenzlick, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 1074 days.

(21) Appl. No.: 17/418,998

(22) PCT Filed: Dec. 30, 2019

(86) PCT No.: PCT/US2019/068969
§ 371 (c)(1),
(2) Date: Jun. 28, 2021

(87) PCT Pub. No.: WO2020/142443
PCT Pub. Date: Jul. 9, 2020

(65) Prior Publication Data
US 2022/0098222 A1   Mar. 31, 2022

Related U.S. Application Data

(60) Provisional application No. 62/786,893, filed on Dec. 31, 2018.

(51) Int. Cl.
*C08G 77/12* (2006.01)
*C07F 7/08* (2006.01)
*C09J 133/10* (2006.01)

(52) U.S. Cl.
CPC ........... *C07F 7/0838* (2013.01); *C09J 133/10* (2013.01)

(58) Field of Classification Search
CPC ........ C07F 7/0838; C08G 77/12; C08G 77/20
See application file for complete search history.

(56) References Cited

U.S. PATENT DOCUMENTS

| | | | |
|---|---|---|---|
| 3,799,962 A | 3/1974 | Lewis | |
| 4,082,726 A * | 4/1978 | Mine | C08K 5/54 528/33 |
| 4,742,177 A | 5/1988 | Yamamoto et al. | |
| 5,484,950 A | 1/1996 | Crivello | |
| 5,614,640 A * | 3/1997 | Okawa | C07F 7/0838 549/215 |
| 6,013,753 A | 1/2000 | Krahnke et al. | |
| 6,127,502 A | 10/2000 | Krahnke et al. | |
| 6,265,518 B1 | 7/2001 | Krahnke et al. | |
| 6,265,598 B1 | 7/2001 | Kimura et al. | |
| 6,420,504 B1 * | 7/2002 | Yoshitake | C08G 77/485 528/33 |
| 6,495,708 B1 | 12/2002 | Yang et al. | |
| 2002/0099232 A1 | 7/2002 | Ozai et al. | |
| 2006/0074212 A1 | 4/2006 | Chapman et al. | |
| 2012/0177402 A1 | 7/2012 | Taniguchi et al. | |
| 2015/0252125 A1 | 9/2015 | Moro et al. | |

FOREIGN PATENT DOCUMENTS

| | | |
|---|---|---|
| CN | 105278239 A | 1/2016 |
| CN | 105297446 A | 2/2016 |
| EP | 0733637 A1 | 9/1996 |
| JP | S51-137798 A | 11/1976 |
| JP | H08208993 A | 8/1996 |
| JP | H1180315 A | 3/1999 |
| JP | H11080169 A | 3/1999 |

(Continued)

OTHER PUBLICATIONS

International Search Report for PCT/US2019/068969 dated Mar. 17, 2020, 5 pages.
Scheim, U., et al. "Zur synthese von siloxanen: III. Induktive substituetenkonstanten für siloxyreste; 29Si-NMR-spektroskopische untersuchungen." Journal of Organometallic Chemistry 312.1 (1986): 27-31.
Popowski, Von E., N. Holst, and H. Kelling. "Darstellung und IR-spektroskopische Untersuchungen von Siloxysilanolen." Zeitschrift für anorganische und allgemeine Chemie 494.1 (1982): 166-178.
Cai, Lu, et al. "Synthesis of novel polymethacrylates with siloxyl bridging perfluoroalkyl side-chains for hydrophobic application on cotton fabrics." Applied Surface Science 371 (2016): 453-467.
Lee, Youngjun, et al. "Highly efficient iridium-catalyzed oxidation of organosilanes to silanols." The Journal of organic chemistry 69.5 (2004): 1741-1743.

(Continued)

*Primary Examiner* — Margaret G Moore
(74) *Attorney, Agent, or Firm* — Warner Norcross + Judd LLP

(57) ABSTRACT

A multifunctional organosilicon compound is provided which has the general formula $XSi([OSiR_2]_p\text{-}O\text{-}SiR_2Y)_a(R^1)_{3-a}$— In the formula, X is selected from H and ethylenically unsaturated moieties; each Y independently comprises a functional moiety selected from alkoxysilyl moieties, acryloxy moieties, and epoxide moieties; each R is an independently selected hydrocarbyl group; each R1 is an independently selected hydrocarbyl group; subscript a is 1, 2, or 3; and each subscript b is independently 0, 1, or 2. A method of preparing the multifunctional organosilicon compound is also provided. The method comprises reacting (A) an organosilanol compound and (B) a silane compound having at least two hydrolysable groups. A functionalized siloxane compound prepared from the multifunctional organosilicon compound, a method of preparing the functionalized siloxane compound, and an adhesive comprising the functionalized siloxane compound are also provided.

20 Claims, No Drawings

(56) References Cited

FOREIGN PATENT DOCUMENTS

| | | |
|---|---|---|
| JP | H11158232 A | 6/1999 |
| JP | 2000169482 A | 6/2000 |
| JP | 2000212190 A | 8/2000 |
| JP | 2002128790 A | 5/2002 |
| JP | 2006002035 A | 1/2006 |
| JP | 2008070761 A | 3/2008 |
| JP | 2012121950 A | 6/2012 |
| JP | 2013185066 A | 9/2013 |
| JP | 2016150906 A | 8/2016 |
| JP | 2018070683 A | 5/2018 |
| RU | 2277106 C1 | 5/2006 |
| WO | 2008088523 A1 | 7/2008 |
| WO | 2012046863 A1 | 4/2012 |
| WO | 2017100106 A1 | 6/2017 |
| WO | 2018004797 A1 | 1/2018 |

OTHER PUBLICATIONS

Li, Yuning, and Yusuke Kawakami. "Catalytic cross-dehydrocoupling polymerization of 1, 4-bis (dimethylsilyl) benzene with water. A new approach to poly [(oxydimethylsilylene)(1, 4-phenylene)(dimethylsilylene)]." Macromolecules 32.10 (1999): 3540-3542.
Teo, Alan Kay Liang, and Wai Yip Fan. "Catalytic hydrogen evolution from hydrolytic oxidation of organosilanes with silver nitrate catalyst." RSC advances 4.71 (2014): 37645-37648.
Seino, Makoto, Ichiro Imae, and Yusuke Kawakami. "Catalytic cross-dehydrocoupling polymerization of phenylsilane with water. A new approach to poly (phenylsilsesquioxane)." Polymer journal 35.2 (2003): 197-202.
Tan, Sze Tat, Jun Wei Kee, and Wai Yip Fan. "Catalytic hydrogen generation from the hydrolysis of silanes by ruthenium complexes." Organometallics 30.15 (2011): 4008-4013.
Lickiss, Paul D. "The synthesis and structure of organosilanols." Advances in Inorganic Chemistry 42 (1995): 147-262.
Lee, Myunghee, Sangwon Ko, and Sukbok Chang. "Highly selective and practical hydrolytic oxidation of organosilanes to silanols catalyzed by a ruthenium complex." Journal of the American Chemical Society 122.48 (2000): 12011-12012.
Yu, Mengmeng, Huize Jing, and Xuefeng Fu. "Highly efficient generation of hydrogen from the hydrolysis of silanes catalyzed by [RhCl(CO)2]2." Inorganic chemistry 52.19 (2013): 10741-10743.
Database Caplus [Online] Chemical Abstracts Services, Columbus, Ohio, US; 1960, XP002798068, retrieved from STN Database Accession No. 1960:6433, 1 page.
Database Caplus [Online] Chemical Abstracts Services, Columbus, Ohio, US; 1982, XP002798069, retrieved from STN Database Accession No. 1982:181341, 1 page.
Database Caplus [Online] Chemical Abstracts Services, Columbus, Ohio, US; 1973, XP002798070, retrieved from STN Database Accession No. 1973:492376, 4 pages.
Database Caplus [Online] Chemical Abstracts Services, Columbus, Ohio, US; 2000, XP002798071, retrieved from STN Database Accession No. 2000:842144, 2 pages.
Database Caplus [Online] Chemical Abstracts Services, Columbus, Ohio, US; 2004, XP002798072, retrieved from STN Database Accession No. 2004:37123, 1 page.
Database Caplus [Online] Chemical Abstracts Services, Columbus, Ohio, US; 2016, XP002798073, retrieved from STN Database Accession No. 2016:1372030, 2 pages.
Machine assisted English translation of JPH1180315A obtained from https://patents.google.com/patent on Sep. 28, 2021, 8 pages.
Machine assisted English translation of JPH11158232A obtained from https://patents.google.com/patent on Sep. 28, 2021, 10 pages.
Machine assisted English translation of RU2277106C1 obtained from https://patents.google.com/patent on Sep. 28, 2021, 8 pages.
Machine assisted English translation of JP2013185066A obtained from https://patents.google.com/patent on Sep. 28, 2021, 10 pages.
Machine assisted English translation of JP2012121950A obtained from https://patents.google.com/patent on Sep. 28, 2021, 10 pages.
Machine assisted English translation of JP2008070761A obtained from https://patents.google.com/patent on Sep. 28, 2021, 11 pages.
Chang, Zhixiang et al., "Stepwise synthesis of siloxane chains", ChemComm, 2003.
Barton, Thomas J. et al., "Comments on the Formation of Silanones in the Thermolysis of Hydridosilyl Peroxides", Organometallics 1982, 1, 721-725.
Machine assisted English translation of JP2000169482A obtained from https://worldwide.espacenet.com/patent on Jan. 4, 2024, 10 pages.
Machine assisted English translation of JP2016150906A obtained from https://worldwide.espacenet. com/patent on Jan. 4, 2024, 15 pages.
Izvestiya Akademii Nauk SSSR, Seriya Khimicheskaya, 1959, pp. 1041-1048.
Chemical Communications (Cambridge, United Kingdom), 2004, (2), pp. 206-207.
Russian Journal of General Chemistry, 2007, 77(1), pp. 55-61.
Chemistry—A European Journal, 2012, 18(32), pp. 9789-9792, Supporting Information S5-6.
Khananashvili, Lotari M. et al., Synthesis of Epoxycontaining Siliconorganic Compounds, International Journal of Polymeric Materials, 1995, 28(1-4), pp. 43-49.
Machine assisted English translation of JPH1180169A obtained from https://worldwide.espacenet.com/patent on Jan. 22, 2024, 12 pages.
Machine assisted English translation of JPS51137798A obtained from https://worldwide.espacenet.com/patent on Jan. 22, 2024, 5 pages.
Machine assisted English translation of JPH08208993A obtained from https://worldwide.espacenet.com/patent on Jan. 22, 2024, 7 pages.
Machine assisted English translation of JP2018070683A obtained from https://worldwide.espacenet. com/patent on Jan. 22, 2024, 26 pages.
Machine assisted English translation of JP2006002035A obtained from https://worldwide.espacenet.com/patent on Jan. 22, 2024, 19 pages.
Machine assisted English translation of CN105278239A obtained from https://worldwide.espacenet.com/patent on May 4, 2023, 9 pages.
Machine assisted English translation of CN105297446A obtained from https://worldwide.espacenet.com/patent on May 4, 2023, 15 pages.

* cited by examiner

MULTIFUNCTIONAL ORGANOSILICON COMPOUND AND RELATED METHODS, COMPOUNDS, AND COMPOSITIONS

CROSS-REFERENCE TO RELATED APPLICATIONS

This application is the U.S. National Stage of International Application No. PCT/US2019/068969 filed on 30 Dec. 2019, which claims priority to and all advantages of U.S. Provisional Patent Application No. 62/786,893 filed on 31 Dec. 2018, the content of which is incorporated herein by reference.

FIELD OF THE INVENTION

The present invention generally relates to organosilicon compounds and, more specifically, to a multifunctional organosilicon compound, a functionalized siloxane prepared therewith, and methods of preparing and using the same.

DESCRIPTION OF THE RELATED ART

Organosilicon materials are known in the art and are utilized in myriad end use applications and environments. For example, organopolysiloxanes are utilized in numerous industrial, home care, and personal care formulations. Increasingly, hybrid materials having both silicone and organic functionality are utilized in such formulations, as such hybrid materials may exhibit combined benefits traditionally associated with only silicone materials or organic materials. However, many methods of preparing hybrid materials require functional organosilicon compounds, which are often difficult to synthesize and/or utilize. Moreover, many conventional organosilicon materials have limited functionality that can be exploited in the preparation of hybrid materials. In particular, traditional methods of preparing certain functional organosilicon compounds are often incompatible with many silicone materials (e.g. via promoting silicone rearrangements, unselective reactions, degradation, hydrolysis of functional groups, etc.), resulting in decreased yields and purities, and limiting general applicability of such methods.

BRIEF SUMMARY

A multifunctional organosilicon compound is provided. The multifunctional organosilicon compound has following general formula:

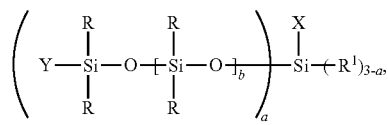

where X is selected from H and ethylenically unsaturated moieties; each Y independently comprises a functional moiety selected from alkoxysilyl moieties, acryloxy moieties, and epoxide moieties; each R is an independently selected hydrocarbyl group; each $R^1$ is an independently selected hydrocarbyl group; subscript a is 1, 2 or 3; and each subscript b is independently 0, 1, or 2. A method of preparing the multifunctional organosilicon compound (the "preparation method") is also provided. The preparation method comprises reacting (A) an organosilanol compound and (B) a silane compound having at least two hydrolysable groups, thereby preparing the multifunctional organosilicon compound.

A functionalized siloxane compound is also provided. The functionalized siloxane compound has the following general formula:

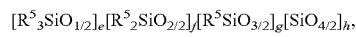

where subscripts e, f, g, and h are each mole fractions such that e+f+g+h=1, with the proviso that e+f+g>0; each $R^5$ is independently selected from substituted or unsubstituted hydrocarbyl groups and A, with the proviso that at least one $R^5$ is A; wherein each A is independently of the following formula:

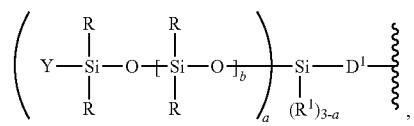

where each Y is independently selected from alkoxysilane moieties, acryloxy moieties, and epoxide moieties; each R is an independently selected hydrocarbyl group; each $R^1$ is an independently selected hydrocarbyl group; $D^1$ is a divalent linking group; subscript a is 1, 2, or 3; and each subscript b is independently 0, 1, or 2.

A method of preparing the functionalized siloxane compound (the "second preparation method" or "second method") is also provided. The second method includes reacting the multifunctional organosilicon compound and a polysiloxane in the presence of a hydrosilylation catalyst, thereby preparing the preparing the functionalized siloxane compound.

An adhesive comprising the functionalized siloxane compound is also provided.

DETAILED DESCRIPTION OF THE INVENTION

A multifunctional organosilicon compound has following general formula:

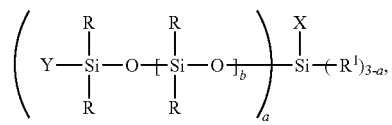

where X is selected from H and ethylenically unsaturated moieties; each Y independently comprises a functional moiety selected from alkoxysilyl moieties, acryloxy moieties, and epoxide moieties; each R is an independently selected hydrocarbyl group; each $R^1$ is an independently selected hydrocarbyl group; subscript a is 1, 2, or 3; and each subscript b is independently 0, 1, or 2.

Each R of the multifunctional organosilicon compound is an independently selected hydrocarbyl group. Suitable hydrocarbyl groups may be substituted or unsubstituted. With regard to such hydrocarbyl groups, the term "substituted" describes hydrocarbon moieties where either one or more hydrogen atoms is replaced with atoms other than hydrogen (e.g. a halogen atom, such as chlorine, fluorine, bromine, etc.), a carbon atom within a chain of the hydrocarbon is replaced with an atom other than carbon (i.e., R includes one or more heteroatoms (oxygen, sulfur, nitrogen, etc.) within the chain, or both. As such, it will be appreciated that R includes hydrocarbon moieties that may have substituents in and/or on (i.e., appended to and/or integral with) carbon chains/backbones thereof, such that R may comprise or be an ether, etc.

In general, hydrocarbyl groups suitable for R may independently be linear, branched, cyclic, or combinations thereof. Cyclic hydrocarbyl groups encompass aryl groups as well as saturated or non-conjugated cyclic groups. Cyclic hydrocarbyl groups may independently be monocyclic or polycyclic. Linear and branched hydrocarbyl groups may independently be saturated or unsaturated. One example of a combination of a linear and cyclic hydrocarbyl group is an aralkyl group. General examples of hydrocarbyls include alkyl groups, aryl groups, alkenyl groups, halocarbon groups, and the like, as well as derivatives, modifications, and combinations thereof. Examples of suitable alkyl groups include methyl, ethyl, propyl (e.g. iso-propyl and/or n-propyl), butyl (e.g. isobutyl, n-butyl, tert-butyl, and/or sec-butyl), pentyl (e.g., isopentyl, neopentyl, and/or tert-pentyl), hexyl, as well as branched saturated hydrocarbon groups having from 6 to 18 carbon atoms. Examples of suitable aryl groups include phenyl, tolyl, xylyl, naphthyl, benzyl, and dimethyl phenyl. Examples of suitable alkenyl groups include vinyl, allyl, propenyl, isopropenyl, butenyl, isobutenyl, pentenyl, heptenyl, hexenyl, and cyclohexenyl groups. Examples of suitable monovalent halogenated hydrocarbon groups (i.e., halocarbon groups) include halogenated alkyl groups, aryl groups, and combinations thereof. Examples of halogenated alkyl groups include the alkyl groups described above where one or more hydrogen atoms is replaced with a halogen atom such as F or Cl. Specific examples of halogenated alkyl groups include fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl groups, as well as derivatives thereof. Examples of halogenated aryl groups include the aryl groups described above where one or more hydrogen atoms is replaced with a halogen atom, such as F or Cl. Specific examples of halogenated aryl groups include chlorobenzyl and fluorobenzyl groups.

Each R may be the same or different from any other R in the multifunctional organosilicon compound. In certain embodiments, each R is the same. In other embodiments, at least one R is different than at least one other R of the multifunctional organosilicon compound. Typically, each R is independently selected from alkyl groups, such as methyl groups, ethyl groups, etc. In certain embodiments, each R is methyl.

Each $R^1$ of the multifunctional organosilicon compound, where present (i.e., where subscript a is 1 or 2, as described further below), is independently selected from hydrocarbyl groups. Suitable hydrocarbyl groups may be substituted or unsubstituted, and are exemplified by the hydrocarbyl groups described above with respect to R. As such, each $R^1$ may be the same as any R, or each R, in the multifunctional organosilicon compound. However, in certain embodiments, each $R^1$ is different than at least one, alternatively each, R in multifunctional organosilicon compound. Likewise, each $R^1$ may be the same or different from any other $R^1$ in the multifunctional organosilicon compound. In certain embodiments, each $R^1$ is the same. In other embodiments, at least one $R^1$ is different than at least one other $R^1$ of the multifunctional organosilicon compound. Typically, $R^1$ is selected from alkyl groups, such as methyl groups, ethyl groups, etc. For example, in certain embodiments, $R^1$ is methyl. However, aryl, alkaryl, and other types of $R^1$ may also be utilized. Additionally, $R^1$ may be substituted, as described above, internally, terminally, and/or pendantly with respect to the hydrocarbon chain of the hydrocarbyl group selected.

In general, X of the multifunctional organosilicon compound is a hydrosilylatable moiety selected from H (i.e., a silicon-bonded hydrogen atom) and ethylenically unsaturated moieties. As such, in certain embodiments, X is H. In other embodiments, X is an ethylenically unsaturated moiety. Examples of ethylenically unsaturated groups generally include substituted or unsubstituted hydrocarbon groups having at least one alkene or alkyne functional group. For example, in certain embodiments, X comprises, alternatively is, an alkenyl group or an alkynyl group. Specific examples thereof include $H_2C=CH—$, $H_2C=CHCH_2—$, $H_2C=CHCH_2CH_2—$, $H_2C=CH(CH_2)_3—$, $H_2C=CH(CH_2)_4—$, $H_2C=C(CH_3)—$, $H_2C=C(CH_3)CH_2—$, $H_2C=C(CH_3)CH_2CH_2—$, $H_2C=C(CH_3)CH_2CH(CH_3)—$, $H_2C=C(CH_3)CH(CH_3)CH_2—$, $H_2C=C(CH_3)C(CH_3)_2—$, $HC\equiv C—$, $HC\equiv CCH_2—$, $HC\equiv CCH(CH_3)—$, $HC\equiv CC(CH_3)_2—$, and $HC\equiv CC(CH_3)_2CH_2—$. In certain embodiments, X comprises, alternatively is, an alkenyl moiety having the formula $—(CH_2)_nCHCH_2$, where subscript n is from 0 to 4.

In certain embodiments, X is an ethylenically unsaturated moiety having the general formula $-[D^2]_i-R^6$, where each $D^2$ is an independently selected divalent group; subscript i is 0 or from 1 to 10; and $R^6$ is an alkenyl group or alkyl group, such as one of the alkenyl group or alkyl groups described above. In some such embodiments, $R^6$ is an alkenyl group of formula $—(R^7)CCH_2$, where $R^7$ is a hydrocarbyl group having from 1 to 6 carbon atoms, an alkoxy group, a silyl group, or H. In some such embodiments, $R^7$ is H or $—CH_3$. In these or other embodiments, subscript $i \geq 1$ and $D^2$ is selected from substituted and unsubstituted hydrocarbon groups, siloxane groups, silyl groups, and combinations thereof. In specific embodiments, subscript i is 1 and $D^2$ comprises a moiety having the general formula $—(CH_2)_j$, where $1 \leq j \leq 10$.

Each Y of the multifunctional organosilicon compound generally comprises a functional moiety selected from alkoxysilyl moieties, acryloxy moieties, and epoxide moieties. Said differently, each functional moiety Y comprises at least one independently selected alkoxysilyl, epoxide, or acryloxy substituent, as described in further detail below. The multifunctional organosilicon compound comprises one, two, or three functional moieties Y (i.e., where subscript a is 1, 2, or 3, respectively, as described below), which are each independently selected. As such, where two or more functional moieties Y are present, each Y may be the same or different from any other Y in the multifunctional organosilicon compound. In certain embodiments, each Y is the same. In other embodiments, at least one Y is different than at least one other Y of the multifunctional organosilicon compound. In particular embodiments, each Y of the multifunctional organosilicon compound is different from each other Y. Regardless, as the multifunctional organosilicon compound comprises two or three functional moieties Y in various embodiments, reference herein to the singular "functional moiety Y" or simply "Y" with respect to the multifunctional organosilicon compound is to be understood as referring to each Y, collectively, in the Y the multifunctional organosilicon compound (i.e., each of the two or three functional moieties Y where two or three functional moieties Y are present).

The alkoxysilyl, epoxide, or acryloxy substituent of the functional moiety Y may be bonded directly (e.g. via covalent bond) or indirectly (e.g. via divalent linking group) to the silicon atom shown in the general formula of the multifunctional organosilicon compound above (i.e., the siloxane backbone of the multifunctional organosilicon compound). In certain embodiments, the alkoxysilyl, epoxide, or acryloxy substituent of the functional moiety Y is bonded directly to the siloxane backbone of the multifunctional organosilicon compound, such that Y itself represents an alkoxysilyl, epoxide, or acryloxy group, as described below.

In some embodiments, each functional moiety Y has the formula -D-$R^2$, where D is a divalent linking group and $R^2$ comprises an alkoxysilyl group, an acryloxy group, or an epoxide group, as described in further detail below.

In such embodiments, each D is an independently selected divalent linking group, which may be linear or branched and substituted or unsubstituted. Typically, each D is selected from divalent substituted or unsubstituted hydrocarbon groups. For example, in some embodiments, at least one D comprises a hydrocarbon moiety having the formula —$(CH_2)_m$—, where subscript m is from 1 to 16, alternatively from 1 to 6. In these or other embodiments, at least one D may comprise a substituted hydrocarbon, i.e., a hydrocarbon group comprising a backbone having at least one heteroatom (e.g. O, N, S, etc.). For example, in some embodiments, at least one D is a hydrocarbon having a backbone comprising an ether moiety. Each D may be the same or different from any other D in the multifunctional organosilicon compound (e.g. each functional moiety Y may comprise the same or different D as any other functional moiety Y). In certain embodiments, each D is the same. In other embodiments, at least one D is different than at least one other D of the multifunctional organosilicon compound.

In general, each $R^2$ is independently selected from alkoxysilyl groups, acryloxy groups, and epoxide groups. These groups are not particularly limited, and are exemplified by the general and specific examples below. As such, alternative alkoxysilyl groups, acryloxy groups, and/or epoxide groups will be readily envisaged by one of skill in the art in view of the description herein. Each $R^2$ may be the same or different from any other $R^2$ in the multifunctional organosilicon compound (e.g. each functional moiety Y may comprise the same or different $R^2$ as any other functional moiety Y). In certain embodiments, each $R^2$ is the same. In other embodiments, at least one $R^2$ is different than at least one other $R^2$ of the multifunctional organosilicon compound. In specific embodiments, the multifunctional organosilicon compound comprises at least two, alternatively three, different $R^2$ substituents. Regardless, as the multifunctional organosilicon compound comprises two or three functional moieties Y, which may each have the formula -D-$R^2$, reference herein to $R^2$ in the singular form may apply to but one $R^2$ or to each $R^2$ in the multifunctional organosilicon compound (i.e., in each of the two or three functional moieties Y).

In certain embodiments, $R^2$ is an alkoxysilyl group of the formula:

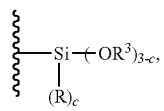

where each $R^3$ is an independently selected hydrocarbyl group, subscript c is 0, 1, or 2, and R is as defined above. In such embodiments, each $R^3$ may be the same or different from any other $R^3$ in the alkoxysilyl group. Examples of hydrocarbyl groups suitable for $R^3$ include those described with respect to R above. Typically, each $R^3$ is independently selected from alkyl groups, such as methyl groups, ethyl groups, etc. In certain embodiments, each $R^3$ is methyl. In other embodiments, each $R^3$ is ethyl.

Subscript c is 0, 1, or 2, such that the alkoxysilyl group may be defined as a tri alkoxysilyl, dialkoxyalkylsilyl, or alkoxyldialkylsilyl group, respectively. Typically, subscript c is 0 or 1, such that the alkoxysilyl group comprises at least two alkoxy groups. In specific embodiments, subscript c is 0 and each $R^3$ is methyl, such that $R^2$ is a trimethoxysilyl group (e.g. is of formula —$Si(OCH_3)_3$). In other embodiments, subscript c is 0 and each $R^3$ is ethyl, such that $R^2$ is a triethoxysilyl group (e.g. is of formula —$Si(OCH_2CH_3)_3$).

In some embodiments, $R^2$ of at least one moiety Y is an epoxide group. The epoxide group is not particular limited, and may be any group comprising an epoxide (e.g. a two carbon three-atom cyclic ether). For example, $R^2$ may be a cyclic epoxide or a linear epoxide. As understood by those of skill in the art, epoxides (e.g. epoxide groups) are generally described in terms of the carbon skeleton the two epoxide carbons compose (e.g. the epoxyalkane derived from epoxidation of an alkene). For example, linear epoxides generally comprise a linear hydrocarbon comprising two adjacent carbon atoms bonded to the same oxygen atom. Similarly, cyclic epoxides generally comprise cyclic hydrocarbon comprising two adjacent carbon atoms bonded to the same oxygen atom, where at least one, but typically both, adjacent carbon atom is in the ring of the cyclic structure (i.e., is part of both the epoxide ring and the hydrocarbon ring). The epoxide may be a terminal epoxide or an internal epoxide. Specific examples of suitable epoxides include epoxyalkyl groups, such as epoxyethyl groups, epoxypropyl groups, epoxyhexyl groups, etc., epoxycycloalkyl groups, such as epoxycyclopentyl groups, epoxycyclohexyl groups, etc., and the like. One of skill in the art will appreciate that such epoxide groups may be substituted or unsubstituted.

In certain embodiments, $R^2$ is an epoxyethyl group of the following formula:

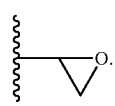

In other embodiments, $R^2$ is an epoxycyclohexyl group of the following formula:

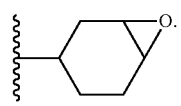

In particular embodiments, $R^2$ of at least one moiety Y is an acryloxy group of the formula:

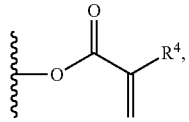

where $R^4$ is an independently selected hydrocarbyl group or H. Examples of hydrocarbyl groups suitable for $R^4$ include those described with respect to R above.

In certain embodiments, $R^4$ is H, such that $R^2$ may be defined as an acrylate group. In other embodiments, $R^4$ is selected from substituted or unsubstituted hydrocarbyl groups, such as any of those described above with respect to R. In some such embodiments, $R^4$ is an alkyl group, such that $R^2$ may be defined as an alkylacrylate group. In specific embodiments, $R^4$ is methyl, such that $R^2$ may be defined as a methacrylate group.

As described above, each Y of the multifunctional organosilicon compound is independently selected. In certain embodiments, at least one, alternatively at least two, alternatively each Y comprises, alternatively is, an alkyl glycidyl ether group, such as a methyl glycidyl ether group, ethyl glycidyl ether group, propyl glycidyl ether group, etc. In some embodiments, at least one, alternatively at least two, alternatively each Y comprises, alternatively is, an epoxycyclohexylalkyl group, such as an epoxycyclohexylmethyl group, an epoxycyclohexylethyl group, an epoxycyclohexylpropyl group, etc. In certain embodiments, at least one, alternatively at least two, alternatively each Y comprises, alternatively is, an alkoxysilylalkyl group, such as a trimethoxysilylmethyl group, a trimethoxysilylethyl group, a diethoxymethylsilylbutyl group, etc.

Subscript a of the multifunctional organosilicon compound is 1, 2, or 3. As such, in certain embodiments, subscript a is 1 and the multifunctional organosilicon compound has the general formula:

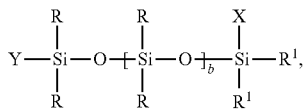

where each R, $R^1$, Y, X, and subscript b are as defined herein. In specific embodiments, subscript a is 2 and the multifunctional organosilicon compound has the general formula:

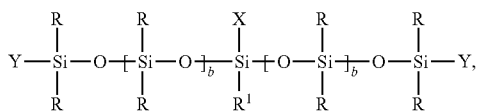

where each R, $R^1$, Y, X, and subscript b are as defined herein. In other embodiments, subscript a is 3 and the multifunctional organosilicon compound has the general formula:

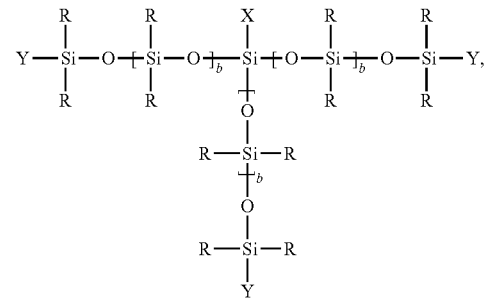

where each R, $R^1$, Y, X, and subscript b are as defined herein.

Each subscript b of the multifunctional organosilicon compound is independently 0, 1, or 2 in each moiety designated by subscript a. As such, those of skill in the art will readily understand that each moiety designated by subscript a may independently be of subformula Y—Si(R)$_2$O— (i.e., a monosiloxane, where b is 0), Y—Si(R)$_2$O—Si(R)$_2$O— (i.e., a disiloxane, where b is 1) or, Y—Si(R)$_2$O—Si(R)$_2$O—Si(R)$_2$O— (i.e., a trisiloxane, where b is 2) where each Y and R are as defined herein.

In certain embodiments, each subscript b is 0 in each moiety designated by subscript a. In some such embodiments, subscript a is 2 and the multifunctional organosilicon compound has the general formula:

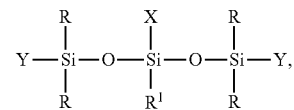

where each R, $R^1$, Y, and X are as defined herein. In other such embodiments, subscript a is 3 and the multifunctional organosilicon compound has the general formula:

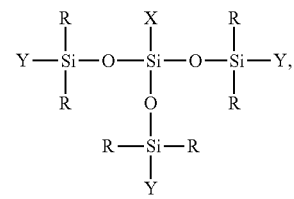

where each R, Y, and X are as defined herein.

In particular embodiments, each subscript b is 1 in each moiety designated by subscript a. In some such embodiments, subscript a is 2 and the multifunctional organosilicon compound has the general formula:

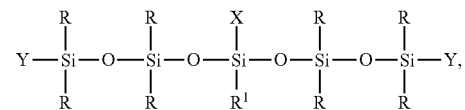

where each R, $R^1$, Y, and X are as defined herein. In other such embodiments, subscript a is 3 and the multifunctional organosilicon compound has the general formula:

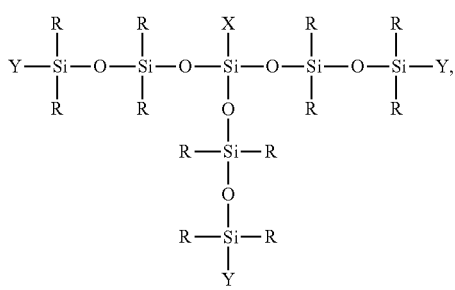

where each R, Y, and X are as defined herein.

In particular embodiments, each subscript b is 2 in each moiety designated by subscript a. In some such embodiments, subscript a is 2 and the multifunctional organosilicon compound has the general formula:

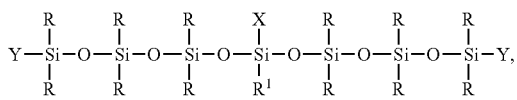

where each R, $R^1$, Y, and X are as defined herein. In other such embodiments, subscript a is 3 and the multifunctional organosilicon compound has the general formula:

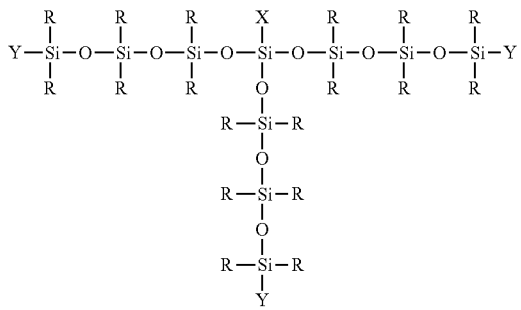

where each R, Y, and X are as defined herein.

As described above, each subscript b of the multifunctional organosilicon compound need not be the same, but instead be different from another subscript b. As but one example, where subscript a is 2 and the multifunctional organosilicon compound comprises one moiety designated by subscript a where b is 0, and one moiety designated by subscript a where b is 1, such that the multifunctional organosilicon compound has the following formula:

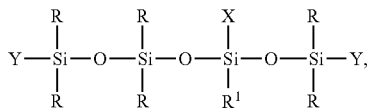

where each R, $R^1$, Y, and X are as defined herein.

A method of preparing the multifunctional organosilicon compound (the "preparation method") is also provided. The preparation method includes reacting (A) an organosilanol compound and (B) a silane compound having at least two hydrolysable groups As will be understood by one of skill in the art in view of the description herein, the organosilanol compound (A) utilized in the preparation method forms a portion of the multifunctional organosilicon compound corresponding to the moiety designated by subscript a in the general formula above, and the silane compound (B) utilized in the preparation method forms a portion of the multifunctional organosilicon compound corresponding to the moiety represented by the subformula —Si(X)—$(R^1)_{3-a}$, as described herein.

In general, the organosilanol compound (A) has the following formula:

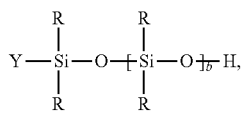

where, as described above with respect to the moiety designated by subscript a, Y comprises a functional moiety selected from alkoxysilyl moieties, acryloxy moieties, and epoxide moieties; each R is an independently selected hydrocarbyl group; and subscript b is 0, 1, or 2. Notwithstanding the above, one of skill in the art will readily understand the particular variations of limitations of the organosilanol compound (A) in view of the description of the moiety designated by subscript a of the multifunctional organosilicon compound above. As such, where formulas, structures, moieties, groups, or other such motifs are shared between the multifunctional organosilicon compound and the organosilanol compound (A), the description above with respect to such shared motifs may equally describe the organosilanol compound (e.g. with respect to each R, subscript a, functional moiety Y, etc.).

More specifically, in each instance, R is independently a substituted or unsubstituted hydrocarbyl group in the organosilanol compound (A). Examples of suitable hydrocarbyl groups are as described above. Typically, each R is independently selected from alkyl groups, such as methyl groups, ethyl groups, etc. In certain embodiments, each R is methyl.

Functional moiety Y of the organosilanol compound (A) comprises a functional moiety selected from alkoxysilyl moieties, acryloxy moieties, and epoxide moieties. Examples of these alkoxysilyl moieties, acryloxy moieties, and epoxide moieties are as described above.

For example, in some embodiments, functional moiety Y has the formula -D-$R^2$, where D is a divalent linking group and $R^2$ comprises one of the alkoxysilyl groups, acryloxy groups, or epoxide groups described above. In such embodiments, D is an independently selected divalent linking group, such as divalent substituted or unsubstituted hydrocarbon group. For example, in some embodiments, D comprises a hydrocarbon moiety having the formula —$(CH_2)_m$—, where subscript m is from 1 to 16, alternatively from 1 to 6. In these or other embodiments, D may comprise a substituted hydrocarbon, such as an ether moiety.

In certain embodiments, the organosilanol compound (A) comprises a mixture of compounds of the formula above where functional moiety Y has the formula -D-$R^2$, which compounds differ from one another with respect to the divalent group D. In some such embodiments, each D is linear or branched hydrocarbon group, and the organosilanol compound (A) comprises a ratio of compounds having linear or branched group D of 50:50, alternatively of 65:35, alternatively of >90:10, alternatively of >95:5 (linear:

branched). In certain embodiments, each D is a linear hydrocarbon group in at least 70, alternatively at least 75, alternatively at least 80, alternatively at least 85, alternatively at least 90, alternatively at least 95, mol % of molecules utilized having the general formula above.

Subscript b of the organosilanol compound (A) is independently 0, 1, or 2. For example, in certain embodiments, subscript b is 0 and the organosilanol compound (A) has the following formula:

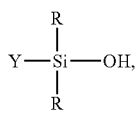

where each R and Y are as described above. In other embodiments, subscript b is 1 and the organosilanol compound (A) has the following formula:

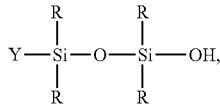

where each R and Y are as described above. In other embodiments, subscript b is 2 and the organosilanol compound (A) has the following formula:

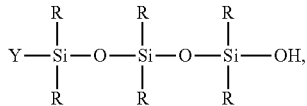

where each R and Y are as described above.

In certain embodiments, $R^2$ is an alkoxysilyl group of the formula:

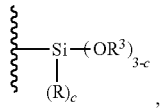

where each $R^3$ is an independently selected hydrocarbyl group, subscript c is 0, 1, or 2, and R is as defined above. In such embodiments, each $R^3$ may be the same or different from any other $R^3$ in the alkoxysilyl group. In certain embodiments, each $R^3$ is methyl. In other embodiments, each $R^3$ is ethyl. In these or other embodiments, subscript c is 0 or 1, such that the alkoxysilyl group comprises at least two alkoxy groups. In specific embodiments, subscript c is 0 and each $R^3$ is methyl, such that $R^2$ is a trimethoxysilyl group (e.g. is of formula $-Si(OCH_3)_3$). In other embodiments, subscript c is 0 and each $R^3$ is ethyl, such that $R^2$ is a triethoxysilyl group (e.g. is of formula $-Si(OCH_2CH_3)_3$).

In some embodiments, $R^2$ a cyclic epoxide or a linear epoxide group. In some such embodiments, $R^2$ is an epoxyethyl group of the following formula:

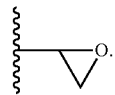

In other embodiments, $R^2$ is an epoxycyclohexyl group of the following formula:

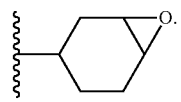

In particular embodiments, $R^2$ is an acryloxy group of the formula:

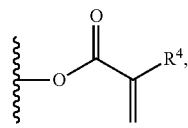

where $R^4$ is an independently selected hydrocarbyl group or H. In some such embodiments, $R^4$ is H. In other such embodiments, $R^4$ is methyl.

With respect to the organosilanol compound (A) as a whole, in certain embodiments, each R is methyl. In these or other embodiments, subscript b is 0 or 1. In particular embodiments, Y comprises, alternatively is, an ethyl glycidyl ether group, an epoxycyclohexylethyl group, a trimethoxysilylmethyl group, or a trimethoxysilylethyl group.

As will be appreciated from the description of the multifunctional organosilicon compound, which will be understood to equally apply to the preparation method unless indicated otherwise, the selection of each of R, $R^2$, $R^3$, $R^4$, D, Y, and subscript b, where present, is not limited, and includes any and all selections and combination of selections necessary for preparing the multifunctional organosilicon compound as described above.

The organosilanol compound (A) may be utilized in any form, such as neat (i.e., absent solvents, carrier vehicles, diluents, etc.), or disposed in a carrier vehicle, such as a solvent or dispersant. The carrier vehicle, if present, may comprise or be an organic solvent (e.g. aromatic hydrocarbons such as benzene, toluene, xylene, etc.; aliphatic hydrocarbons such as heptane, hexane, octane, etc.; halogenated hydrocarbons such as dichloromethane, 1,1,1-trichloroethane, chloroform; etc.; ethers such as diethyl ether, tetrahydrofuran, etc.), a silicone fluid, or combinations thereof. In certain embodiments, the organosilanol compound (A) is utilized in the absence of a carrier vehicle. In some such embodiments, the organosilanol compound (A) is utilized absent water and carrier vehicles/volatiles reactive with the organosilanol compound (A) and/or the silane compound (B). For example, in certain embodiments, the method may comprise stripping the organosilanol compound (A) of volatiles and/or solvents (e.g. organic solvents, water, etc.). Techniques for stripping the organosilanol compound (A) are known in the art, and may include distillation, heating, applying reduced pressure/vacuum, azeotroping with solvents, utilizing molecular sieves, etc., and combinations thereof.

The organosilanol compound (A) may be utilized in any amount, which will be selected by one of skill in the art, e.g. dependent upon the particular silane compound (B) selected, the reaction parameters employed, the scale of the reaction (e.g. total amounts of component (A) and/or (B) to be reacted and/or the multifunctional organosilicon compound to be prepared), etc.

In certain embodiments, the method comprises utilizing more than one organosilanol compound (A), such as 2, 3, 4, or more organosilanol compounds (A). In such embodiments, each organosilanol compound (A) is independently selected, and may be the same or different from any other organosilanol compound (A) (e.g. in terms of the siloxane backbone, functional moiety Y, substituents R, etc.).

In general, the silane compound (B) has the following formula:

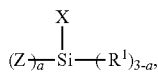

where each Z is an independently selected hydrolysable group; X is selected from H and ethylenically unsaturated moieties; each $R^1$ is an independently selected hydrocarbyl group; and subscript a is 1, 2, or 3. Notwithstanding the above, one of skill in the art will readily understand the particular variations of limitations of the silane compound (B) in view of the description of the moiety represented by the subformula —Si(X)—$(R^1)_{3-a}$ above. As such, where formulas, structures, moieties, groups, or other such motifs are shared between the multifunctional organosilicon compound and the silane compound (B), the description above with respect to such shared motifs may equally describe the silane compound (B) (e.g. with respect to each $R^1$, X, subscript a, etc.).

Subscript a is 1, 2, or 3. As such, in certain embodiments, subscript a is 2 and the silane compound (B) has the formula:

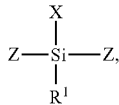

where each Z, $R^1$, and X are as described herein. In other embodiments, subscript a is 3 and the silane compound (B) has the formula:

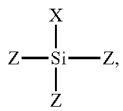

where each Z and X are as described herein.

Each hydrolysable group Z is independently selected, and may be the same or different from any other hydrolysable group Z in the silane compound (B). In certain embodiments, each hydrolysable group Z is the same. In other embodiments, at least one hydrolysable group Z is different than at least one other hydrolysable group Z of the silane compound (B). Hydrolysable groups suitable for the silane compound (B) are not limited, and may be any group capable of facilitating condensation of the silanol group of the organosilanol compound (A) with the silane compound (B).

In certain embodiments, each hydrolysable group Z is independently selected from halogens (e.g. chlorine, bromine, etc.), acetoxy groups (e.g. —OC(O)CH$_3$), alkoxy groups (e.g. methoxy groups, ethoxy groups, propoxy groups, butoxy groups, phenoxy groups, etc.), oxime groups (e.g. —ONC(CH$_2$CH$_3$)$_2$), and aminoxy groups (e.g. —ON(CH$_2$CH$_3$)$_2$). In particular embodiments, each hydrolysable group Z is a halogen. In specific embodiments, each hydrolysable group Z is chlorine.

$R^1$ of the silane compound (B), where present (i.e., where subscript a is 2, as described further below), is a hydrocarbyl group. In certain embodiments, $R^1$ is selected from alkyl groups, such as methyl groups, ethyl groups, etc. For example, in certain embodiments, $R^1$ is methyl.

In general, X of the silane compound (B) is a hydrosilylatable moiety. As such, as described above, X is selected from H (i.e., a silicon-bonded hydrogen atom) and ethylenically unsaturated moieties. In certain embodiments, X is H. In other embodiments, X is an ethylenically unsaturated moiety, such as an alkenyl group or an alkynyl group. In certain embodiments, X comprises, alternatively is, an alkenyl moiety having the formula —(CH$_2$)$_n$CHCH$_2$, where subscript n is from 0 to 4.

The silane compound (B) may be utilized in any form, such as neat (i.e., absent solvents, carrier vehicles, diluents, etc.), or disposed in a carrier vehicle, such as a solvent or dispersant. The carrier vehicle, if present, may comprise or be an organic solvent (e.g. aromatic hydrocarbons such as benzene, toluene, xylene, etc.; aliphatic hydrocarbons such as heptane, hexane, octane, etc.; halogenated hydrocarbons such as dichloromethane, 1,1,1-trichloroethane, chloroform; etc.; ethers such as diethyl ether, tetrahydrofuran, etc.), a silicone fluid, or combinations thereof.

In some embodiments, the silane compound (B) is utilized in the absence of water and carrier vehicles/volatiles reactive with the organosilanol compound (A) and/or the silane compound (B). For example, in certain embodiments, the method may comprise stripping the silane compound (B) of volatiles and/or solvents (e.g. water, reactive solvents, etc.). Techniques for stripping the silane compound (B) are known in the art, and may include heating, drying, applying reduced pressure/vacuum, azeotroping with solvents, utilizing molecular sieves, etc., and combinations thereof.

In certain embodiments, the method comprises utilizing more than one silane compound (B), such as 2, 3, 4, or more silane compounds (B). In such embodiments, each silane compound (B) is independently selected, and may be the same or different from any other silane compound (B) (e.g. in terms of the hydrolysable groups Z, the hydrosilylatable moiety X, etc.).

The silane compound (B) may be utilized in any amount, which will be selected by one of skill in the art, e.g. dependent upon the particular organosilanol compound (A) selected, the reaction parameters employed, the scale of the reaction (e.g. total amount of component (A) to be converted and/or multifunctional organosilicon compound to be prepared), etc.

The relative amounts of the organosilanol compound (A) and silane compound (B) utilized may vary, e.g. based upon the particular organosilanol compound (A) selected, the particular silane compound (B) selected, the reaction parameters employed, etc. As understood by those of skill in the art, the theoretical maximum molar ratio of the reaction of components (A) and (B) depends on subscript a, i.e., the number of hydrolysable groups Z. For example, when subscript a is 2 (i.e., the silane compound (B) has two hydrolysable groups Z), components (A) and (B) can be reacted in a 2:1 ratio (A):(B). Likewise, when subscript a is 3 (i.e., the silane compound (B) has three hydrolysable groups Z), components (A) and (B) can be reacted in a 3:1 ratio (A):(B).

Regardless of the particular theoretical maximum molar ratio of the reaction, an excess of one of the components is typically utilized to fully consume one of components (A) or (B), e.g. to simplify purification of the reaction product formed. As such, in certain embodiments, the organosilanol compound (A) and silane compound (B) are reacted in a molar ratio of from 10:1 to 1:10 (A):(B), such as from 8:1 to 1:8, alternatively of from 6:1 to 1:6, alternatively of from 4:1 to 1:4 (A):(B). In specific embodiments, the organosilanol compound (A) is utilized in relative excess to maximize a conversion rate of the components (A) and (B) to the multifunctional organosilicon compound. In such embodiments, the organosilanol compound (A) and silane compound (B) are reacted in a molar ratio of from 6:1 to 1.1:1, such as from 5:1 to 1.1:1, alternatively of from 4:1 to 1.1:1, alternatively of from 3:1 to 1.1:1 (A):(B). In particular such embodiments, the organosilanol compound (A) and silane compound (B) are reacted in a molar ratio of from 3.5:1 to 3.01:1 (A):(B) (e.g. when the silane compound (B) has three hydrolysable groups Z), alternatively of from 2.5:1 to 2.01:1 (A):(B) (e.g. when the silane compound (B) has two hydrolysable groups Z).

It will be appreciated that ratios outside of these ranges may be utilized as well. For example, in certain embodiments, the organosilanol compound (A) is utilized in a gross excess (e.g. in an amount of ≥10, alternatively ≥15, alternatively ≥20, times the molar amount of the silane compound (B)), such as when the organosilanol compound (A) is utilized as a carrier (i.e., a solvent, diluent, etc.) during the reaction. In other embodiments, the silane compound (B) is utilized excess of component (A), alternatively in a gross excess (e.g. in an amount of ≥10, alternatively ≥15, alternatively ≥20, times the molar amount of the organosilanol compound (A)), such as when the silane compound (B) is utilized as a carrier (i.e., a solvent, diluent, etc.) during the reaction.

Reacting the organosilanol compound (A) and the silane compound (B) generally comprises combining (e.g. combining) the organosilanol compound (A) and the silane compound (B). Said differently, there is generally no proactive step required for the reaction reduction beyond combining the organosilanol compound (A) and the silane compound (B). However, in certain embodiments, one of components (A) and (B) may be formed in situ. For example, as understood by those of skill in the art, condensation of an Si—OH group with an Si—Cl group may happen directly, or indirectly by initial hydrolysis of the Si—Cl group to an Si—OH group and subsequent condensation of the two Si—OH groups. As such, it is to be appreciated that the organosilanol compound (A) may be prepared by hydrolysis of a halogen-functional organosilicon compound, such as a chlorine-functional organosilicon compound having the formula:

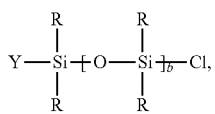

where each R, Y, and subscript b are as described above.

Likewise, it is also to be appreciated that component (B) may react indirectly with the organosilanol compound (A), i.e., after hydrolysis of one or more of the hydrolysable groups Z of component (B). Moreover, while the organosilanol compound (A) is described above in terms of silanol functionality (i.e., the Si—OH group thereof), it is also to be appreciated that, under specific conditions, the chlorine-functional organosilicon compound described above may itself react with a the hydrolysis of one or more of the hydrolysis reaction product of component (B), which itself would comprise one or more Si—OH groups. In such instances, the organosilanol compound (A) would not itself become a silanol (i.e., Si—OH group-functional) during the method. As such, the term "organosilanol" used in regard to the organosilanol compound (A) is not to be limiting, and is to be understood to encompass halogen-functional organosilicon compounds that are readily converted to the corresponding organosilanol compounds under hydrolysis conditions.

In some embodiments, components (A) and (B) may be self-reactive, i.e., may react to form the multifunctional organosilicon compound without requiring additional components to be present. However, in certain embodiments, the organosilanol compound (A) and the silane compound (B) are reacted in the presence of (C) a reaction catalyst.

The catalyst (C) is not limited, will be readily selected by one of skill in the art, e.g. based on the particular organosilanol compound (A) utilized, the particular silane compound (B) utilized, the reaction parameters employed, the scale of the reaction (e.g. total amounts of components (A) and (B), total amount of the multifunctional organosilicon compound), etc. In general, the particular catalyst (C) utilized is a function of the particular organosilanol compound (A) and silane compound (B) selected, as the reaction to prepare the multifunctional organosilicon compound involves the silanol functionality of the organosilanol compound (A) and the hydrolysable groups Z of the silane compound (B) (e.g. via addition and/or condensation mechanisms, etc., as understood by those of skill in the art). However, the selection of the catalyst (C) will also be made in view of the particular functional moiety of the organosilanol compound (A) and the hydrosilylatable moiety X of the silane compound (B), e.g. such that these moieties stay intact (i.e., do not react and/or transform) during the reaction.

Typically, the catalyst (C) comprises, alternatively is, a base catalyst, an acid catalyst, a metal catalyst (e.g. a transition metal catalyst), or a combination thereof. However, as introduced above, the particular catalyst will be selected on the particular components (A) and (B), i.e., based on the functional group(s) (e.g. epoxy, acrylate, or alkoxy) present in the functional moiety Y of component (A) and the hydrolysable group(s) Z (e.g. alkoxy, chloro, oxime, acetoxy, or aminoxy) of component (B). For example, as understood by those of skill in the art, reaction of an Si—OH group with an Si—Cl group does not require a catalyst, but will typically be performed in the presence of a base (e.g. pyridine, etc.) to neutralize the HCl generated. Such HCl would otherwise catalyze Si—OH group condensation reactions, ring-opening reactions of epoxide groups (e.g. optionally of functional moiety Y), etc. As another example, the reaction of an Si—OH group with a alkoxysilyl group (e.g. Si—OCH$_3$) typically requires a catalyst (e.g. acid/base/metal). However, this particular reaction will not be selected when component (A) comprises an alkoxysilyl group-functional moiety Y and component (B) comprises alkoxy hydrolysable group(s) Z, as the required catalyst will also catalyze the reaction of the Si—OH group with the alkoxysilyl group(s) of functional moiety Y (i.e., and not just with the alkoxy hydrolysable group(s) Z of component (B)). Similarly, acid and/or metal catalysts will typically not be utilized when the functional moiety Y of component a is epoxide-functional, as such catalysts may facilitate ring-opening of the epoxide group. However, these selection examples are to be understood as illustrative and not limiting as, the above notwithstanding, particular conditions may be employed to utilized any catalyst system with any functional groups of components (A) and (B) and minimize unwanted side reactions, as understood by those of skill in the art.

Examples of suitable base catalysts, which are also known as "basic" catalysts, are varied, and include compositions and/or compounds known in the art to act or otherwise function as a Brønsted-Lowry-type base. Specific examples of base catalysts include alkali metal hydroxides (e.g. sodium hydroxide (NaOH), potassium hydroxide (KOH), cesium hydroxide (CsOH), etc.), alkali metal alkoxides, complexes of alkali metal hydroxides and an alcohol, alkali metal silanolates (e.g. potassium silanolate or trimethylpotassium silanolate), tetra-alkyl phosphonium hydroxides, tetra-alkyl phosphonium silanolates, phosphonitrile halides as chlorophosphazenes), phosphazene bases, sulfonic acids, metal carboxylates, and amines (e.g. primary, secondary, and tertiary amines, such as ammonia, alkyl amines (e.g. triethyl amine, etc.), amino alcohols, heterocyclic amines (e.g. pyridine), complex amines (e.g. tetramethylguanidine, diazabicyclo[5.4.0]undec-7-ene (DBU); 1,5-diazabicyclo[4.3.0]non-5-ene; 1,4-diazabicyclo[2.2.2]octane (DABCO), etc.)), and the like, as well as derivatives and combinations thereof.

In certain embodiments, the catalyst (C) comprises, alternatively is, a tertiary amine compound, such as trimethyl amine, triethyl amine, etc. In certain embodiments, the catalyst (C) comprises, alternatively is, an imine compound, such as those known in the art as Schiff bases, and heterocyclic imines such as pyrimidine compounds (e.g. pyridine).

Examples of suitable acid catalysts, which are also known as "acidic" catalysts, are varied, and include compositions and/or compounds known in the art to act or otherwise function as a Brønsted-Lowry-type (i.e., "protic acids") or Lewis-type acid (i.e., "Lewis acids"). Specific examples of acid catalysts include carboxylic acids (e.g. octanoic acid, acetic acid, trifluoroacetic acid (TFAA), etc.), sulfonic acids (e.g. trifluoromethanesulfonic acid, etc.), mineral acids (e.g. sulfuric acids, hydrochloric acids, etc.), Lewis acids (e.g. boron trifluoride $FeCl_3$, $AlCl_3$, $ZnCl_2$, $ZnBr_2$, etc.) and the like, as well as derivatives and combinations thereof.

Examples of suitable metal catalyst are not limited, and include typically include a metal selected from transition metals and p-block metals, although higher-order s-block metals may also be utilized. General examples of metal catalyst include those comprising tin, lead, antimony, iron, cadmium, barium, manganese, zinc, chromium, cobalt, nickel, titanium, aluminium, gallium, germanium, zirconium. Such catalyst are well known in the art, and may comprise any type of organic ligands and/or counter ions, inorganic and/or elemental counter ions, and combinations thereof.

When utilized, the metal catalyst is typically selected from tin catalysts, titanium catalysts, zirconate catalysts, and zirconium catalysts. General examples of suitable tin catalysts include organotin compounds where the valence of the tin is either +4 or +2 (e.g. tin (IV) compounds and/or tin (II) compounds). Specific examples of tin (IV) compounds include stannic salts of carboxylic acids such as dibutyl tin dilaurate, dimethyl tin dilaurate, di-(n-butyl)tin bis-ketonate, dibutyl tin diacetate, dibutyl tin maleate, dibutyl tin diacetylacetonate, dibutyl tin dimethoxide, carbomethoxyphenyl tin tris-uberate, dibutyl tin dioctanoate, dibutyl tin diformate, isobutyl tin triceroate, dimethyl tin dibutyrate, dimethyl tin di-neodeconoate, dibutyl tin di-neodeconoate, triethyl tin tartrate, dibutyl tin dibenzoate, butyltintri-2-ethylhexanoate, dioctyl tin diacetate, tin octylate, tin oleate, tin butyrate, tin naphthenate, dimethyl tin dichloride, a combination thereof, and/or a partial hydrolysis product thereof. Specific examples of tin (II) compounds include tin (II) salts of organic carboxylic acids such as tin (II) diacetate, tin (II) dioctanoate, tin (II) diethylhexanoate, tin (II) dilaurate, stannous salts of carboxylic acids such as stannous octoate, stannous oleate, stannous acetate, stannous laurate, stannous stearate, stannous naphthanate, stannous hexanoate, stannous succinate, stannous caprylate, and a combination thereof. Examples of suitable titanium catalysts include titanium esters such as tetra-n-butyltitanate tetraisopropyltitanate, tetra-2-ethylhexyltitanate, tetraphenyltitanate, triethanolamine titanate, organosiloxytitanium compounds, and dicarbonyl titanium compounds, such as titanium ethyl acetoacetate, diisopropoxydi(ethoxyacetoacetyl) titanium, and bis(acetoacetonyl)-diisopropoxy titanium (IV).

Methods of preparing catalysts (C) exemplified above are well known in the art, with the catalysts themselves and/or compounds used to prepare the same being commercially available from various suppliers. As such, the catalyst (C) may be prepared as part of the method, or otherwise obtained (i.e., as a prepared compound). Preparations of the catalyst (C) may be formed prior to the reaction of components (A) and (B), or in situ (i.e., during the reaction of components (A) and (B)).

The catalyst (C) may be utilized in any form, such as neat (i.e., absent solvents, carrier vehicles, diluents, etc.), or disposed in a carrier vehicle, such as a solvent or dispersant (e.g. such as any of those listed above with respect to the organosilanol compound (A)). In some embodiments, the catalyst (C) is utilized in the absence of water and carrier vehicles/volatiles reactive with the organosilanol compound (A), the silane compound (B), and/or the catalyst (C) itself (i.e., until combined with components (A) and (B). For example, in certain embodiments, the method may comprise stripping the catalyst (C) of volatiles and/or solvents (e.g. water, organic solvents, etc.). Techniques for stripping the catalyst (C) are known in the art, and may include heating, drying, applying reduced pressure/vacuum, azeotroping with solvents, utilizing molecular sieves, etc., and combinations thereof. In particular embodiments, the catalyst (C) may be utilized as the carrier in the reaction of components (A) and (B). For example, in certain embodiments, the catalyst (C) is a liquid (e.g. pyridine) that may be used to carry components (A) and/or (B), or the multifunctional organosilicon compound.

The catalyst (C) may be utilized in any amount, which will be selected by one of skill in the art, e.g. dependent upon the particular catalyst (C) selected, the reaction parameters employed, the scale of the reaction (e.g. total amounts of components (A) and (B)), etc. The molar ratio of the catalyst (C) to components (A) and/or (B) utilized in the reaction may influence the rate and/or amount of the reaction of components (A) and (B) to prepare the multifunctional organosilicon compound therewith. Thus, the amount of the catalyst (C) as compared to components (A) and/or (B), as well as the molar ratios therebetween, may vary. Typically, these relative amounts and the molar ratio are selected to maximize coupling of components (A) and (B) to prepare the organosilanol compound, while minimizing the loading of the catalyst (C) (e.g. for increased economic efficiency of the reaction, increased ease of purification of the reaction product formed, etc.).

In certain embodiments, the catalyst (C) is utilized in the reaction in an amount of from 0.001 to 10 mol % based on the total amount of component (A) utilized. For example, the catalyst (C) may be used in an amount of from 0.005 to 10, alternatively of from 0.005 to 5, alternatively of from 0.01 to 5, mol % based on the total amount of component (A) utilized.

In particular embodiments, the catalyst (C) is utilized in the reaction in an amount of from 0.001 to 10 mol % based on the total amount of component (B) utilized. For example, the catalyst (C) may be used in an amount of from 0.005 to 10, alternatively of from 0.005 to 5, alternatively of from 0.01 to 5, mol % based on the total amount of component (B) utilized.

In certain embodiments, the catalyst (C) is utilized in the reaction on an equivalent basis to one of the components (A) and (B). For example, the silane compound (B) and the catalyst (C) may be utilized in in a molar ratio of from 5:1 to 1:10 (B):(C). For example, in certain embodiments, the silane compound (B) and the catalyst (C) are utilized in a molar ratio of from 1:1 to 1:5, such as from 1:1 to 1:4, alternatively of from 1:1 to 1:3, alternatively, alternatively of from 1:1 to 1:2, alternatively of from 1:1.1 to 1:2 (A):(B). It will be appreciated that ratios outside of these ranges may be utilized as well. For example, in certain embodiments, the catalyst (C) is utilized in a gross excess (e.g. in an amount of ≥10, alternatively ≥15, alternatively ≥20, times the molar amount of the silane compound (B)), such as when the catalyst (C) is utilized as a carrier (i.e., a solvent, diluent, etc.) during the reaction.

In certain embodiments, the organosilanol compound (A) and the silane compound (B) are reacted in the presence of (D) a reaction inhibitor. The reaction inhibitor (D) is not limited, and may comprise, alternatively may be, any compound or composition capable of preventing, suppressing, or otherwise inhibiting a reaction (e.g. a reaction other than desired and/or necessary for the preparation of the multifunctional organosilicon compound.

In some embodiments, e.g. where the organosilanol compound (A) is acryloxy functional, the reaction inhibitor (D) comprises, alternatively is, a polymerization inhibitor.

The polymerization inhibitor is not limited, and may comprise, alternatively may be, a radical scavenger, an antioxidant, a light stabilizer, a UV-absorber, or the like, or a combination thereof. Such compounds are known in the art, and generally are, or include, a chemical compound or moiety capable of interacting with a free radical to render the free radical inactive, e.g. via elimination the free radical through the formation of a covalent bond therewith. The polymerization inhibitor (D) may also, or alternatively, be a polymerization retardant, i.e., a compound that reduces the rate of initiation and/or propagation of a radical polymerization. For example, in some embodiments, the polymerization inhibitor (D) comprises, alternatively is, oxygen gas. In general, the polymerization inhibitor (D) is utilized to prevent and/or suppress the formation of byproducts that may be formed via radical polymerization of the organosilanol compound (A), the silane compound (B) (e.g. when comprising an ethylenically unsaturated moiety), and/or the multifunctional organosilicon compound (e.g. when comprising an ethylenically unsaturated moiety, an acryloxy moiety, etc.).

In certain embodiments, the polymerization inhibitor (D) comprises, alternatively is, a phenolic compound, a quinone or hydroquinone compound, an N-oxyl compound, a phenothiazine compound, a hindered amine compound, or a combination thereof.

Examples of phenolic compounds include phenol, alkylphenols, aminophenols (e.g. p-aminophenol), nitrosophenols, and alkoxyphenols. Specific examples of such phenol compounds include o-, m- and p-cresol(methylphenol), 2-tert-butyl-4-methylphenol, 6-tert-butyl-2,4-dimethylphenol, 2,6-di-tert-butyl-4-methylphenol, 2-tert-butylphenol, 4-tert-butylphenol, 2,4-di-tert-butylphenol, 2-methyl-4-tert-butylphenol, 4-tert-butyl-2,6-dimethylphenol or 2,2'-methylenebis(6-tert-butyl-4-methylphenol), 4,4'-oxybiphenyl, 3,4-methylenedioxydiphenol (sesamol), 3,4-dimethylphenol, pyrocatechol (1,2-dihydroxybenzene), 2-(1'-methylcyclohex-1'-yl)-4,6-dimethylphenol, 2- or 4-(1'-phenyleth-1'-yl)phenol, 2-tert-butyl-6-methylphenol, 2,4,6-tris-tert-butylphenol, 2,6-di-tert-butylphenol, nonylphenol, octylphenol, 2,6-dimethylphenol, bisphenol A, bisphenol B, bisphenol C, bisphenol F, bisphenol S, 3,3',5,5'-tetrabromo-bisphenol A, 2,6-di-tert-butyl-p-cresol, methyl 3,5-di-tert-butyl-4-hydroxybenzoate, 4-tert-butylpyrocatechol, 2-hydroxybenzyl alcohol, 2-methoxy-4-methylphenol, 2,3,6-trimethylphenol, 2,4,5-trimethylphenol, 2,4,6-trimethylphenol, 2-isopropylphenol, 4-isopropylphenol, 6-isopropyl-m-cresol, n-octadecyl p-(3,5-di-tert-butyl-4-hydroxyphenyl)propionate, 1,1,3-tris(2-methyl-4-hydroxy-5-tert-butylphenyl)butane, 1,3,5-trimethyl-2,4,6-tris-(3,5-di-tert-butyl-4-hydroxybenzyl)benzene, 1,3,5-tris(3,5-di-tert-butyl-4-hydroxybenzyl)isocyanurate, 1,3,5-tris(3,5-di-tert-butyl-4-hydroxyphenyl)propionyloxyethyl isocyanurate, 1,3,5-tris(2,6-dimethyl-3-hydroxy-4-tert-butylbenzyl)isocyanurate or pentaerythrityl tetrakis[p-(3,5-di-tert-butyl-4-hydroxyphenyl)propionate], 2,6-di-tert-butyl-4-dimethyl-aminomethylphenol, 6-sec-butyl-2,4-dinitrophenol, octadecyl 3-(3',5'-di-tert-butyl-4'-hydroxyphenyl)propionate, hexadecyl 3-(3',5'-di-tert-butyl-4'-hydroxyphenyl) propionate, octyl 3-(3',5'-di-tert-butyl-4'-hydroxyphenyl) propionate, 3-thia-1,5-pentanediol bis[(3',5'-di-tert-butyl-4'-hydroxyphenyl)propionate], 4,8-dioxa-1,11-undecanediol bis[(3',5'-di-tert-butyl-4'-hydroxyphenyl)propionate], 4,8-dioxa-1,11-undecanediol bis[(3'-tert-butyl-4'-hydroxy-5'-methylphenyl)propionate], 1,9-nonanediol bis[(3',5'-di-tert-butyl-4'-hydroxyphenyl)propionate], 1,7-heptanediaminebis[3-(3',5'-di-tert-butyl-4'-hydroxyphenyl)propionamide], 1,1-methanediaminebis[3-(3',5'-di-tert-butyl-4'-hydroxyphenyl) propionamide], 3-(3',5'-di-tert-butyl-4'-hydroxyphenyl) propionic acid hydrazide, 3-(3',5'-dimethyl-4'-hydroxyphenyl)propionic acid hydrazide, bis(3-tert-butyl-5-ethyl-2-hydroxyphen-1-yl)methane, bis(3,5-di-tert-butyl-4-hydroxyphen-1-yl)methane, bis[3-(1'-methylcyclohex-1'-yl)-5-methyl-2-hydroxyphen-1-yl]methane, bis(3-tert-butyl-2-hydroxy-5-methylphen-1-yl)methane, 1,1-bis(5-tert-butyl-4-hydroxy-2-methylphen-1-yl)ethane, bis(5-tert-butyl-4-hydroxy-2-methylphen-1-yl) sulfide, bis(3-tert-butyl-2-hydroxy-5-methylphen-1-yl) sulfide, 1,1-bis(3,4-dimethyl-2-hydroxyphen-1-yl)-2-methylpropane, 1,1-bis(5-tert-butyl-3-methyl-2-hydroxyphen-1-yl)butane, 1,3,5-tris-[1'-(3Δ,5"-di-tert-butyl-4"-hydroxyphen-1"-yl)meth-1'-yl]-2,4,6-trimethylbenzene, 1,1,4-tris(5'-tert-butyl-4'-hydroxy-2'-methylphen-1'-yl)butane and tert-butyleatechol, p-nitrosophenol, p-nitroso-o-cresol, methoxyphenol (guajacol, pyrocatechol monomethyl ether), 2-ethoxyphenol, 2-isopropoxyphenol, 4-methoxyphenol (hydroquinone monomethyl ether), mono- or di-tert-butyl-4-methoxyphenol, 3,5-di-tert-butyl-4-hydroxyanisole, 3-hydroxy-4- methoxybenzyl alcohol, 2,5-dimethoxy-4-hydroxybenzyl alcohol (syringa alcohol), 4-hydroxy-3-methoxybenzaldehyde (vanillin), 4-hydroxy-3-ethoxybenzaldehyde (ethylvanillin), 3-hydroxy-4-methoxybenzaldehyde (isovanillin), 1-(4-hydroxy-3-methoxyphenyl)ethanone (acetovanillone), eugenol, dihydroeugenol, isoeugenol, tocopherols, such as α-, β-, γ-, δ- and ε-tocopherol, tocol, α-tocopherolhydroquinone, 2,3-dihydro-2,2-dimethyl-7-hydroxybenzofuran (2,2-dimethyl-7-hydroxycoumaran), and the like.

Suitable quinones and hydroquinones include hydroquinone, hydroquinone monomethyl ether(4-methoxyphenol), methylhydroquinone, 2,5-di-tert-butylhydroquinone, 2-methyl-p-hydroquinone, 2,3-dimethylhydroquinone, trimethylhydroquinone, 4-methylpyrocatechol, tert-butylhydroquinone, 3-methylpyrocatechol, benzoquinone, 2-methyl-p-hydroquinone, 2,3-dimethylhydroquinone, tdmethylhydroquinone, tert-butylhydroquinone, 4-ethoxyphenol, 4-butoxyphenol, hydroquinone monobenzyl ether, p-phenoxyphenol, 2-methylhydroquinone, tetramethyl-p-benzoquinone, diethyl-1,4-cyclohexanedion 2,5-dicarboxylate, phenyl-p-benzoquinone, 2,5-dimethyl-3-benzyl-p-benzoquinone, 2-isopropyl-5-methyl-p-benzoquinone (thymoquinone), 2,6-diisopropyl-p-benzoquinone, 2,5-dimethyl-3-hydroxy-p-benzoquinone, 2,5-dihydroxy-p-benzoquinone, embelin, tetrahydroxy-p-benzoquinone, 2,5-dimethoxy-1,4-benzoquinone, 2-amino-5-methyl-p-benzoquinone, 2,5-bisphenylamino-1,4-benzoquinone, 5,8-dihydroxy-1,4-naphthoquinone, 2-anilino-1,4-naphthoquinone, anthraquinone, N,N-dimethylindoaniline, N,N-diphenyl-p-benzoquinonediimine, 1,4-benzoquinone dioxime, coerulignone, 3,3'-di-tert-butyl-5,5'-dimethyldiphenoquinone, p-rosolic acid (aurin), 2,6-di-tert-butyl-4-benzylidenebenzoquinone, 2,5-di-tert-amylhydroquinone, and the like.

Suitable N-oxyl compounds (i.e., nitroxyl or N-oxyl radicals) include compounds which have at least one N—O· group, such as 4-hydroxy-2,2,6,6-tetramethylpiperidin-N-oxyl, 4-oxo-2,2,6,6-tetramethylpiperidin-N-oxyl, 4-methoxy-2,2,6,6-tetramethylpiperidin-N-oxyl, 4-acetoxy-2,2,6,6-tetramethylpiperidin-N-oxyl, 2,2,6,6-tetramethylpiperidin-N-oxyl (TEMPO), 4,4',4''-tris(2,2,6,6-tetramethylpiperidin-N-oxyl)phosphite, 3-oxo-2,2,5,5-tetramethylpyrrolidin-N-oxyl, 1-oxyl-2,2,6,6-tetramethyl-4-methoxypiperidine, 1-oxyl-2,2,6,6-tetramethyl-4-trimethylsilyloxypiperidine, 1-oxyl-2,2,6,6-tetramethylpiperidin-4-yl 2-ethylhexanoate, 1-oxyl-2,2,6,6-tetramethylpiperidin-4-yl sebacate, 1-oxyl-2,2,6,6-tetramethylpiperidin-4-yl stearate, 1-oxyl-2,2,6,6-tetramethylpiperidin-4-yl-benzoate, 1-oxyl-2,2,6,6-tetramethylpiperidin-4-yl (4-tert-butyl)benzoate, bis(1-oxyl-2,2,6,6-tetramethylpiperidin4-yl) succinate, bis(1-oxyl-2,2,6,6-tetramethylpiperidin-4-yl) adipate, bis(1-oxyl-2,2,6,6-tetramethylpiperidin-4-yl)1,10-decanedioate, bis(1-oxyl-2,2,6,6-tetramethylpiperidin4-yl)n-butylmalonate, bis(1-oxyl-2,2,6,6-tetramethylpiperidin-4-yl) phthalate, bis(1-oxyl-2,2,6,6-tetramethylpiperidin-4-yl)isophthalate, bis(1-oxyl-2,2,6,6-tetramethylpiperidin4-yl) terephthalate, bis(1-oxyl-2,2,6,6-tetramethylpiperidin-4-yl) hexahydroterephthalate, N,N'-bis(1-oxyl-2,2,6,6-tetramethylpiperidin-4-yl)adipamide, N-(1-oxyl-2,2,6,6-tetramethylpiperidin-4-yl)caprolactam, N-(1-oxyl-2,2,6,6-tetramethylpiperidin-4-yl)dodecylsuccinimide, 2,4,6-tris[N-butyl-N-(1-oxyl-2,2,6,6-tetramethylpiperidin-4-yl]triazine, N,N'-bis(1-oxyl-2,2,6,6-tetramethylpiperidin-4-yl)-N,N'-bisformyl-1,6-diaminohexane, 4,4'-ethylenebis(1-oxyl-2,2,6,6-tetramethylpiperazin-3-one), and the like.

Other compounds suitable for use in or as the polymerization inhibitor (D) include phenothiazine (PTZ) and compounds with similar structures, such as phenoxazine, promazine, N,N'-dimethylphenazine, carbazole, N-ethylcarbazole, N-benzylphenothiazine, N-(1-phenylethyl)phenothiazine, N-Alkylated phenothiazine derivatives such as N-benzylphenothiazine and N-(1-phenylethyl)phenothiazine, and the like. Of course, the polymerization inhibitor (D) may include any number of particular compounds, which may each be independently selected and the same as or different from any other compound of the polymerization inhibitor (D).

In particular embodiments, the polymerization inhibitor (D) comprises, alternatively is, (2,2,6,6-tetramethylpiperidin-1-yl)oxyl (TEMPO), 4-hydroxy (2,2,6,6-tetramethylpiperidin-1-yl)oxyl (4HT), bis(2,2,6,6-tetramethylpiperidin-1-yl)oxyl sebacate (Bis-TEMPO), polymer-bound TEMPO, or a combination thereof.

When utilized, the polymerization inhibitor (D) may be added to the reaction as a discrete component, or may be combined with another component (e.g. the organosilanol compound (A)) prior to the reaction of components (A) and (B). The polymerization inhibitor (D) may be utilized in any amount, which will be selected by one of skill in the art, e.g. dependent upon the particular polymerization inhibitor (D) selected, the reaction parameters employed, the scale of the reaction (e.g. total amounts of components (A) and/or (B)), the atmosphere of the reaction, the temperature and/or pressure of the reaction, etc.). In certain embodiments, the polymerization inhibitor (D) is present in the reaction in an amount of from 50 to 2000 ppm, such as in an amount of 50, alternatively of 100, alternatively of 250, alternatively of 500, alternatively of 1000, alternatively of 1500, alternatively of 2000, ppm. However, one of skill in the art will readily appreciate that amounts outside of these ranges and exemplary amounts may also be utilized, e.g. where the reaction scale and/or conditions requires additional amounts of the polymerization inhibitor (D).

The polymerization inhibitor (D) may be utilized in the method at any time, include before, during, and after the reaction of components (A) and (B). Additionally, the reaction inhibitor (D) may be utilized peripherally during the method, e.g. in vacuum traps, distillation and/or receiving pots, etc., in addition to use within the reaction itself. Moreover, in addition or as an alternative to the above amounts, oxygen may be added to the reaction as a separate component (e.g. in place of, or in addition to, a discrete polymerization inhibitor (D) selected from the compounds above). In such instances, the oxygen may be introduced into the reaction in the form of oxygen gas, optionally in the presence of other gasses (e.g. in the form of air). When utilized, the amount of oxygen gas is selected such that the gas phase above the reaction mixture remains below the explosion limit.

Typically, the reaction of components (A) and (B) to prepare the multifunctional organosilicon compound is carried out in a vessel or reactor. When the reaction is carried out at an elevated or reduced temperature as described below, the vessel or reactor may be heated or cooled in any suitable manner, e.g. via a jacket, mantle, exchanger, bath, coils, etc.

Components (A), (B), and (C), and optionally (D), may be fed together or separately to the vessel, or may be disposed in the vessel in any order of addition, and in any combination. For example, in certain embodiments, components (B) and (C) are added to a vessel containing component (A), and optionally component (D). In such embodiments, components (B) and (C) may be first combined prior to the addition, or may be added to the vessel sequentially (e.g. (C) then (B)). In general, reference to the "reaction mixture" herein refers generally to a mixture comprising components (A), (B), and (C) (e.g. as obtained by combining such components, as described above). Of course, when utilized, component (D) may also be includes in the reaction mixture.

The method may further comprise agitating the reaction mixture. The agitating may enhance mixing and contacting together components (A), (B), and (C) when combined, e.g. in the reaction mixture thereof. Such contacting independently may use other conditions, with (e.g. concurrently or sequentially) or without (i.e., independent from, alternatively in place of) the agitating. The other conditions may be tailored to enhance the contacting, and thus reaction (i.e., hydrolysis), of the organosilanol compound (A) with the silane compound (B) to prepare the multifunctional organosilicon compound. Other conditions may be result-effective conditions for enhancing reaction yield or minimizing amount of a particular reaction by-product included within the reaction product along with the multifunctional organosilicon compound.

In certain embodiments, the reaction of components (A) and (B) is carried out in the presence of a carrier vehicle or solvent, such as one or more of those described above. For example, portions of carrier vehicle or solvent may be added to or otherwise combined with the organosilanol compound (A), the silane compound (B), the catalyst (C), and/or the reaction inhibitor (D) (i.e., when present) discretely, collectively with mixtures of components (A), (B), (C), and/or (D), or with the reaction mixture as a whole. The total amount of carrier vehicle/solvent present in the reaction mixture will be selected by one of skill in the art, e.g. based on the particular components (A), (B), and/or (C), selected, the reaction parameters employed, etc.).

The temperature of the reaction will be selected and controlled depending on the particular organosilanol compound (A) selected, the particular silane compound (B) selected, the particular catalyst (C) selected, the particular multifunctional organosilicon compound being prepared, and combinations thereof. In particular, as will be understood by those of skill in the art, the reaction temperature will typically be selected based on the particular hydrolysable groups Z of the silane compound (B). As such, the temperature will be readily selected by one of skill in the art in view of the reaction conditions and parameters selected and the description herein.

In general, the reaction may be carried out a temperature of from −78 to 100° C. However, specific ranges (e.g. from −10 to 10, from 20 to 25, from 20 to 60, etc. may be selected based on the components (A) and (B) being reacted.

In certain embodiments, the reaction is carried out at a reduced temperature. The reduced temperature is typically less than 25° C. (ambient temperature), such as from −78° C. to less than ambient temperature, alternatively from −30 to less than ambient temperature, alternatively from −15 to less than ambient temperature, alternatively from −10 to less than ambient temperature, alternatively from −10 to 20, alternatively from −5 to 20° C. In some embodiments, the reaction is carried out at a temperature of about 0° C. (e.g. by use of an ice bath, or a circulator or chiller using ice and/or a set point of 0° C.). In some embodiments, the reaction is carried out at room temperature (i.e., from 20 to 25° C.).

It is to be appreciated that the reaction temperature may also differ from the ranges set forth above. For example, in certain embodiments, the reaction is carried out at an elevated temperature, such as from greater than 25 to 100° C. In some such embodiments, the elevated temperature is from greater than 25 to 90, alternatively of from 30 to 90, alternatively of from 30 to 80, alternatively of from 30 to 60° C.

Likewise, it is also to be appreciated that reaction parameters may be modified during the reaction of components (A) and (B). For example, temperature, pressure, and other parameters may be independently selected or modified during the reaction. Any of these parameters may independently be an ambient parameter (e.g. room temperature and/or atmospheric pressure) and/or a non-ambient parameter (e.g. reduced or elevated temperature and/or reduced or elevated pressure). Any parameter, may also be dynamically modified, modified in real time, i.e., during the method, or may be static (e.g. for the duration of the reaction, or for any portion thereof).

The time during which the reaction of components (A) and (B) to prepare the multifunctional organosilicon compound is carried out is a function of scale, reaction parameters and conditions, selection of particular components, etc. In certain embodiments, the time during which the reaction is carried out is from greater than 0 to 48 hours, such as from 1 minute to 48 hours. On a relatively large scale (e.g. greater than 1, alternatively 5, alternatively 10, alternatively 50, alternatively 100 kg), the reaction may be carried out for hours, such as from 1 to 48, alternatively from 2 to 36, alternatively from 4 to 24, alternatively of 6, 12, 18, 24, 36, or 48 hours, as will be readily determined by one of skill in the art (e.g. by monitoring conversion of the organosilanol compound (A), production of the multifunctional organosilicon compound, etc., such as via chromatographic and/or spectroscopic methods). On a relatively small scale (e.g. gram-scale, or less than 10, alternatively 5, alternatively 1, kg), the reaction may be carried out for a time of from 1 minute to 4 hours, such as from 1 minute to 1 hour, from 5 to 35 minutes, or for a time of 10, 15, 20, 25, or 30 minutes.

Generally, the reaction of components (A) and (B) prepares a reaction product comprising the multifunctional organosilicon compound. In particular, over the course of the reaction, the reaction mixture comprising components (A), (B), (C), and (D) (when present) comprises increasing amounts of the multifunctional organosilicon compound and decreasing amounts of components (A) and (B). Once the reaction is complete (e.g. one of components (A) or (B) is consumed, no additional multifunctional organosilicon compound is being prepared, etc.), the reaction mixture may be referred to as a reaction product comprising the multifunctional organosilicon compound. In this fashion, the reaction product typically includes any remaining amounts of components (A), (B), (C), and (D) (when present), as well as degradation and/or reaction products thereof (e.g. materials which were not previously removed via any distillation, stripping, etc.). If the reaction is carried out in any carrier vehicle or solvent, the reaction product may also include such carrier vehicle or solvent.

In certain embodiments, the method further comprises isolating and/or purifying the multifunctional organosilicon compound from the reaction product. As used herein, isolating the multifunctional organosilicon compound is typically defined as increasing the relative concentration of the multifunctional organosilicon compound as compared to other compounds in combination therewith (e.g. in the reaction product or a purified version thereof). As such, as is understood in the art, isolating/purifying may comprise removing the other compounds from such a combination (i.e., decreasing the amount of impurities combined with the multifunctional organosilicon compound, e.g. in the reaction product) and/or removing the multifunctional organosilicon compound itself from the combination. Any suitable technique and/or protocol for isolation may be utilized. Examples of suitable isolation techniques include distilling, stripping/evaporating, extracting, filtering, washing, partitioning, phase separating, chromatography, and the like. As will be understood by those of skill in the art, any of these techniques may be used in combination (i.e., sequentially) with any another technique to isolate the multifunctional organosilicon compound. It is to be appreciated that isolating may include, and thus may be referred to as, purifying the multifunctional organosilicon compound. However, purifying the multifunctional organosilicon compound may comprise alternative and/or additional techniques as compared to those utilized in isolating the multifunctional organosilicon compound. Regardless of the particular technique(s) selected, isolation and/or purification of multifunctional organosilicon compound may be performed in sequence (i.e., in line) with the reaction itself, and thus may be automated. In other instances, purification may be a stand-alone procedure to which the reaction product comprising the multifunctional organosilicon compound is subjected.

In particular embodiments, isolating the multifunctional organosilicon compound comprises filtering the reaction product (e.g. to remove solids, salts, and other precipitated or suspended materials therefrom). In such embodiments, a solvent and/or diluent (e.g. an organic solvent, such as toluene, diethyl ether, etc.) may be utilized to solubilize and/or precipitate various components of the reaction product to facilitate isolating the multifunctional organosilicon compound, as understood by those of skill in the art. In these or other embodiments, isolating the multifunctional organosilicon compound comprises distilling and/or stripping volatiles from the reaction product. For example, in certain embodiments, such as where a carrier vehicle is utilized, volatiles are distilled and/or stripped from the reaction mixture comprising the multifunctional organosilicon. In both or either case (e.g. after removing solids via filtration and/or volatiles via stripping/distillation), the reaction product (i.e., now separated from solids and/or volatiles) may be referred to as the isolated multifunctional organosilicon compound.

In particular embodiments, the method further comprises purifying the multifunctional organosilicon compound. Any suitable technique for purification may be utilized. In certain embodiments, purifying the multifunctional organosilicon compound comprises distillation, to either remove the multifunctional organosilicon compound (e.g. as a distillate) or to strip other compounds/components therefrom (i.e., leaving the multifunctional organosilicon compound in the pot as a high-boiling component of the reaction mixture or purified reaction mixture. As will be appreciated by those of skill in the art, distilling the reaction product or purified reaction product to purify and/or isolate the multifunctional organosilicon compound is typically carried out at an elevated temperature and a reduced pressure. The elevated temperature and reduced pressure are independently selected, e.g. based on the particular components of the reaction, the particular multifunctional organosilicon compound prepared, other isolation/purification techniques utilized, etc., as will be readily determined by those of skill in the art. In some embodiments, purifying the multifunctional organosilicon compound may be defined as purifying the isolated multifunctional organosilicon compound (e.g.

where purification is performed subsequent to isolation of the multifunctional organosilicon compound).

A functionalized siloxane compound is also provided. The functionalized siloxane compound has the following general formula:

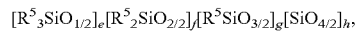

where subscripts e, f, g, and h are each mole fractions such that e+f+g+h=1, with the proviso that e+f+g>0; and each $R^5$ is independently selected and described below.

With respect to the general formula of the functionalized siloxane compound above, one of skill in the art will understand that the moieties indicated by subscripts e, f, g, and h represent siloxy groups corresponding to [M], [D], [T], and [Q] units, respectively, which are each structural units of individual functionality present in organopolysiloxanes. More specifically, in accordance with conventional silicone nomenclature understood by those of skill in the art, [M] represents the monofunctional unit of general formula $R^5_3SiO_{1/2}$; [D] represents the difunctional unit of general formula $R^5_2SiO_{2/2}$; [T] represents the trifunctional unit of general formula $R^5SiO_{3/2}$; and [Q] represents the tetrafunctional unit of general formula $SiO_{4/2}$, as shown by the general formulas of the siloxy groups below:

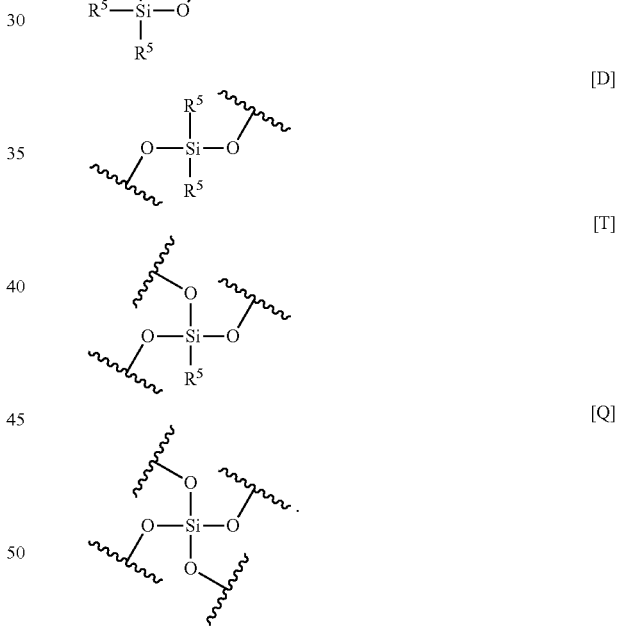

With specific regard to the functionalized siloxane compound and, specifically, the [M], [D], and [T] siloxy units thereof), each $R^5$ is independently selected and may be the same or different from any other $R^5$ of the functionalized siloxane compound. Moreover, each $R^5$ of each particular [M] and/or [D] siloxy unit may be the same or different as any other, or each other, $R^5$ of the same siloxy unit. In certain embodiments, the functionalized siloxane compound comprises at least 2, alternatively at least 3, alternatively at least 4, $R^5$ substituents that are not the same as one another.

As understood in the art, specific substituents suitable for siloxy units, such as those of the functionalized siloxane compound are generally not limited, and may be monovalent or polyvalent, monoatomic or polyatomic, organic or inorganic, linear or branched, substituted or unsubstituted, aromatic, aliphatic, saturated or unsaturated, and combinations thereof. General substituents suitable for $R^5$ include hydrocarbyl group, siloxy groups, and H. More specifically, each $R^5$ is typically independently selected from substituted or unsubstituted hydrocarbyl groups, siloxy groups, and H. However, any $R^5$ may comprise a combination of such hydrocarbyl groups and siloxy groups, as will be appreciated from the description herein.

Examples of suitable substituted or unsubstituted hydrocarbyl groups for use as $R^5$ are set forth above with respect to R. As such, the examples of hydrocarbyl groups suitable for R described herein apply equally to $R^5$. Said differently, any $R^5$ may comprise, alternatively be, any of the hydrocarbyl groups described herein, such as those described above with respect to substituents R, and the various derivatives, modifications, and combinations thereof, as will be readily understood by those of skill in the art.

Examples of suitable siloxy groups for use in, or as, $R^5$ may comprise [M], [D], [T], and [Q] units, which, as described above, each represent structural units of individual functionality present in organopolysiloxanes. With respect to substituent $R^5$, suitable siloxy units for use therein include [M] units of general formula $R^6{}_3SiO_{1/2}$; [D] units of general formula $R^6{}_2SiO_{2/2}$; [T] units of general formula $R^6SiO_{3/2}$; and [Q] units of general formula $SiO_{4/2}$; where each $R^6$ is independently selected from H and substituted an unsubstituted hydrocarbyl groups, such as any of those described herein. Typically, each $R^6$ is an independently selected alkyl group. In particular embodiments, each $R^6$ is methyl.

While each $R^5$ of the functionalized siloxane compound is independently selected, at least one $R^5$ is an organosilicon moiety having the general formula:

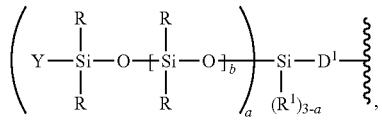

which is referred to herein as the "organosilicon moiety A." One of skill in the art will readily understand the particular variations of limitations of the organosilicon moiety A in view of the description of the multifunctional organosilicon compound above. As such, where formulas, structures, moieties, groups, or other such motifs are shared between the organosilicon moiety A and the multifunctional organosilicon compound (and, likewise, the relevant portions of the organosilanol compound (A) and/or silane compound (B) used in the preparation method), the above description with respect to such shared motifs may equally describe the organosilicon moiety A (e.g. with respect to each R, $R^1$, subscript a, subscript b, functional moiety Y, etc.).

With regard to the organosilicon moiety A in particular, each Y is independently selected from alkoxysilane moieties, acryloxy moieties, and epoxide moieties; each R is an independently selected hydrocarbyl group; each $R^1$ is an independently selected hydrocarbyl group; each $D^1$ is an independently selected divalent linking group; subscript a is 1, 2, or 3; and each subscript b is independently 0, 1, or 2. One of skill in the art will readily envisage the various configurations of the organosilicon moiety A in view of the descriptions herein. For example, in some embodiments, each R is methyl. In these or other embodiments, each $R^1$ is methyl. In these or other embodiments, subscript b is independently 0 or 1 in each moiety designated by subscript a.

Each $D^1$ (i.e., $D^1$ of each organosilicon moiety A of the functionalized siloxane compound) is an independently selected divalent linking group. Typically, each $D^1$ is a substituted or unsubstituted hydrocarbon group. For example, in some embodiments, $D^1$ comprises a hydrocarbon moiety having the formula $-(CH_2)_m-$, where subscript m is from 1 to 16, alternatively from 1 to 6. Typically, subscript m is at least 2, such that $D^1$ comprises, alternatively is, an ethylene group.

With regard to the functionalized siloxane compound as a whole, the majority of the substituents $R^5$ are typically unsubstituted hydrocarbyl groups. For example, in particular embodiments, the majority of substituents $R^5$ of the functionalized siloxane compound are methyl groups. In these or other embodiments, at least one, alternatively at least two, substituents $R^5$ of the functionalized siloxane compound are H. In these or other embodiments, at least one, alternatively at least two, substituents $R^5$ of the functionalized siloxane compound alkenyl or alkynyl groups. In these or other embodiments, at least one, alternatively at least two, alternatively at least three substituents $R^5$ are the organosilicon moiety A.

It will be appreciated by those of skill in the art that the siloxy moieties indicated by subscripts e, f, g, and h of the functionalized siloxane compound correspond to the [M], [D], [T], and [Q] siloxy units, respectively, as introduced and described above. In some embodiments, the functionalized siloxane compound comprises repeating [D] units, i.e., where subscript f>0. In these embodiments, subscript f is typically a value of from 0.3 to 1 (e.g. 0.3≤f≤1), such as from 0.3 to 0.9999, alternatively from 0.3 to 0.999, alternatively from 0.3 to 0.99, alternatively from 0.3 to 0.9, alternatively from 0.5 to 0.999, alternatively from 0.6 to 0.999, alternatively from 0.7 to 0.99, alternatively from 0.8 to 0.99, alternatively from 0.85 to 0.99, alternatively from 0.9 to 0.99. Subscript e is typically a value of from 0 to 0.1 (0≤e≤0.1), such as from 0 to 0.099, alternatively from 0 to 0.09, alternatively from 0 to 0.085, alternatively from 0 to 0.08, alternatively from 0 to 0.075, alternatively from 0 to 0.07, alternatively from 0 to 0.065, alternatively from 0 to 0.06, alternatively from 0 to 0.055, alternatively from 0 to 0.05, alternatively from 0.001 to 0.05, alternatively from 0.002 to 0.05, alternatively from 0.005 to 0.01. Subscripts g and h are typically each an independently selected value of from 0 to 0.1 (e.g. 0≤g≤0.1 and 0≤h≤0.1), such as from 0 to 0.09, alternatively from 0 to 0.075, alternatively from 0 to 0.05, alternatively from 0 to 0.025, alternatively from 0 to 0.009, alternatively from 0 to 0.001, alternatively from 0 to 0.0001. In certain embodiments, the functionalized siloxane compound comprises a linear siloxane segment, where subscript f is from 0.9 to 1, subscript e is from 0 to 0.1, and subscripts g and h are each 0. When the functionalized siloxane compound comprises repeating [D] units, the number of specific [D] units (i.e., the degree of polymerization, DP) in any one siloxane segment is not limited. Typically, such siloxane segments comprise from 1 to 700 repeating [D] units, such as from 2 to 600, alternatively from 2 to 500, alternatively from 5 to 400, alternatively from 5 to 300, alternatively from 10 to 250, alternatively from 10 to 200, alternatively from 15 to 150, alternatively from 15 to 100, alternatively from 15 to 50 repeating [D] units.

The presence and proportion of [M], [D], [T], and [Q] units in the functionalized siloxane compound is independently selected, as is the particular substituent for each $R^5$ of each siloxy unit thereof, as well as each $R^6$ of any particular siloxy unit. Overall, a proportion of [T] and [Q] units of or around 0 is typically selected to increase the linearity of the functionalized siloxane compound, such as when the functionalized siloxane compound comprises, alternatively is, a linear organopolysiloxane. It is understood by those of skill in the art that such organopolysiloxanes are typically linear or substantially linear, but may include some branching attributable to [T] and/or [Q] units (e.g. where g+h>0). The proportion of [T] and/or [Q] units is selected to be greater than 0 when the functionalized siloxane compound is branched or resinous. Accordingly, one of skill in the art will select the composition of the siloxane segments to control the composition of the functionalized siloxane compound e.g. based on a desired desired/intended property and/or characteristic (e.g. physical, chemical, aesthetic, etc.) of the functionalized siloxane compound or a composition prepared therewith. For example, it may be desirable for the functionalized siloxane compound and/or a composition prepared therewith to have a high melting temperature and/or softening point, or for a formulation prepared therewith to be in a specific form (e.g. the form of a solid, gel, etc.), and selecting the composition of the functionalized siloxane compound may allow one of skill in the art to achieve a range of such desirable properties. In general, linear siloxane segments are utilized in organopolysiloxanes to form layers or coatings with improved feel (e.g. comfortable deposit) and flexibility as compared to those using organopolysiloxanes including increased branching attributable to [T] and/or [Q] units. Likewise, resinous organopolysiloxanes are used to form products with increased hardness, transfer resistance, etc., as compared to those where more linear organopolysiloxanes are utilized.

A method of preparing the functionalized siloxane compound (the "second preparation method" or "second method") is also provided. The second method includes reacting the multifunctional organosilicon compound and a polysiloxane in the presence of a hydrosilylation catalyst, thereby preparing the preparing the functionalized siloxane compound.

As will be understood by one of skill in the art in view of the description herein, the polysiloxane utilized in the second method forms a portion of the functionalized siloxane compound corresponding to general formula of the functionalized siloxane compound introduced and described above, and the multifunctional organosilicon compound utilized in the second method forms a portion of the siloxane compound corresponding to general formula of the functionalized siloxane compound corresponding to the organosilicon moiety A.

The divalent linking group $D^1$ of the functionalized siloxane compound is generally formed during the preparation method by the reaction of the multifunctional organosilicon compound and the polysiloxane. More specifically, as will be understood in view of the description herein, the preparation method generally includes coupling together the multifunctional organosilicon compound and the polysiloxane via hydrosilylation reaction. As such, the multifunctional organosilicon compound and the polysiloxane each comprise a hydrosilylatable group, which are selected to facilitate the hydrosilylative coupling of the compounds. Said differently, and as described in further detail below, one of the multifunctional organosilicon compound and the polysiloxane comprises an ethylenically unsaturated group, and the other comprises a silicon-bonded hydrogen atom. The hydrosilylation of these hydrosilylatable groups, collectively, forms the divalent linking group $D^1$ of the functionalized siloxane compound. As will be understood by those of skill in the art in view of the description herein, the hydrosilylatable groups need not form the entire divalent linking group $D^1$, but may instead form a portion thereof.

In general, the multifunctional organosilicon compound includes the silicon-bonded hydrogen atom when the polysiloxane includes the ethylenically unsaturated group, and the multifunctional organosilicon compound includes the silicon-bonded ethylenically unsaturated group when the polysiloxane includes the silicon-bonded hydrogen atom. The particular selection between these two scenarios will be made by one of skill in the art, e.g. in view of the particular functionalized siloxane being prepared, the particular multifunctional organosilicon compound being utilized, and/or the particular polysiloxane being utilized. Specific factors that may be utilized in this selection include the sterics, electronics, reactivity, ease of preparation, and/or commercial availability of the various multifunctional organosilicon compounds and polysiloxanes described herein.

The multifunctional organosilicon compound is described in detail above. With reference to the multifunctional organosilicon compound, and as will be understood in view of the description herein, substituent X comprises one of the hydrosilylatable groups, which, collectively, form the divalent linking group $D^1$ of the functionalized siloxane. In particular, X is selected from H and ethylenically unsaturated moieties. As introduced above, when X is H, the polysiloxane includes an ethylenically unsaturated group, as described in further detail below. Likewise, when X comprises the ethylenically unsaturated group, the polysiloxane comprises a silicon-bonded hydrogen atom.

In certain embodiments, X of the multifunctional organosilicon compound is H. In other embodiments, X of the multifunctional organosilicon compound is an ethylenically unsaturated moiety. Examples of suitable ethylenically unsaturated moieties are as described above, and generally include substituted and unsubstituted hydrocarbon groups having at least one alkene or alkyne functional group. For example, in certain embodiments, X comprises, alternatively is, an alkenyl group or an alkynyl group. In certain embodiments, X comprises, alternatively is, an alkenyl moiety having the formula $—(CH_2)_n CHCH_2$, where subscript n is from 0 to 4. In certain embodiments, X of the multifunctional organosilicon compound is an ethylenically unsaturated moiety having the general formula $-[D^2]_i-R^6$, where each $D^2$ is an independently selected divalent group; subscript i is 0 or from 1 to 10; and $R^6$ is an alkenyl group or alkyl group, such as one of the alkenyl group or alkyl groups described above. In specific embodiments, subscript i is 1 and $D^2$ comprises a moiety having the general formula $—(CH_2)_j$, where $1 \leq j \leq 10$.

As will be appreciated from the description of the functionalized siloxane compound, which will be understood to equally apply to the second method unless indicated otherwise, the selection of each of R, $R^1$, Y, subscript a, and subscript b of the multifunctional organosilicon compound is limited only by the bounds and provisos described herein, and thus includes any and all selections and combination of selections necessary for preparing the functionalized siloxane compound as described above.

The polysiloxane has the general formula:

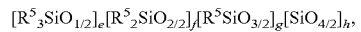

where each $R^5$ and subscripts e, f, g, and h are as defined above with respect to of the functionalized siloxane compound, with the proviso that at least one $R^5$ is a hydrosilylatable moiety comprising a silicon-bonded hydrogen atom or the ethylenically unsaturated group.

The hydrosilylatable moiety $R^5$ of the polysiloxane comprises one of the hydrosilylatable groups, which, collectively, form the divalent linking group $D^1$ of the functionalized siloxane. As such, the hydrosilylatable moiety $R^5$ of the polysiloxane of the functional compound may comprise a silicon-bonded hydrogen atom or an ethylenically unsaturated group. Likewise, when the hydrosilylatable moiety $R^5$ of the polysiloxane comprises a silicon-bonded hydrogen atom, the substituent X of the multifunctional organosilicon compound comprises the ethylenically unsaturated group. Similarly, when the hydrosilylatable moiety $R^5$ of the polysiloxane comprises the ethylenically unsaturated group, substituent X of the multifunctional organosilicon compound is H.

Specific examples of suitable ethylenically unsaturated groups for the hydrosilylatable moiety $R^5$ of the polysiloxane include those ethylenically unsaturated groups described herein. For example, in certain embodiments, the hydrosilylatable moiety $R^5$ of the polysiloxane comprises, alternatively is, an alkenyl group or an alkynyl group, such as any of those described above. As another example, in certain embodiments, the hydrosilylatable moiety $R^5$ of the polysiloxane comprises, alternatively is, an alkenyl moiety having the formula $-(CH_2)_oCHCH_2$, where subscript o is from 0 to 4. In certain embodiments, the hydrosilylatable moiety $R^5$ of the polysiloxane comprises a hydrosilylatable group having the general formula $R^8-[D^3]_j$-, where each $D^3$ is an independently selected divalent group; subscript j is 0 or from 1 to 10; and $R^8$ is a silicon bonded hydrogen atom or an alkenyl group of formula $CH_2C(R^9)-$, where $R^9$ is a hydrocarbyl group having from 1 to 6 carbon atoms, an alkoxy group, a silyl group, or H. In some such embodiments, $D^3$ comprises a moiety having the general formula $-(CH_2)_d$, where $1 \leq d \leq 10$.

The hydrosilylation catalyst is not limited and may be any known hydrosilylation catalyst for catalyzing hydrosilylation reactions. Combinations of different hydrosilylation catalysts may be utilized.

In certain embodiments, the hydrosilylation catalyst comprises a Group VIII to Group XI transition metal. Group VIII to Group XI transition metals refer to the modern IUPAC nomenclature. Group VIII transition metals are iron (Fe), ruthenium (Ru), osmium (Os), and hassium (Hs); Group IX transition metals are cobalt (Co), rhodium (Rh), and iridium (Ir); Group X transition metals are nickel (Ni), palladium (Pd), and platinum (Pt); and Group XI transition metals are copper (Cu), silver (Ag), and gold (Au). Combinations thereof, complexes thereof (e.g. organometallic complexes), and other forms of such metals may be utilized as the hydrosilylation catalyst.

Additional examples of catalysts suitable for the hydrosilylation catalyst include rhenium (Re), molybdenum (Mo), Group IV transition metals (i.e., titanium (Ti), zirconium (Zr), and/or hafnium (Hf)), lanthanides, actinides, and Group I and II metal complexes (e.g. those comprising calcium (Ca), potassium (K), strontium (Sr), etc.). Combinations thereof, complexes thereof (e.g. organometallic complexes), and other forms of such metals may be utilized as the hydrosilylation catalyst.

The hydrosilylation catalyst may be in any suitable form. For example, the hydrosilylation catalyst may be a solid, examples of which include platinum-based catalysts, palladium-based catalysts, and similar noble metal-based catalysts, and also nickel-based catalysts. Specific examples thereof include nickel, palladium, platinum, rhodium, cobalt, and similar elements, and also platinum-palladium, nickel-copper-chromium, nickel-copper-zinc, nickel-tungsten, nickel-molybdenum, and similar catalysts comprising combinations of a plurality of metals. Additional examples of solid catalysts include Cu—Cr, Cu—Zn, Cu—Si, Cu—Fe—Al, Cu—Zn—Ti, and similar copper-containing catalysts, and the like.

The hydrosilylation catalyst may be in or on a solid carrier. Examples of carriers include activated carbons, silicas, silica aluminas, aluminas, zeolites and other inorganic powders/particles (e.g. sodium sulphate), and the like. The hydrosilylation catalyst may also be disposed in a vehicle, e.g. a solvent which solubilizes the hydrosilylation catalyst, alternatively a vehicle which merely carries, but does not solubilize, the hydrosilylation catalyst. Such vehicles are known in the art.

In specific embodiments, the hydrosilylation catalyst comprises platinum. In these embodiments, the hydrosilylation catalyst is exemplified by, for example, platinum black, compounds such as chloroplatinic acid, chloroplatinic acid hexahydrate, a reaction product of chloroplatinic acid and a monohydric alcohol, platinum bis(ethylacetoacetate), platinum bis(acetylacetonate), platinum chloride, and complexes of such compounds with olefins or organopolysiloxanes, as well as platinum compounds microencapsulated in a matrix or core-shell type compounds. Microencapsulated hydrosilylation catalysts and methods of their preparation are known in the art, as exemplified in U.S. Pat. Nos. 4,766,176 and 5,017,654, which are incorporated by reference herein in their entireties.

Complexes of platinum with organopolysiloxanes suitable for use as the hydrosilylation catalyst include 1,3-diethenyl-1,1,3,3-tetramethyldisiloxane complexes with platinum. These complexes may be microencapsulated in a resin matrix. Alternatively, the hydrosilylation catalyst may comprise 1,3-diethenyl-1,1,3,3-tetramethyldisiloxane complex with platinum. The hydrosilylation catalyst may be prepared by a method comprising reacting chloroplatinic acid with an aliphatically unsaturated organosilicon compound such as divinyltetramethyldisiloxane, or alkene-platinum-silyl complexes. Alkene-platinum-silyl complexes may be prepared, for example by mixing 0.015 mole (COD)$PtCl_2$ with 0.045 mole COD and 0.0612 moles $HMeSiCl_2$, where COD represents cyclooctadiene.

Additional examples of suitable hydrosilylation catalysts for component are described in, for example, U.S. Pat. Nos. 3,159,601; 3,220,972; 3,296,291; 3,419,593; 3,516,946; 3,814,730; 3,989,668; 4,784,879; 5,036,117; and 5,175,325; the disclosures of which are incorporated herein by reference in their entireties.

The hydrosilylation catalyst may also, or alternatively, be a photoactivatable hydrosilylation catalyst, which may initiate curing via irradiation and/or heat. The photoactivatable hydrosilylation catalyst can be any hydrosilylation catalyst capable of catalyzing the hydrosilylation reaction, particularly upon exposure to radiation having a wavelength of from 150 to 800 nanometers (nm).

The multifunctional organosilicon compound and the polysiloxane are typically reacted in a molar ratio of from 1.5:1 to 1:1.5, alternatively from 1.4:1 to 1:1.4, alternatively from 1.3:1 to 1:1.3, alternatively from 1.2:1 to 1:1.2, alternatively from 1.1:1 to 1:1.1, alternatively from 1.1:1 to 1:1. However, one of skill in the art will select the particular ratios utilized, e.g. in view of the particular functionalized siloxane compound being prepared, the particular multifunctional organosilicon compound and/or polysiloxane being utilized, a desired use of the functionalized siloxane compound, etc.

An adhesive composition comprising the functionalized siloxane compound is also provided. In general, the adhesive composition comprises the functionalized siloxane compound, but is not otherwise limited. Rather, as will be understood in view of the description herein, the adhesive composition may be formulated in any fashion known in the art and suitable for use with the functionalized siloxane compound.

In certain embodiments, the adhesive composition comprises a condensation reaction catalyst. In such embodiments, the condensation reaction catalyst is not limited and, in some embodiments, is exemplified by tin catalysts, titanium catalysts, zirconate catalysts, and zirconium catalysts. General examples of suitable tin catalysts include organotin compounds where the valence of the tin is either +4 or +2 (e.g. tin (IV) compounds and/or tin (II) compounds). Specific examples of tin (IV) compounds include stannic salts of carboxylic acids such as dibutyl tin dilaurate, dimethyl tin dilaurate, di-(n-butyl)tin bis-ketonate, dibutyl tin diacetate, dibutyl tin maleate, dibutyl tin diacetylacetonate, dibutyl tin dimethoxide, carbomethoxyphenyl tin tris-uberate, dibutyl tin dioctanoate, dibutyl tin diformate, isobutyl tin triceroate, dimethyl tin dibutyrate, dimethyl tin di-neodeconoate, dibutyl tin di-neodeconoate, triethyl tin tartrate, dibutyl tin dibenzoate, butyltintri-2-ethylhexanoate, dioctyl tin diacetate, tin octylate, tin oleate, tin butyrate, tin naphthenate, dimethyl tin dichloride, a combination thereof, and/or a partial hydrolysis product thereof. Additional examples of tin (IV) compounds are known in the art and are commercially available, such as Metatin® 740 and Fascat® 4202 from Acima Specialty Chemicals of Switzerland, Europe, which is a business unit of The Dow Chemical Company, as well as Formrez® UL-28 from Galata Chemicals of Hahnville, LA Specific examples of tin (II) compounds include tin (II) salts of organic carboxylic acids such as tin (II) diacetate, tin (II) dioctanoate, tin (II) diethylhexanoate, tin (II) dilaurate, stannous salts of carboxylic acids such as stannous octoate, stannous oleate, stannous acetate, stannous laurate, stannous stearate, stannous naphthanate, stannous hexanoate, stannous succinate, stannous caprylate, and a combination thereof. Examples of suitable titanium catalysts include titanium esters such as tetra-n-butyltitanate tetraisopropyltitanate, tetra-2-ethylhexyltitanate, tetraphenyltitanate, triethanolamine titanate, organosiloxytitanium compounds, and dicarbonyl titanium compounds, such as titanium ethyl acetoacetate, diisopropoxydi(ethoxyacetoacetyl) titanium and bis(acetoacetonyl)-diisopropoxy titanium (IV). Many of these titanium catalysts are commercially available, such as Tyzor™ DC, Tyzor™ TnBT, and Tyzor™ 9000 from Dorf Ketal Specialty Catalysts LLC of Houston, TX In certain embodiments, the condensation reaction catalyst is a titanium catalyst, such as one of those exemplified above, e.g. where the adhesive composition is or may be formulated as a room temperature vulcanizing adhesive composition. The amount of the condensation reaction catalyst present in the adhesive composition depends on various factors (e.g. the amount and/or type of the functionalized siloxane compound, the types and/or amounts of any additional materials present in the adhesive composition, etc.), and may be readily determined by one of skill in the art. Typically, the adhesive composition comprises the condensation reaction catalyst in an amount of from 0.2 to 6, alternatively from 0.5 to 3, parts by weight based on the total weight of the functionalized siloxane compound present in the adhesive composition.

In some embodiments, the adhesive composition further comprises one or more additives. Examples of suitable additives that may be present in the adhesive composition include fillers, treating agents (e.g. filler treating agents), cross-linkers, adhesion promotors, surface modifiers, drying agents, extenders, biocides, flame retardants, plasticizers, end-blockers, binders, anti-aging additives, water release agents, pigments, rheology modifiers, carriers, tackifying agents, corrosion inhibitors, catalyst inhibitors, viscosity modifiers, UV absorbers, anti-oxidants, light-stabilizers, and the like, as well as combinations thereof.

In certain embodiments, the adhesive composition includes a filler. The filler may be or comprise a reinforcing filler, an extending filler, a conductive filler (e.g., electrically conductive, thermally conductive, or both), or the like, or a combination thereof. Examples of suitable reinforcing fillers include precipitated calcium carbonates and reinforcing silica fillers such as fume silica, silica aerogel, silica xerogel, and precipitated silica. Specific suitable precipitated calcium carbonates include Winnofil® SPM from Solvay and Ultrapflex® and Ultrapflex® 100 from Specialty Minerals, Inc. Examples of fumed silicas are known in the art and are commercially available, such as those sold under the name CAB-O-SIL by Cabot Corporation of Massachusetts, U.S.A. Examples of suitable extending fillers include crushed quartz, aluminum oxide, magnesium oxide, calcium carbonate such as ground calcium carbonate, precipitated calcium carbonate, zinc oxide, talc, diatomaceous earth, iron oxide, clays, mica, chalk, titanium dioxide, zirconia, sand, carbon black, graphite, or a combination thereof. Examples of extending fillers are known in the art and are commercially available, including ground quartz sold under the name MIN-U-SIL by U.S. Silica of Berkeley Springs, WV. Other examples of commercially available extending fillers include calcium carbonates sold under the name CS-11 from Imerys, G3T from Huber, Pfinyl 402 from Specialty Minerals, Inc. and Omyacarb 2T from Omya. The amount of the filler present in the adhesive composition depends on various factors (e.g. the amount and/or type of the functionalized siloxane compound, the types and/or amounts of any additional materials present in the adhesive composition, etc.), and may be readily determined by one of skill in the art. The exact amount of the filler employed in a specific implementation of the adhesive composition will also depend on whether more than one type of filler is utilized. Typically, where present, the adhesive composition comprises the filler in an amount of from 0.1 to 95, alternatively from 1 to 60, alternatively from 1 to 20 wt. %, based on the weight of the adhesive composition.

In particular embodiments, the adhesive composition comprises a treating agent. The treating agent is not limited, and may be any treating agent suitable for use in treating (e.g. surface treating) an additive of the adhesive composition, such as the filler and other additives (e.g. physical drying agents, flame retardants, pigments, and/or water release agents) which may be present in the adhesive composition. More specifically, solid and/or particulate additives may be treated with the treating agent before being added to the adhesive composition. Alternatively, or in addition, solid and/or particulate additives may be treated with the treating agent in situ. General examples of suitable treating agents include those comprising an alkoxysilane, an alkoxy-functional oligosiloxane, a cyclic polyorganosiloxane, a hydroxyl-functional oligosiloxane (e.g. dimethyl siloxane or methyl phenyl siloxane), a fatty acid (e.g. a stearate, such as calcium stearate), and the like, as well as combinations thereof. Specific examples of treating agents include alkylthiols, fatty acids, titanates, titanate coupling agents, zirconate coupling agents, and the like, as well as combinations thereof.

In some embodiments, the treating agent is or comprises an organosilicon filler treating agent. Examples of such organosilicon filler treating agents include compositions suitable for treating silica fillers, such as organochlorosilanes, organosiloxanes, organodisilazanes (e.g. hexaalkyl disilazane), and organoalkoxysilanes (e.g. $CH_3Si(OCH_3)_3$, $C_6H_{13}Si(OCH_3)_3$, $C_8H_{17}Si(OC_2H_5)_3$, $C_{10}H_{21}Si(OCH_3)_3$, $C_{12}H_{25}Si(OCH_3)_3$, $C_{14}H_{29}Si(OC_2H_5)_3$, $C_6H_5CH_2CH_2Si(OCH_3)_3$, etc.), and the like. In these or other embodiments, the treating agent is or comprises an alkoxysilane having the formula (X): $R^{10}{}_A Si(OR^{11})_{4-A}$. In formula (X), subscript A is an integer of from 1 to 3, such as 1, 2, or 3. Each $R^{10}$ is an independently selected monovalent organic group, such as a monovalent hydrocarbon group having from 1 to 50 carbon atoms, alternatively from 8 to 30 carbon atoms, alternatively from 8 to 18 carbon atoms, alternatively from 1 to 5 carbon atoms. $R^{10}$ may be saturated or unsaturated, and branched or unbranched. Alternatively, $R^{10}$ may be saturated and unbranched. $R^{10}$ is exemplified by alkyl groups such as methyl, ethyl, hexyl, octyl, dodecyl, tetradecyl, hexadecyl, and octadecyl; alkenyl groups such as vinyl; and aromatic groups such as benzyl and phenylethyl. Each $R^{11}$ is an independently selected saturated hydrocarbon group having from 1 to 4 carbon atoms, alternatively from 1 to 2 carbon atoms. Specific examples of organosilicon filler treating agents also include hexyltrimethoxysilane, octyltriethoxysilane, decyltrimethoxysilane, dodecyltrimethoxysilane, tetradecyltrimethoxysilane, phenylethyltrimethoxysilane, octadecyltrimethoxysilane, octadecyltriethoxysilane, and combinations thereof.

In some embodiments, the treating agent is or comprises an alkoxy-functional oligosiloxanes. Examples of suitable alkoxy-functional oligosiloxanes include those having the general formula (XI): $(R^{12}O)_B Si(OSiR^{13}{}_2 R^{14})_{(4-B)}$. In formula (XI), subscript B is 1, 2 or 3. In specific embodiments, subscript B is 3. Each $R^{12}$ is an independently selected alkyl group. Each $R^{13}$ is an independently selected unsaturated monovalent hydrocarbon group having from 1 to 10 carbon atoms. Each $R^{14}$ is an independently selected unsaturated monovalent hydrocarbon group having at least 10 carbon atoms.

In certain embodiments, the treating agent is or comprises a polyorganosiloxane capable of hydrogen bonding. Such treating agents utilize multiple hydrogen bonds, which are clustered and/or dispersed, as a means to tether a compatibilization moiety to a surface of the adhesive composition component to be treated (e.g. the filler). Suitable polyorganosiloxanes capable of hydrogen bonding have an average, per molecule, of at least one silicon-bonded group capable of hydrogen bonding, which is typically selected from organic groups having multiple hydroxyl functionalities, organic groups having at least one amino functional group, and combinations thereof. In other words, the polyorganosiloxane capable of hydrogen bonding typically utilizes hydrogen bonding as a primary mode of attachment to the filler. As such, in some embodiments, the polyorganosiloxane is incapable of forming covalent bonds with the filler. The polyorganosiloxane may be free of condensable silyl groups (e.g. silicon bonded alkoxy groups, silazanes, and silanols). Examples of suitable polyorganosiloxanes for use in or as the adhesive composition include saccharide-siloxane polymers, amino-functional polyorganosiloxanes, and a combination thereof. In specific embodiments, the adhesive composition comprises a polyorganosiloxane comprising a saccharide-siloxane polymer.

The amount of the treating agent present in the adhesive composition depends on various factors (e.g. the amount and/or type of the functionalized siloxane compound, the types and/or amounts of any additional materials present in the adhesive composition (such as those treated with the treating agent), etc.), and may be readily determined by one of skill in the art. Typically, the amount of the treating agent varies depending on the type of treating agent selected, the type and/or amount of particulates to be treated, and whether the particulates are treated before being added to the adhesive composition or in situ. Typically, where present, the adhesive composition comprises the treating agent in an amount of from 0.01 to 20, alternatively from 0.1 to 15, alternatively from 0.5 to 5 wt. %, based on the weight of the adhesive composition.

In some embodiments, the adhesive composition comprises a polymer additive, such as crosslinkers, chain extenders, plasticizers, end-blockers, and the like, or combinations thereof. In general, suitable polymer additives include compounds having functional groups that are reactive with functional groups present in the functionalized siloxane compound of the adhesive composition, or with functional groups present in another polymer additive that has been reacted therewith. Certain polymer additives may be named based on an intended function (e.g. to cross-link, to chain-extend, to end-block, etc.). However, it is to be appreciated that there may be overlap in functions between types of polymer additives because certain polymer additives described herein may have more than one function as will be readily appreciated by one of skill in the art. For examples, suitable crosslinkers include those comprising a compound having an average, per molecule, of two or more substituents reactive with alkoxy groups present within the functionalized siloxane compound, and suitable chain extenders include those comprising a compound having an average, per molecule, of two substituents reactive with alkoxy groups present within the functionalized siloxane compound or with groups present within another polymer additive reacted with the functionalized siloxane compound. Accordingly, as is understood by those of skill in the art, various compounds may be used as a cross-linker and/or a chain extender. Similarly, various plasticizers, which are exemplified by the particular plasticizers described below, may also be interchangeably utilized in or as a crosslinker and/or a chain extender of the adhesive composition.

In some embodiments, the adhesive composition comprises a crosslinker. Some examples of suitable crosslinkers include silane crosslinkers having hydrolyzable groups, or partial or full hydrolysis products thereof. Examples of such silane crosslinkers include those including a silicon compound having the general formula (XII): $R^{15}{}_C Si(R^{16})_{(4-C)}$, where each $R^{15}$ is an independently selected monovalent hydrocarbon group, such as an alkyl group; each $R^{16}$ is a hydrolyzable substituent, for example, a halogen atom, an acetamido group, an acyloxy group such as acetoxy, an alkoxy group, an amido group, an amino group, an aminoxy group, a hydroxyl group, an oximo group, a ketoximo group, or a methylacetamido group; and subscript C is 0-3, such as 0, 1, 2, or 3. Typically, subscript C has an average value greater than 2. Alternatively, subscript C may have a value ranging from 3 to 4. Typically, each $R^{16}$ is independently selected from hydroxyl, alkoxy, acetoxy, amide, or oxime. Specific examples of suitable silane crosslinkers include methyldiacetoxymethoxysilane, methylacetoxydimethoxysilane, vinyldiacetoxymethoxysilane, vinylacetoxydimethoxysilane, methyldiacetoxyethoxysilane, metylacetoxydiethoxysilane, and combinations thereof.

In some embodiments, the crosslinker includes an acyloxysilane, an alkoxysilane, a ketoximosilane, an oximosilane, or the like, or combinations thereof.

Examples of suitable acetoxysilane crosslinkers include tetraacetoxysilanes, organotriacetoxysilanes, diorganodiacetoxysilanes, and combinations thereof. The acetoxysilane may contain alkyl groups such as methyl, ethyl, propyl, isopropyl, butyl, and tertiary butyl; alkenyl groups such as vinyl, allyl, or hexenyl; aryl groups such as phenyl, tolyl, or xylyl; aralkyl groups such as benzyl or 2-phenylethyl; and fluorinated alkyl groups such as 3,3,3-trifluoropropyl. Exemplary acetoxysilanes include tetraacetoxysilane, methyltriacetoxysilane, ethyltriacetoxysilane, vinyltriacetoxysilane, propyltriacetoxysilane, butyltriacetoxysilane, phenyltriacetoxysilane, octyltriacetoxysilane, dimethyldiacetoxysilane, phenylmethyldiacetoxysilane, vinylmethyldiacetoxysilane, diphenyl diacetoxysilane, tetraacetoxysilane, and combinations thereof. In some embodiments, the crosslinker comprises organotriacetoxysilanes, for example mixtures comprising methyltriacetoxysilane and ethyltriacetoxysilane.

Examples of suitable aminofunctional alkoxysilanes suitable for use in or as the crosslinker are exemplified by $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_2NH(CH_2)_3Si(OCH_3)_3$, $C_4H_9NH(CH_2)_2NH(CH_2)_3Si(OCH_2CH_3)_3$, $H_2N(CH_2)_2SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3(OCH_3)_2$, $CH_3NH(CH_2)_5SiCH_3(OCH_2CH_3)_2$, $H_2N(CH_2)_2NH(CH_2)_3SiCH_3(OCH_3)_2$, $H_2N(CH_2)_2NH(CH_2)_3SiCH_3(OCH_2CH_3)_2$, $CH_3NH(CH_2)_2NH(CH_2)_3SiCH_3(OCH_3)_2$, $CH_3NH(CH_2)_2NH(CH_2)_3SiCH_3(OCH_2CH_3)_2$, $C_4H_9NH(CH_2)_2NH(CH_2)_3SiCH_3(OCH_3)_2$, $C_4H_9NH(CH_2)_2NH(CH_2)_3SiCH_3(OCH_2CH_3)_2$, and combinations thereof.

Examples of suitable oximosilane crosslinkers include alkyltrioximosilanes such as methyltrioximosilane, ethyltrioximosilane, propyltrioximosilane, and butyltrioximosilane; alkoxytrioximosilanes such as methoxytrioximosilane, ethoxytrioximosilane, and propoxytrioximosilane; or alkenyltrioximosilanes such as propenyltrioximosilane or butenyltrioximosilane; alkenyloximosilanes such as vinyloximosilane; alkenylalkyldioximosilanes such as vinyl methyl dioximosilane, vinyl ethyldioximosilane, vinyl methyldioximosilane, or vinylethyldioximosilane; or combinations thereof.

Examples of suitable ketoximosilanes crosslinkers include methyl tris(dimethylketoximo)silane, methyl tris(methylethylketoximo)silane, methyl tris(methylpropylketoximo)silane, methyl tris(methylisobutylketoximo)silane, ethyl tris(dimethylketoximo)silane, ethyl tris(methylethylketoximo)silane, ethyl tris(methylpropylketoximo)silane, ethyl tris(methylisobutylketoximo)silane, vinyl tris(dimethylketoximo)silane, vinyl tris(methylethylketoximo)silane, vinyl tris(methylpropylketoximo)silane, vinyl tris(methylisobutylketoximo)silane, tetrakis(dimethylketoximo)silane, tetrakis(methylethylketoximo)silane, tetrakis(methylpropylketoximo)silane, tetrakis(methylisobutylketoximo)silane, methylbis(dimethylketoximo)silane, methylbis(cyclohexylketoximo)silane, triethoxy(ethylmethylketoxime)silane, diethoxydi(ethylmethylketoxime)silane, ethoxytri(ethylmethylketoxime)silane, methylvinylbis(methylisobutylketoximo)silane, or a combination thereof.

In certain embodiments, the crosslinker comprises an alkoxysilane exemplified by a dialkoxysilane, such as a dialkyldialkoxysilane; a trialkoxysilane, such as an alkyltrialkoxysilane; a tetraalkoxysilane; partial or full hydrolysis products thereof; or a combination thereof. Examples of suitable trialkoxysilanes include methyltrimethoxysilane, vinyltrimethoxysilane, methyltriethoxysilane, ethyltrimethoxysilane, ethyltriethoxysilane, isobutyltrimethoxysilane, isobutyltriethoxysilane, and combinations thereof. Examples of suitable tetraalkoxysilanes include tetraethoxysilane. In specific embodiments, the crosslinker comprises, alternatively is, methyltrimethoxysilane.

In certain embodiments, the crosslinker is polymeric. For example, the crosslinker may comprise a disilane such as bis(triethoxysilyl)hexane), 1,4-bis[trimethoxysilyl(ethyl)]benzene, bis[3-(triethoxysilyl)propyl] tetrasulfide, bis(trimethoxysilyl)hexane), bis(triethoxysilyl)ethane, bis(trimethoxysilyl)ethane, and combinations thereof. In these or other embodiments, the crosslinker may be one single crosslinker or a combination comprising two or more crosslinkers that differ from one another, e.g. based on hydrolyzable substituents and other organic groups bonded to silicon, and, when a polymeric crosslinker is used, siloxane units, structure, molecular weight, sequence, etc.

The amount of the crosslinker present in the adhesive composition depends on various factors (e.g. the amount and/or type of the functionalized siloxane compound, the types and/or amounts of any additional materials present in the adhesive composition (such as other polymer additives), the type of crosslinker utilized, etc.), and may be readily determined by one of skill in the art. In general, where present, the adhesive composition comprises the crosslinker in an amount of from 0.5 to 15, alternatively from 1 to 10, alternatively from 3 to 10 wt. %, based on the weight of the functionalized siloxane compound.

In some embodiments, the adhesive composition comprises a plasticizer. Examples of suitable plasticizers include organic plasticizers, such as those comprising a carboxylic acid ester (e.g. esters), a phthalate (e.g. phthalates), a carboxylate (e.g. carboxylates), an adipate (e.g. adipates), or a combination thereof. Specific examples of suitable organic plasticizers include bis(2-ethylhexyl)terephthalate, bis(2-ethylhexyl)-1,4-benzenedicarboxylate, 2-ethylhexyl methyl-1,4-benzenedicarboxylate, 1,2 cyclohexanedicarboxylic acid, dinonyl ester (branched and linear), bis(2-propylheptyl)phthalate, diisononyl adipate, and combinations thereof.

In certain embodiments, the plasticizer is an ester having an average, per molecule, of at least one group of formula:

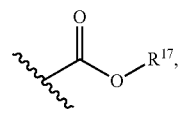

where $R^{17}$ represents a hydrogen atom or a monovalent organic group (e.g. a branched or linear monovalent hydrocarbon group, such as an alkyl group of 4 to 15 carbon atoms, alternatively 9 to 12 carbon atoms). In these or other embodiments, the plasticizer has an average, per molecule, of at least two groups of the formula above each bonded to carbon atoms in a cyclic hydrocarbon. In such instances, the plasticizer may have general formula:

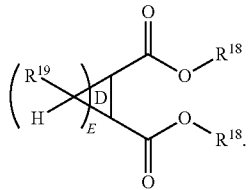

In this formula, D is a carbocyclic group having 3 or more carbon atoms, alternatively 3 to 15 carbon atoms, which may be unsaturated, saturated, or aromatic. Subscript E is from 1 to 12. Each $R^{18}$ is independently a branched or linear monovalent hydrocarbon group, such as an alkyl group of 4 to 15 carbon atoms (e.g. an alkyl group such as methyl, ethyl, butyl, etc.). Each $R^{19}$ is independently a hydrogen atom or a branched or linear, substituted or unsubstituted, monovalent organic group. For example, in some embodiments, at least one $R^{19}$ is a moiety comprising an ester functional group.

In specific embodiments, the adhesive composition comprises a polymeric plasticizer. Examples of polymeric plasticizers include alkenyl polymers (e.g. those obtained by polymerizing vinyl or allyl monomers via various methods); polyalkylene glycol esters (e.g. diethylene glycol dibenzoates, triethylene glycols, dibenzoate pentaerythritol esters, etc.); polyester plasticizers (e.g. those obtained from dibasic acids such as sebacic acid, adipic acid, azelaic acid, phthalic acid, etc. and dihydric alcohols such as ethylene glycol, diethylene glycol, triethylene glycol, propylene glycol, dipropylene glycol, etc.); polyesters including polyester polyols each having a molecular weight of not less than 500 (e.g. polyethylene glycols, polypropylene glycols, polytetramethylene glycols, etc.); polystyrenes (e.g. polystyrene, poly-alpha-methylstyrene, etc.); polybutenes and polybutadienes (e.g. polyisobutylene, butadiene acrylonitrile, etc.); and polychloroprenes. In various embodiments, a low molecular weight plasticizer and a higher molecular weight polymeric plasticizer may present in the adhesive composition in combination.

Specific plasticizers are known in the art and are commercially available. Such plasticizers may be present in the adhesive composition alone or in combination. For example, the plasticizer may comprise a phthalate, such as: a dialkyl phthalate such as dibutyl phthalate (Eastman™ DBP Plasticizer), diheptyl phthalate, diisononyl phthalate, di(2-ethylhexyl) phthalate, or diisodecyl phthalate (DIDP), bis(2-propylheptyl) phthalate (BASF Palatinol® DPHP), di(2-ethylhexyl) phthalate (Eastman™ DOP Plasticizer), dimethyl phthalate (Eastman™ DMP Plasticizer); diethyl phthalate (Eastman™ DMP Plasticizer); butyl benzyl phthalate, and bis(2-ethylhexyl)terephthalate (Eastman™ 425 Plasticizer); a dicarboxylate such as Benzyl, C7-C9 linear and branched alkyl esters, 1, 2, benzene dicarboxylic acid (Ferro SANTICIZER® 261A), 1,2,4-benzenetricarboxylic acid (BASF Palatinol® TOTM-I), bis(2-ethylhexyl)-1,4-benzenedicarboxylate (Eastman™ 168 Plasticizer); 2-ethylhexyl methyl-1,4-benzenedicarboxylate; 1,2 cyclohexanedicarboxylic acid, dinonyl ester, branched and linear (BASF Hexamoll® DINCH); diisononyl adipate; trimellitates such as trioctyl trimellitate (Eastman™ TOTM Plasticizer); tri-ethylene glycol bis(2-ethylhexanoate) (Eastman™ TEG-EH Plasticizer); triacetin (Eastman™ Triacetin); nonaromatic dibasic acid esters such as dioctyl adipate, bis(2-ethylhexyl) adipate (Eastman™ DOA Plasticizer and Eastman™ DOA Plasticizer, Kosher), di-2-ethylhexyladipate (BASF Plastomoll® DOA), dioctyl sebacate, dibutyl sebacate and diisodecyl succinate; aliphatic esters such as butyl oleate and methyl acetyl recinolate; phosphates such as tricresyl phosphate and tributyl phosphate; chlorinated paraffins; hydrocarbon oils such as alkyldiphenyls and partially hydrogenated terphenyls; process oils; epoxy plasticizers such as epoxidized soybean oil and benzyl epoxystearate; tris(2-ethylhexyl)ester; a fatty acid ester; and a combination thereof. Examples of other suitable plasticizers and their commercial sources include BASF Palamoll® 652 and Eastman 168 Xtreme™ Plasticizer.

The amount of the plasticizer present in the adhesive composition depends on various factors (e.g. the amount and/or type of the functionalized siloxane compound, the types and/or amounts of any additional materials present in the adhesive composition (such as other polymer additives), the type of crosslinker utilized, etc.), and may be readily determined by one of skill in the art. In general, where present, the adhesive composition comprises the plasticizer in an amount of from 5 to 150 parts by weight based on the combined weights of all components in the adhesive composition. In specific embodiments, the adhesive composition comprises the plasticizer in an amount of from 0.1 to 10 wt. % based on the total weight of the adhesive composition.

In some embodiments, the adhesive composition comprises an extender. Examples of suitable extenders include non-functional polyorganosiloxanes, such as those comprising difunctional units of the formula $R^{20}{}_2SiO_{2/2}$ and terminal units of the formula $R^{21}{}_3SiD'$-, where each $R^{20}$ and each $R^{21}$ are independently a monovalent organic group such as a monovalent hydrocarbon group exemplified by alkyl such as methyl, ethyl, propyl, and butyl; alkenyl such as vinyl, allyl, and hexenyl; aryl such as phenyl, tolyl, xylyl, and naphthyl; and aralkyl groups such as phenylethyl; and D' is an oxygen atom or a divalent group. Non-functional polyorganosiloxanes are known in the art and are commercially available. Suitable non-functional polyorganosiloxanes are exemplified by, but not limited to, polydimethylsiloxanes. Such polydimethylsiloxanes include DOWSIL® 200 Fluids, which are commercially available from Dow Silicones Corporation of Midland, Mich., U.S.A. and may have viscosity ranging from $5 \times 10^{-5}$ to 0.1, alternatively from $5 \times 10^{-5}$ to 0.05, and alternatively from 0.0125 to 0.06, m²/s. The amount of the extender present in the adhesive composition depends on various factors (e.g. the amount and/or type of the functionalized siloxane compound, the types and/or amounts of any additional materials present in the adhesive composition (such as other polymer additives), the type of crosslinker utilized, etc.), and may be readily determined by one of skill in the art. In general, where present, the adhesive composition comprises the extender in an amount of from 0.1 to 10 wt. % based on the total weight of the adhesive composition.

In some embodiments, the adhesive composition comprises an end-blocker. Suitable end-blockers comprise an M unit, i.e., a siloxane unit of formula $R^{22}{}_3SiO_{1/2}$, where each $R^{22}$ independently represents a monovalent organic group, such as a monovalent hydrocarbon group. General examples of such end-blockers include those comprising a polyorganosiloxane (e.g. a polydiorganosiloxane, such as a polydimethylsiloxane) that is end-blocked at one terminus by a triorganosilyl group, e.g. $(CH_3)_3SiO$—, and at another terminus by a hydroxyl group. Other examples of suitable end-blockers include polydiorganosiloxanes having both hydroxyl end groups and triorganosilyl end groups, such as those having more than 50%, alternatively more than 75%, of the total end groups as hydroxyl groups. The amount of triorganosilyl group present in such end-blockers may vary, and is typically used to regulate the modulus of the reaction product prepared by condensation reaction of the adhesive composition. Without wishing to be bound by theory, it is thought that higher concentrations of triorganosilyl end groups may provide a lower modulus in certain cured products. In some embodiments, the end-blocker of the adhesive composition comprises a single end-blocking compound. However, in other embodiments, the end-blocker of the adhesive composition comprises two or more different end-blocking compounds that differ from one another, e.g. by way of properties including structure, viscosity, average molecular weight, polymer units, sequence, etc., or combinations thereof. The amount of the end-blocker present in the adhesive composition depends on various factors (e.g. the amount and/or type of the functionalized siloxane compound, the types and/or amounts of any additional materials present in the adhesive composition (such as other polymer additives), the type of end-blocker utilized, etc.), and may be readily determined by one of skill in the art. In general, where present, the adhesive composition comprises the end-blocker in an amount of from 0 to 50, alternatively from 0 to 30, alternatively from 0 to 15, wt. %, based on the total weight of the functionalized siloxane compound.

In certain embodiments, the adhesive composition comprises a surface modifier. Suitable surface modifiers include adhesion promoters, release agents, and the like, as well as combinations thereof. Typically, the surface modifier is utilized to change the appearance of the surface of a reaction product of the adhesive composition. For example, the surface modifier may be used to increase gloss of the surface of such a reaction product. Specific examples of suitable surface modifiers include polydiorganosiloxanes with alkyl and aryl groups. For example, DOWSIL® 550 Fluid is a trimethylsiloxy-terminated poly(dimethyl/methylphenyl)siloxane with a viscosity of 0.000125 m$^2$/s that is commercially available from Dow Silicones Corporation. These and other examples of suitable surface modifiers include natural oils (e.g. those obtained from a plant or animal source), such as linseed oil, tung oil, soybean oil, castor oil, fish oil, hempseed oil, cottonseed oil, oiticica oil, rapeseed oil, and the like, as well as combinations thereof.

In some embodiments, the surface modifier is an adhesion promoter. Suitable adhesion promoters may comprise a hydrocarbonoxysilane such as an alkoxysilane, a combination of an alkoxysilane and a hydroxy-functional polyorganosiloxane, an amino functional silane, an epoxy functional silane, a mercaptofunctional silane, or a combination thereof. Adhesion promoters are known in the art and may comprise silanes having the formula $R^{23}{}_F R^{24}{}_G Si(OR^{25})_{4-(F+G)}$ where each $R^{23}$ is independently a monovalent organic group having at least 3 carbon atoms; $R^{24}$ contains at least one SiC bonded substituent having an adhesion-promoting group, such as amino, epoxy, mercapto or acrylate groups; each $R^{25}$ is independently a monovalent organic group (e.g. methyl, ethyl, propyl, butyl, etc.); subscript F has a value ranging from 0 to 2; subscript G is either 1 or 2; and the sum of (F+G) is not greater than 3. In certain embodiments, the adhesion promoter comprises a partial condensate of the above silane. In these or other embodiments, the adhesion promoter comprises a combination of an alkoxysilane and a hydroxy-functional polyorganosiloxane.

In some embodiments, the adhesion promoter comprises an unsaturated or epoxy-functional compound. In such embodiments, the adhesion promoter may be or comprise an unsaturated or epoxy-functional alkoxysilane such as those having the formula (XIII): $R^{26}{}_H Si(OR^{27})_{(4-H)}$, where subscript H is 1, 2, or 3, alternatively subscript H is 1. Each $R^{26}$ is independently a monovalent organic group with the proviso that at least one $R^{26}$ is an unsaturated organic group or an epoxy-functional organic group. Epoxy-functional organic groups for $R^{26}$ are exemplified by 3-glycidoxypropyl and (epoxycyclohexyl)ethyl. Unsaturated organic groups for $R^{26}$ are exemplified by 3-methacryloyloxypropyl, 3-acryloyloxypropyl, and unsaturated monovalent hydrocarbon groups such as vinyl, allyl, hexenyl, undecylenyl. Each $R^{27}$ is independently a saturated hydrocarbon group of 1 to 4 carbon atoms, alternatively 1 to 2 carbon atoms. $R^{27}$ is exemplified by methyl, ethyl, propyl, and butyl.

Specific examples of suitable epoxy-functional alkoxysilanes include 3-glycidoxypropyltrimethoxysilane, 3-glycidoxypropyltriethoxysilane, (epoxycyclohexyl)ethyldimethoxysilane, (epoxycyclohexyl)ethyldiethoxysilane and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof.

In some embodiments, the adhesion promoter comprises an epoxy-functional siloxane, such as a reaction product of a hydroxy-terminated polyorganosiloxane with an epoxy-functional alkoxysilane (e.g. such as one of those described above), or a physical blend of the hydroxy-terminated polyorganosiloxane with the epoxy-functional alkoxysilane. The adhesion promoter may comprise a combination of an epoxy-functional alkoxysilane and an epoxy-functional siloxane. For example, the adhesion promoter is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer.

In certain embodiments, the adhesion promoter comprises an aminofunctional silane, such as an aminofunctional alkoxysilane exemplified by $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_2NH(CH_2)_3Si(OCH_3)_3$, $C_4H_9NH(CH_2)_2NH(CH_2)_3Si(OCH_2CH_3)_3$, $H_2N(CH_2)_2SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3(OCH_3)_2$, $CH_3NH(CH_2)_5SiCH_3(OCH_2CH_3)_2$, $H_2N(CH_2)_2NH(CH_2)_3SiCH_3(OCH_3)_2$, $H_2N(CH_2)_2NH(CH_2)_3SiCH_3(OCH_2CH_3)_2$, $CH_3NH(CH_2)_2NH(CH_2)_3SiCH_3(OCH_3)_2$, $CH_3NH(CH_2)_2NH(CH_2)_3SiCH_3(OCH_3)_2$, $C_4H_9NH(CH_2)_2NH(CH_2)_3SiCH_3(OCH_3)_2$, $C_4H_9NH(CH_2)_2NH(CH_2)_3SiCH_3(OCH_2CH_3)_2$, N-(3-(trimethoxysilyl)propyl)ethylenediamine, and the like, as well as combinations thereof. In these or other embodiments, the adhesion promoter comprises a mercaptofunctional alkoxysilane, such as 3-mercaptopropyltrimethoxysilane or 3-mercaptopropyltriethoxysilane.

Additional examples of surface modifiers include adhesion promoters which are the reaction product of an epoxyalkylalkoxysilane, such as 3-glycidoxypropyltrimethoxysilane, and an amino-substituted alkoxysilane, such as 3-aminopropyltrimethoxysilane, optionally with an alkylalkoxysilane, such as methyltrimethoxysilane.

In some embodiments, the surface modifier comprises, alternatively is, a release agent. Suitable release agents are exemplified by fluorinated compounds, such as fluoro-functional silicones, or fluoro-functional organic compounds. In specific embodiments, the adhesive composition comprises multiple surface modifiers, such as one or more adhesion promoters, one or more release agents, one or more natural oils, or combinations thereof.

The amount of the surface modifier present in the adhesive composition depends on various factors (e.g. the amount and/or type of the functionalized siloxane compound, the types and/or amounts of any additional materials present in the adhesive composition, curing conditions to which the adhesive composition is intended to be exposed, etc.), and may be readily determined by one of skill in the art. In general, where present, the adhesive composition comprises the surface modifier in an amount of from 0.01 to 50, alternatively from 0.01 to 10, alternatively from 0.01 to 5 parts by weight, based on the combined weights of all components in the adhesive composition.

In certain embodiments, the adhesive composition comprises a drying agent, such as physical drying agents (e.g. adsorbents), chemical drying agents, etc. In general, the drying agent binds water and low-molecular weight alcohol from various sources. For example, the drying agent may bind by-products of a condensation reaction involving the functionalized siloxane compound, such as water and alcohols. Physical drying agents typically trap and/or adsorb such water and/or by-products, where chemical drying agents typically binding the water and/or other by-products by chemical means (e.g. via covalent bonding). Examples of suitable drying agents for use in the adhesive composition include adsorbents, such as those comprising inorganic particulates. Such adsorbents typically have a particle size of 10 micrometers or less, alternatively 5 micrometers or less, and an average pore size sufficient to adsorb water and low-molecular weight alcohol alcohols (e.g. an average pore size of 10 Å (Angstroms) or less, alternatively 5 Å or less, alternatively 3 Å or less). Specific examples of such adsorbents include zeolites (e.g. chabasite, mordenite, and analcite) and molecular sieves comprising alkali metal alumino silicates, silica gel, silica-magnesia gel, activated carbon, activated alumina, calcium oxide, and combinations thereof. Examples of commercially available drying agents include dry molecular sieves, such as 3 Å (Angstrom) molecular sieves sold under the trademark SYLOSIV® by Grace Davidson and under the trade name PURMOL by Zeochem of Louisville, Ky., U.S.A., and 4 Å molecular sieves sold under the trade name Doucil zeolite 4 A by Ineos Silicas of Warrington, England. Other examples of suitable drying agents include: MOLSIV ADSORBENT TYPE 13X, 3 A, 4 A, and 5 A molecular sieves, all of which are commercially available from UOP of Illinois, U.S.A.; SILIPORITE NK 30AP and 65xP molecular sieves from Atofina of Philadelphia, Pa., U.S.A.; and molecular sieves available from W.R. Grace of Maryland, U.S.A. under various names. Examples of chemical drying agents include silanes, such as those described above with respect to the crosslinker. For example, alkoxysilanes suitable as drying agents include vinyltrimethoxysilane, vinyltriethoxysilane, and combinations thereof. As understood by those of skill in the art, the chemical drying agent may be added to the adhesive composition, or to a part of the adhesive composition (e.g. where the adhesive composition is a multiple-part composition) to keep the adhesive composition or part thereof free from water. As such, the drying agent may be added to a part (e.g. a dry part) of the adhesive composition prior to the adhesive composition being formed, thereby rendering the part shelf stable. Alternatively, or additionally, the drying agent may keep the adhesive composition free from water after formulation (e.g. after the parts of the adhesive composition are combined/mixed together). The amount of the drying agent present in the adhesive composition depends on various factors (e.g. the amount and/or type of the functionalized siloxane compound, the types and/or amounts of any additional materials present in the adhesive composition, curing conditions to which the adhesive composition is intended to be exposed, etc.), and may be readily determined by one of skill in the art. In general, where present, the adhesive composition comprises the drying agent in an amount of from 0.1 to 5 parts by weight, based on the combined weights of all components in the adhesive composition.

In some embodiments, the adhesive composition comprises a biocide. General examples of suitable biocides include fungicides, herbicides, pesticides, antimicrobials, and the like, as well as combinations thereof. For example, in certain embodiments, the biocide comprises, alternatively is, a fungicide. Specific examples of the fungicide include N-substituted benzimidazole carbamates and benzimidazolyl carbamates, such as methyl 2-benzimidazolylcarbamate, ethyl 2-benzimidazolylcarbamate, isopropyl 2-benzimidazolylcarbamate, methyl N-{2-[1-(N,N-dimethylcarbamoyl)benzimidazolyl]}carbamate, methyl N-{2-[1-(N,N-dimethylcarbamoyl)-6-methylbenzimidazolyl]}carbamate, methyl N-{2-[1-(N,N-dimethylcarbamoyl)-5-methylbenzimidazolyl]}carbamate, methyl N-{2-[1-(N-methylcarbamoyl)benzimidazolyl]}carbamate, methyl N-{2-[1-(N-methylcarbamoyl)-6-methylbenzimidazolyl]} carbamate, methyl N-{2-[1-(N-methylcarbamoyl)-5-methylbenzimidazolyl]}carbamate, ethyl N-{2-[1-(N,N-dimethylcarbamoyl)benzimidazolyl]}carbamate, ethyl N-{2-[2-(N-methylcarbamoyl)benzimidazolyl]}carbamate, ethyl N-{2-[1-(N,N-dimethylcarbamoyl)-6-methylbenzimidazolyl]} carbamate, ethyl N-{2-[1-(N-methylcarbamoyl)-6-methylbenzimidazolyl]}carbamate, isopropyl N-{2-[1-(N,N-dimethylcarbamoyl)benzimidazolyl]}carbamate, isopropyl N-{2-[1-(N-methylcarbamoyl)benzimidazolyl]}carbamate, methyl N-{2-[1-(N-propylcarbamoyl)benzimidazolyl]}carbamate, methyl N-{2-[1-(N-butylcarbamoyl)benzimidazolyl]}carbamate, methoxyethyl N-{2-[1-(N-propylcarbamoyl)benzimidazolyl]}carbamate, methoxyethyl N-{2-[1-(N-butylcarbamoyl)benzimidazolyl]}carbamate, ethoxyethyl N-{2-[1-(N-propylcarbamoyl)benzimidazolyl]}carbamate, ethoxyethyl N-{2-[1-(N-butylcarbamoyl)benzimidazolyl]} carbamate, methyl N-{1-(N,N-dimethylcarbamoyloxy)benzimidazolyl]}carbamate, methyl N-{2-[N-methylcarbamoyloxy)benzimidazolyl]}carbamate, methyl N-{2-[1-(N-butylcarbamoyloxy)benzoimidazolyl]}carbamate, ethoxyethyl N-{2-[1-(N-propylcarbamoyl)benzimidazolyl]}carbamate, ethoxyethyl N-{2-[1-(N-butylcarbamoyloxy)benzoimidazolyl]}carbamate, methyl N-{2-[1-(N,N-dimethylcarbamoyl)-6-chlorobenzimidazolyl]}carbamate, and methyl N-{2-[1-(N,N-dimethylcarbamoyl)-6-nitrobenzimidazolyl]} carbamate; 10,10'-oxybisphenoxarsine (trade name: Vinyzene, OBPA); di-iodomethyl-para-tolylsulfone; benzothiophene-2-cyclohexylcarboxamide-S,S-dioxide; N-(fluordichloridemethylthio)phthalimide (trade names: Fluor-Folper, Preventol A3); methyl-benzimideazol-2-ylcarbamate (trade names: Carbendazim, Preventol BCM); Zinc-bis(2-pyridylthio-1-oxide); zinc pyrithione; 2-(4-thiazolyl)-benzimidazol; N-phenyl-iodpropargylcarbamate; N-octyl-4-isothiazolin-3-on; 4,5-dichloride-2-n-octyl-4-isothiazolin-3-on; N-butyl-1,2-benzisothiazolin-3-on; triazolyl-compounds, such as tebuconazol; and the like, as well as combinations thereof. In particular embodiments, such fungicides are utilized in combination with one or more inorganic materials, such as mineral (e.g. zeolites), metals (e.g. copper, silver, platinum, etc.), and combinations thereof.

In particular embodiments, the biocide comprises, alternatively is, an herbicide. Specific examples of the herbicide include amide herbicides such as allidochlor N,N-diallyl-2-chloroacetamide; CDEA 2-chloro-N,N-diethylacetamide; etnipromid (RS)-2-[5-(2,4-dichlorophenoxy)-2-nitrophenoxy]-N-ethylpropionamide; anilide herbicides such as cisanilide cis-2,5-dimethylpyrrolidine-1-carboxanilide; flufenacet 4'-fluoro-N-isopropyl-2-[5-(trifluoromethyl)-1,3,4-thiadiazol-2-yloxy]acetanilide; naproanilide (RS)-α-2-naphthoxypropionanilide; arylalanine herbicides such as benzoylprop N-benzoyl-N-(3,4-dichlorophenyl)-DL-alanine; flamprop-M N-benzoyl-N-(3-chloro-4-fluorophenyl)-D-alanine; chloroacetanilide herbicides such as butachlor N-butoxy methyl-2-chloro-2',6'-diethylacetanilide; metazachlor 2-chloro-N-(pyrazol-1-ylmethyl)acet-2',6'-xylidide; prynachlor (RS)-2-chloro-N-(1-methylprop-2-ynyl)acetanilide; sulphonanilide herbicides such as cloransulam 3-chloro-2-(5-ethoxy-7-fluoro[1,2,4]triazolo[1,5-c]pyrimidin-2-ylsulphonamido)benzoic acid; metosulam 2',6'-dichloro-5,7-dimethoxy-3'-methyl[1,2,4]triazolo[1,5-a]pyrimidine-2-sulphonanilide; antibiotic herbicides such as bilanafos 4-[hydroxy(methyl)phosphinoyl]-L-homoalanyl-L-alanyl-L-alanine; benzoic acid herbicides such as chloramben 3-amino-2,5-dichlorobenzoic acid; 2,3,6-TBA 2,3,6-trichlorobenzoic acid; pyrimidinyloxybenzoic acid herbicides such as bispyribac 2,6-bis(4,6-dimethoxypyrimidin-2-yloxy)benzoic acid; pyrimidinylthiobenzoic acid herbicides such as pyrithiobac 2-chloro-6-(4,6-dimethoxypyrimidin-2-ylthio)benzoic acid; phthalic acid herbicides such as chlorthal tetrachloroterephthalic acid; picolinic acid herbicides such as aminopyralid 4-amino-3,6-dichloropyridine-2-carboxylic acid; quinolinecarboxylic acid herbicides such as quinclorac 3,7-dichloroquinoline-8-carboxylic acid; arsenical herbicides such as CMA calcium bis(hydrogen methylarsonate); MAMA ammonium hydrogen methylarsonate; sodium arsenite; benzoylcyclohexanedione herbicides such as mesotrione 2-(4-mesyl-2-nitrobenzoyl)cyclohexane-1,3-dione; benzofuranyl alkylsulphonate herbicides such as benfuresate 2,3-dihydro-3,3-dimethylbenzofuran-5-yl ethanesulphonate; carbamate herbicides such as carboxazole methyl 5-tert-butyl-1,2-oxazol-3-ylcarbamate; fenasulam methyl 4-[2-(4-chloro-o-tolyloxy)acetamido]phenylsulphonylcarbamate; carbanilate herbicides such as BCPC (RS)-sec-butyl 3-chlorocarbanilate; desmedipham ethyl 3-phenylcarbamoyloxyphenylcarbamate; swep methyl 3,4-dichlorocarbanilate; cyclohexene oxime herbicides such as butroxydim (RS)-(EZ)-5-(3-butyryl-2,4,6-trimethylphenyl)-2-(1-ethoxyiminopropyl)-3-hydroxycyclohex-2-en-1-one; tepraloxydim (RS)-(EZ)-2-{1-[(2E)-3-chloroallyloxyimino]propyl}-3-hydroxy-5-perhydropyran-4-ylcyclohex-2-en-1-one; cyclopropylisoxazole herbicides such as isoxachlortole 4-chloro-2-mesylphenyl 5-cyclopropyl-1,2-oxazol-4-yl ketone; dicarboximide herbicides such as flumezin 2-methyl-4-(α,α,α-trifluoro-m-tolyl)-1,2,4-oxadiazinane-3,5-dione; dinitroaniline herbicides such as ethalfluralin N-ethyl-α,α,α-trifluoro-N-(2-methylallyl)-2,6-dinitro-p-toluidine; prodiamine 5-dipropylamino-α,α,α-trifluoro-4,6-dinitro-o-toluidine; dinitrophenol herbicides such as dinoprop 4,6-dinitro-o-cymen-3-ol; etinofen α-ethoxy-4,6-dinitro-o-cresol; diphenyl ether herbicides such as ethoxyfen O-[2-chloro-5-(2-chloro-α,α,α-trifluoro-p-tolyloxy)benzoyl]-L-lactic acid; nitrophenyl ether herbicides such as aclonifen 2-chloro-6-nitro-3-phenoxyaniline; nitrofen 2,4-dichlorophenyl 4-nitrophenyl ether; dithiocarbamate herbicides such as dazomet 3,5-dimethyl-1,3,5-thiadiazinane-2-thione; halogenated aliphatic herbicides such as dalapon 2,2-dichloropropionic acid; chloroacetic acid; imidazolinone herbicides such as imazapyr (RS)-2-(4-isopropyl-4-methyl-5-oxo-2-imidazolin-2-yl)nicotinic acid; inorganic herbicides such as disodium tetraborate decahydrate; sodium azide; nitrile herbicides such as chloroxynil 3,5-dichloro-4-hydroxybenzonitrile; ioxynil 4-hydroxy-3,5-diiodobenzonitrile; organophosphorus herbicides such as anilofos S-4-chloro-N-isopropylcarbaniloylmethyl O,O-dimethyl phosphorodithioate; glufosinate 4-[hydroxy(methyl)phosphinoyl]-DL-homoalanine; phenoxy herbicides such as clomeprop (RS)-2-(2,4-dichloro-m-tolyloxy)propionanilide; fenteracol 2-(2,4,5-trichlorophenoxy)ethanol; phenoxyacetic herbicides such as MCPA (4-chloro-2-methylphenoxy)acetic acid; phenoxybutyric herbicides such as MCPB 4-(4-chloro-o-tolyloxy)butyric acid; phenoxypropionic herbicides such as fenoprop (RS)-2-(2,4,5-trichlorophenoxy)propionic acid; aryloxyphenoxypropionic herbicides such as isoxapyrifop (RS)-2-[2-[4-(3,5-dichloro-2-pyridyloxy)phenoxy]propionyl]isoxazolidine; phenylenediamine herbicides such as dinitramine N1,N1-diethyl-2,6-dinitro-4-trifluoromethyl-m-phenylenediamine, pyrazolyloxyacetophenone herbicides such as pyrazoxyfen 2-[4-(2,4-dichlorobenzoyl)-1,3-dimethylpyrazol-5-yloxy]acetophenone; pyrazolylphenyl herbicides such as pyraflufen 2-chloro-5-(4-chloro-5-difluoromethoxy-1-methylpyrazol-3-yl)-4-fluorophenoxyacetic acid; pyridazine herbicides such as pyridafol 6-chloro-3-phenylpyridazin-4-ol; pyridazinone herbicides such as chloridazon 5-amino-4-chloro-2-phenylpyridazin-3(2H)-one; oxapyrazon 5-bromo-1,6-dihydro-6-oxo-1-phenylpyridazin-4-yloxamic acid; pyridine herbicides such as fluoroxypyr 4-amino-3,5-dichloro-6-fluoro-2-pyridyloxyacetic acid; thiazopyr methyl 2-difluoromethyl-5-(4,5-dihydro-1,3-thiazol-2-yl)-4-isobutyl-6-trifluoromethylnicotinate; pyrimidinediamine herbicides such as iprymidam 6-chloro-N4-isopropylpyrimidine-2,4-diamine; quaternary ammonium herbicides such as diethamquat 1,1'-bis(diethylcarbamoylmethyl)-4,4'-bipyridinium; paraquat 1,1'-dimethyl-4,4'-bipyridinium; thiocarbamate herbicides such as cycloate S-ethyl cyclohexyl(ethyl)thiocarbamate; tiocarbazil S-benzyl di-sec-butylthiocarbamate; thiocarbonate herbicides such as EXD O,O-diethyl dithiobis(thioformate); thiourea herbicides such as methiuron 1,1-dimethyl-3-m-tolyl-2-thiourea; triazine herbicides such as triaziflam (RS)—N-[2-(3,5-dimethylphenoxy)-1-methylethyl]-6-(1-fluoro-1-methylethyl)-1,3,5-triazine-2,4-diamine; chlorotriazine herbicides such as cyprazine 6-chloro-N2-cyclopropyl-N4-isopropyl-1,3,5-triazine-2,4-diamine; propazine 6-chloro-A2,N4-di-isopropyl-1,3,5-triazine-2,4-diamine; methoxytriazine herbicides such as prometon N2,N4-di-isopropyl-6-methoxy-1,3,5-triazine-2,4-diamine; methylthiotriazine herbicides such as cyanatryn 2-(4-ethylamino-6-methylthio-1,3,5-triazin-2-ylamino)-2-methylpropionitrile; triazinone herbicides such as hexazinone 3-cyclohexyl-6-dimethylamino-1-methyl-1,3,5-triazine-2,4(1H,3H)-dione; triazole herbicides such as epronaz N-ethyl-N-propyl-3-propylsulphonyl-1H-1,2,4-triazole-1-carboxamide; triazolone herbicides such as carfentrazone (RS)-2-chloro-3-{2-chloro-5-[4-(difluoromethyl)-4,5-dihydro-3-methyl-5-oxo-1H-1,2,4-triazol-1-yl]-4-fluorophenyl}propionic acid; triazolopyrimidine herbicides such as florasulam 2',6',8-trifluoro-5-methoxy[1,2,4]triazolo[1,5-c]pyrimidine-2-sulphonanilide; uracil herbicides such as flupropacil isopropyl 2-chloro-5-(1,2,3,6-tetrahydro-3-methyl-2,6-dioxo-4-trifluoromethylpyrimidin-1-yl)benzoate; urea herbicides such as cycluron 3-cyclo-octyl-1,1-dimethylurea; monisouron 1-(5-tert-butyl-1,2-oxazol-3-yl)-3-methylurea; phenylurea herbicides such as chloroxuron 3-[4-(4-chlorophenoxy)phenyl]-1,1-dimethylurea; siduron 1-(2-methylcyclohexyl)-3-phenylurea; pyrimidinylsulphonylurea herbicides such as flazasulphuron 1-(4,6-dimethoxypyrimidin-2-yl)-3-(3-trifluoromethyl-2-pyridylsulphonyl)urea; pyrazosulphuron 5-[(4,6-dimethoxypyrimidin-2-ylcarbamoyl)sulphamoyl]-1-methylpyrazole-4-carboxylic acid; triazinylsulphonylurea herbicides such as thifensulphuron 3-(4-methoxy-6-methyl-1,3,5-triazin-2-ylcarbamoylsulphamoyl)thiophene-2-carboxylic acid; thiadiazolylurea herbicides such as tebuthiuron 1-(5-tert-butyl-1,3,4-thiadiazol-2-yl)-1,3-dimethylurea; and/or unclassified herbicides such as chlorfenac (2,3,6-trichlorophenyl)acetic acid; methazole 2-(3,4-dichlorophenyl)-4-methyl-1,2,4-oxadiazolidine-3,5-dione; tritac (RS)-1-(2,3,6-trichlorobenzyloxy)propan-2-ol; 2,4-D, chlorimuron, and fenoxaprop; and the like, as well as combinations thereof.

In some embodiments, the biocide comprises, alternatively is, a pesticide. General examples of the pesticide include insect repellents such as N,N-diethyl-meta-toluamide, and pyrethroids such as pyrethrin. Specific examples of the pesticide include atrazine, diazinon, and chlorpyrifos. In these or other embodiments, the biocide comprises, alternatively is, an antimicrobial agent. The type and nature of the antimicrobial agent may vary, and can be readily determined by one of skill in the art. In certain embodiments, the biocide comprises, alternatively is, a boron-containing material, such as a boric anhydride, borax, or a disodium octaborate tetrahydrate. In various embodiments, the adhesive composition comprises two or more biocides, which are each independently selected from the fungicide, herbicide pesticide, antimicrobial, and other biocidal components exemplified herein.

The amount of the biocide present in the adhesive composition depends on various factors (e.g. the type of biocide(s) utilized, the amount and/or type of the functionalized siloxane compound, an intended use of the adhesive composition, curing conditions to which the adhesive composition is intended to be exposed, etc.), and may be readily determined by one of skill in the art. In general, where present, the adhesive composition comprises the biocide, or a combination of biocides, in an amount of from 0.01 to 10, alternatively from 0.1 to 5 wt. % based on the total weight of the adhesive composition.

In particular embodiments, the adhesive composition comprises a flame retardant. Examples of suitable flame retardants include organic/carbonaceous flame retardants (e.g. carbon black, etc.), inorganic/mineral-based flame retardants (e.g. hydrated aluminum hydroxide, silicates such as wollastonite, metal complexes of platinum and/or platinum, etc.) and the like, as well as combinations thereof. Additional examples of suitable flame retardants include halogen-based flame retardants, such as decabromodiphenyloxide, octabromordiphenyl oxide, hexabromocyclododecane, decabromobiphenyl oxide, diphenyoxybenzene, ethylene bis-tetrabromophthalmide, pentabromoethyl benzene, pentabromobenzyl acrylate, tribromophenyl maleic imide, tetrabromobisphenyl A, bis-(tribromophenoxy)ethane, bis-(pentabromophenoxy)ethane, polydibomophenylene oxide, tribromophenylallyl ether, bis-dibromopropyl ether, tetrabromophthalic anhydride, dibromoneopentyl glycol, dibromoethyl dibromocyclohexane, pentabromodiphenyl oxide, tribromostyrene, pentabromochlorocyclohexane, tetrabromoxylene, hexabromocyclododecane, brominated polystyrene, tetradecabromodiphenoxybenzene, trifluoropropene, and PVC; phosphorus based flame-retardants, such as (2,3-dibromopropyl)-phosphate, phosphorus, cyclic phosphates, triaryl phosphates, bis-melaminium pentate, pentaerythritol bicyclic phosphate, dimethylmethylphosphate, phosphine oxide diol, triphenyl phosphate, tris-(2-chloroethyl)phosphate, phosphate esters such as tricreyl-, trixylenyl-, isodecyl diphenyl-, ethylhexyl diphenyl-, trioctyl-, tributyl-, and tris-butoxyethyl phosphate esters, and phosphate salts of various amines (e.g. ammonium phosphate); tetraalkyl lead compounds, such as tetraethyl lead; iron pentacarbonyl; manganese methyl cyclopentadienyl tricarbonyl; melamine and derivatives thereof, such as melamine salts; guanidine; dicyandiamide; ammonium sulphamate; alumina trihydrate; magnesium hydroxide alumina trihydrate; and the like, as well as derivatives, modifications, and combinations thereof. The amount of the flame retardant present in the adhesive composition depends on various factors (e.g. the amount and/or type of the functionalized siloxane compound, an intended use of the adhesive composition, curing conditions to which the adhesive composition is intended to be exposed, a presence/absence of a vehicle/solvent, etc.), and may be readily determined by one of skill in the art. In general, where present, the adhesive composition comprises the flame retardant in an amount of from 0.01 to 15, alternatively from 0.1 to 10 wt. % based on the total weight of the adhesive composition.

In certain embodiments, the adhesive composition comprises a binder. Typically, the binder is a non-reactive, elastomeric, organic polymer, i.e., an elastomeric organic polymer that does not react with the functionalized siloxane compound. Additionally, the binder is typically compatible with the functionalized siloxane compound, i.e., the binder does not form a two-phase system when formulated into the adhesive composition with the functionalized siloxane compound. In general, suitable binders have low gas and moisture permeability, and typically comprise a number average molecular weight (Mn) of from 30,000 to 75,000. However, the binder may comprise a blend of various non-reactive, elastomeric, organic polymers (e.g. of such polymers having a high molecular weight with those having a low molecular weight). In such instances, the higher molecular weight polymer(s) typically comprise a Mn of from 100,000 to 600,000, and the lower molecular weight polymer(s) typically comprise a Mn of from 900 to 10,000, alternatively 900 to 3,000. The value for the lower end of the Mn ranges is typically selected such that the binder is compatible with the functionalized siloxane compound and the other ingredients of the adhesive composition, as understood by those of skill in the art. The binder may comprise or be one non-reactive, elastomeric, organic polymer or, alternatively may comprise two or more non-reactive, elastomeric, organic polymers that differ from one another, e.g. on a basis of structure, viscosity, average molecular weight (Mn or Mw), polymer units, sequence, etc., or combinations thereof.

Examples of suitable binders include polyisobutylenes, which are known in the art and are commercially available. Specific examples of polyisobutylenes include those marketed under the trademark OPPANOL® by BASF Corporation of Germany, as well as the various grades of hydrogenated polyisobutene marketed under the trademark PARLEAM® by NOF Corp. of Japan. Additional examples of suitable polyisobutylenes are commercially available from ExxonMobil Chemical Co. of Baytown, Tex., U.S.A. under the trademark VISTANEX®. These include VISTANEX® MML-80, MML-100, MML-120, and MML-140, which are paraffinic hydrocarbon polymers, composed of long, straight-chain macromolecules containing only chain-end olefinic bonds. VISTANEX® MM polyisobutylenes have a viscosity average molecular weight of from 70,000 to 90,000, and VISTANEX® LM polyisobutylenes (e.g. LM-MS) are lower-molecular weight polyisobutylenes having a viscosity average molecular weight of from 8,700 to 10. Additional examples of polyisobutylenes include VISTANEX LM-MH (viscosity average molecular weight of 10,000 to 11,700); Soltex PB-24 (Mn 950), Indopol® H-100 (Mn 910), Indopol® H-1200 (Mn 2100), from Amoco Corp. of Chicago, Illinois, U.S.A.; NAPVIS® and HYVIS® (e.g. NAPVIS® 200, D10, and DE3; and HYVIS® 200) from BP Chemicals of London, England. The NAPVIS® polyisobutylenes typically have a Mn of from 900 to 1300. In addition, or as an alternative, to the polyisobutylene(s), the binder may comprise or be a butyl rubber, a styrene-ethylene/butylene-styrene (SEBS) block copolymer, a styrene-ethylene/propylene-styrene (SEPS) block copolymer, polyolefin plastomer, or combinations thereof. SEBS and SEPS block copolymers are known in the art and are commercially available as Kraton® G polymers from Kraton Polymers U.S. LLC of Houston, Tex., U.S.A., and as Septon polymers from Kuraray America, Inc., New York, N.Y., U.S.A. Polyolefin plastomers are also known in the art and are commercially available as AFFINITY® GA 1900 and AFFINITY® GA 1950 compositions from Dow Chemical Company, Elastomers & Specialty Products Division, Midland, Mich., U.S.A.

The amount of the binder present in the adhesive composition depends on various factors (e.g. the amount and/or type of the functionalized siloxane compound, an intended use of the adhesive composition, curing conditions to which the adhesive composition is intended to be exposed, a presence/absence of a vehicle/solvent, etc.), and may be readily determined by one of skill in the art. In general, where present, the adhesive composition comprises the binder in an amount of from 1 to 50, alternatively from 5 to 40, alternatively from 5 to 35 parts by weight, based on the combined weights of all components in the adhesive composition.

In some embodiments, the adhesive composition comprises an anti-aging additive. Examples of anti-aging additives include antioxidants, UV absorbers, UV and/or light stabilizers, heat stabilizers, and combinations thereof. The anti-aging additive may be or comprise but one anti-aging additive or, alternatively, may comprise two or more different anti-aging additives. Moreover, one particular anti-aging additive may serve multiple functions (e.g. as both a UV absorber and a UV stabilizer, as both an antioxidant and a UV absorber, etc.). Many suitable anti-aging additives are known in the art and are commercially available. For example, suitable antioxidants include phenolic antioxidants (e.g. fully-sterically hindered phenols and partially-hindered phenols) and combinations of phenolic antioxidants with stabilizers (e.g. sterically hindered amines, such as tetramethyl-piperidine derivatives, also known as "hindered amine light stabilizers" (HALS)). Suitable phenolic antioxidants include vitamin E and IRGANOX® 1010 from BASF. IRGANOX® 1010 comprises pentaerythritol tetrakis(3-(3, 5-di-t-butyl-4-hydroxyphenyl)propionate). Examples of UV absorbers include phenol, 2-(2H-benzotriazol-2-yl)-6-dodecyl-4-methyl-, branched and linear (TINUVIN® 571). Examples of UV stabilizers include bis(1,2,2,6,6-pentamethyl-4-piperidyl) sebacate; methyl 1,2,2,6,6-pentamethyl-4-piperidyl/sebacate; and combinations thereof (TINUVIN® 272). These and other TINUVIN® additives, such as TINUVIN® 765 are commercially available from BASF. Other UV and light stabilizers are commercially available, and are exemplified by LowLite from Chemtura, OnCap from PolyOne, and Light Stabilizer 210 from E. I. du Pont de Nemours and Company of Delaware, U.S.A. Oligomeric (higher molecular weight) stabilizers may also be utilized in or as the anti-aging additive, for example, to minimize potential for migration of the anti-aging additive out of the adhesive composition or a cured product thereof. Example of such oligomeric antioxidant stabilizers include TINUVIN® 622, which is a dimethylester of butanedioic acid copolymerized with 4-hydroxy-2,2,6,6-tetramethyl-1-piperidine ethanol. Examples of heat stabilizers include iron oxides, carbon blacks, iron carboxylate salts, cerium hydrates, barium zirconates, cerium and zirconium octoates, porphyrins, and the like, as well as combinations thereof.

The amount of the anti-aging additive present in the adhesive composition depends on various factors (e.g. the amount and/or type of the functionalized siloxane compound, an intended use of the adhesive composition, curing conditions to which the adhesive composition is intended to be exposed, etc.), and may be readily determined by one of skill in the art. In general, where present, the adhesive composition comprises the anti-aging additive in an amount of from greater than 0 to 5, alternatively from 0.1 to 4, alternatively from 0.5 to 3 wt. %, based on the total weight of the adhesive composition.

In certain embodiments, the adhesive composition comprises a water release agent, i.e., a component that releases water over time (e.g. in response to an applied condition, such as a temperature and/or a pressure). Typically, the water release agent contains an amount of water sufficient to partially, alternatively fully, react the adhesive composition, and is thus selected to release the amount of water when exposed to the applied condition (e.g. a use temperature of the adhesive composition) for a sufficient amount of time. Generally, however the water release agent is selected to sufficiently bind the water to thereby prevent too much water from being released during making and/or storing the adhesive composition. For example, the water release agent typically binds the water sufficiently during compounding/formulating the adhesive composition, such that sufficient water is available for condensation reaction of the functionalized siloxane compound during or after the application process in which the adhesive composition is used. This "controlled release" property also may provide the benefit of preventing too much water from being released and/or water being released too rapidly during the application process, since this may cause bubbling or voiding in the reaction product formed by condensation reaction of the functionalized siloxane compound of the adhesive composition. The particular water release agent selected can depend on various factors, (e.g. the other components of the adhesive composition, the amount/type of the functionalized siloxane compound, the type of the condensation reaction catalyst, the process conditions under which the adhesive composition will be formulated, etc.) and will be readily determined by one of skill in the art. Examples of suitable water release agents are exemplified by metal salt hydrates, hydrated molecular sieves, and precipitated carbonates. Particular examples include the precipitated calcium carbonate available from Solvay under the trademark WINNOFIL® SPM. In certain embodiments, the water release agent is selected to include, alternatively to be, precipitated calcium carbonate. The water release agent may be selected to ensure that not all of the water content is released during compounding, while still releasing a sufficient amount of water for condensation reaction of the functionalized siloxane compound when exposed to the application temperature range for a sufficient period of time. The amount of the water release agent present in the adhesive composition depends on various factors (e.g. the water permeability of the functionalized siloxane compound, a presence/absence of vehicle/solvent, a presence/absence of drying agent, the method by which the adhesive composition is to be formulated/prepared, etc.), and may be readily determined by one of skill in the art. In general, where present, the adhesive composition comprises the water release agent in an amount of from 1 to 50, alternatively from 5 to 40, alternatively from 5 to 30 parts by weight, based on the combined weights of all components in the adhesive composition.

In some embodiments, the adhesive composition comprises a pigment (i.e., a component that imparts color to the adhesive composition and/or a reaction product thereof). Such pigments may comprise any inorganic compounds, for example those of metals such as chromium oxides, titanium oxides, cobalt pigments, as well as those that are not based on such metals, e.g. non-metal inorganic compounds. Examples of suitable pigments include indigos, titanium dioxides, carbon blacks, and combinations thereof, as well as other commercially available pigments such as Stan-Tone 505P01 Green, which is available from PolyOne. In certain embodiments, the pigment comprises a carbon black. Specific examples of carbon blacks include Shawinigan Acetylene black, which is commercially available from Chevron Phillips Chemical Company LP; SUPERJET® Carbon Black (e.g. LB-1011) supplied by Elementis Pigments Inc., of Fairview Heights, Ill. U.S.A.; SR 511 supplied by Sid Richardson Carbon Co, of Akron, Ohio U.S.A.; and N330, N550, N762, N990 (from Degussa Engineered Carbons of Parsippany, N.J., U.S.A.). The amount of the pigment present in the adhesive composition depends on various factors (e.g. the amount and/or type of the functionalized siloxane compound, an intended use of the adhesive composition, a presence/absence of a vehicle/solvent, etc.), and may be readily determined by one of skill in the art. In general, where present, the adhesive composition comprises the pigment in an amount of from greater than 0 to 20, alternatively from 0.001 to 10, alternatively from 0.001 to 5 wt. % based on the total weight of the adhesive composition.

In certain embodiments, the adhesive composition comprises a rheology additive, such as a rheology modifier and/or a viscosity modifier. Examples of suitable rheological additives include waxes; polyamides; polyamide waxes; hydrogenated castor oil derivatives; metal soaps, such as calcium, aluminum, and/or barium stearates; and the like, as well as derivatives, modifications, and combinations thereof. In particular embodiments, the rheology modifier is selected to facilitate incorporation of fillers, compounding, de-airing, and/or mixing of the adhesive composition (e.g. during preparation thereof), as well understood by those of skill in the art. Specific examples of rheological additives include those known in the art which are commercially available. Examples of such rheological additives include Polyvest, which is commercially available from Evonik; Disparlon which is commercially available from King Industries; Kevlar Fibre Pulp, which is commercially available from Du Pont; Rheospan which is commercially available from Nanocor; Ircogel, which is commercially available from Lubrizol; Crayvallac® SLX, which is commercially available from Palmer Holland, and the like, as well as combinations thereof.

In some embodiments, the rheology modifier comprises, alternatively is, a wax (e.g. a paraffin wax, a microcrystalline wax, or a combination thereof). The wax typically comprises non-polar hydrocarbon(s), which may comprise branched structures, cyclic structures, or combinations thereof. Examples of suitable waxes include petroleum microcrystalline waxes available from Strahl & Pitsch, Inc., of West Babylon, N.Y., U.S.A. under the names SP 96 (melting point of from 62 to 69° C.), SP 18 (melting point of from 73 to 80° C.), SP 19 (melting point of from 76 to 83° C.), SP 26 (melting point ranging from 76 to 83° C.), SP 60 (melting point of from 79 to 85° C.), SP 617 (melting point of from 88 to 93° C.), SP 89 (melting point of from 90 to 95° C.), and SP 624 (melting point of from 90 to 95° C.). Further examples of suitable waxes include those marketed under the trademark Multiwax® by Crompton Corporation of Petrolia, Pa., U.S.A. Such waxes include which include Multiwax® 180-W, which comprises saturated branched and cyclic non-polar hydrocarbons and has melting point of from 79 to 87° C.; Multiwax® W-445, which comprises saturated branched and cyclic non-polar hydrocarbons, and has melting point of from 76 to 83° C.; and Multiwax® W-835, which comprises saturated branched and cyclic non-polar hydrocarbons, and has melting point of from 73 to 80° C. In certain embodiments, the wax comprises, alternatively is, a microcrystalline wax that is a solid at room temperature (25° C.). In some embodiments, the wax is selected to have a melting point within a desired application temperature range (i.e., the temperature range within which the adhesive composition is intended to be used/applied). It is thought that the wax, when molten, serves as a process aid, substantially easing the incorporation of filler in the composition during compounding, the compounding process itself, as well as in during a de-airing step, if used. For example, in certain embodiments, the wax has a melt temperature below 100° C. and may facilitate mixing of parts (e.g. when the adhesive composition is a multiple part composition) before application, even in a simple static mixer. In such instances, the wax may also facilitate application of the adhesive composition at temperatures of from 80 to 110° C., alternatively 90 to 100° C., with good rheology.

The amount of the rheological additive present in the adhesive composition depends on various factors (e.g. the amount and/or type of the functionalized siloxane compound, an intended use of the adhesive composition, curing conditions to which the adhesive composition is intended to be exposed, a presence/absence of a vehicle/solvent, etc.), and may be readily determined by one of skill in the art. In general, where present, the adhesive composition comprises the rheological additive in an amount of from greater than 0 to 20, alternatively from 1 to 15, alternatively from 1 to 5, parts by weight, based on the combined weights of all components in the adhesive composition.

In certain embodiments, the adhesive composition comprises a vehicle (e.g. a carrier vehicle, such as a solvent and/or diluent). Depending on a selection of various components of the adhesive composition, the carrier vehicle may be, for example, an oil (e.g. an organic oil and/or a silicone oil), a solvent, water, etc. As will be understood by one of skill in the art, the particular vehicle utilized, if any, is selected to facilitate (e.g. increase) flow of the adhesive composition or a portion thereof (e.g. one or more parts of the adhesive composition when the adhesive composition is a multiple-part composition); as well as the introduction of certain components (e.g. the functionalized siloxane compound, the chainextender, the end-blocker, etc.). As such, suitable vehicles are varied, and generally include those which help fluidize one or more components of the adhesive composition, but essentially do not react with any of such components. Accordingly, the vehicle may be selected based on a solubility of one or more components of the adhesive composition, volatility, or both. In this sense, the solubility refers to the vehicle being sufficient to dissolve and/or disperse the one or more components of the adhesive composition, and the volatility refers to vapor pressure of the vehicle. If the vehicle is too volatile (i.e., has a vapor pressure too high for the intended use), bubbles may form in the adhesive composition at the application temperature, which may lead to cracks and/or otherwise weaken or detrimentally affect properties of the cured product formed from the adhesive composition. However, if the vehicle is not volatile enough (i.e., has a vapor pressure too low for the intended use) the vehicle may remain in the cured product of the adhesive composition and/or function as a plasticizer therein. Examples of suitable vehicles generally include silicone fluids, organic fluids, and combinations thereof.

In some embodiments, the vehicle of the adhesive composition comprises, alternatively is, a silicone fluid. The silicone fluid is typically a low viscosity and/or volatile siloxane. In some embodiments, the silicone fluid is a low viscosity organopolysiloxane, a volatile methyl siloxane, a volatile ethyl siloxane, a volatile methyl ethyl siloxane, or the like, or combinations thereof. Typically, the silicone fluid has a viscosity at 25° C. in the range of 1 to 1,000 mm²/sec. In some embodiments, the silicone fluid comprises a silicone having the general formula $(R^{28}R^{29}SiO)_l$, where each $R^{28}$ and $R^{29}$ is independently selected from H and substituted or unsubstituted hydrocarbyl groups, and subscript l is from 3 to 8. Specific examples of suitable silicone fluids include hexamethylcyclotrisiloxane, octamethylcyclotetrasiloxane, decamethylcyclopentasiloxane, dodecamethylcyclohexasiloxane, octamethyltrisiloxane, decamethyltetrasiloxane, dodecamethylpentasiloxane, tetradecamethylhexasiloxane, hexadeamethylheptasiloxane, heptamethyl-3-{(trimethylsilyl)oxy)}trisiloxane, hexamethyl-3,3, bis{(trimethylsilyl)oxy}trisiloxane pentamethyl{(trimethylsilyl)oxy}cyclotrisiloxane as well as polydimethylsiloxanes, polyethylsiloxanes, polymethylethylsiloxanes, polymethylphenylsiloxanes, polydiphenylsiloxanes, caprylyl methicone, hexamethyldisiloxane, heptamethyloctyltrisiloxane, hexyltrimethicone, and the like, as well as derivatives, modifications, and combinations thereof. Additional examples of suitable silicone fluids include polyorganosiloxanes with suitable vapor pressures, such as from $5 \times 10^{-7}$ to $1.5 \times 10^{-6}$ m²/s, include DOWSIL;® 200 Fluids and DOWSIL® OS FLUIDS, which are commercially available from Dow Silicones Corporation of Midland, Mich., U.S.A.

In certain embodiments, the vehicle of the adhesive composition comprises, alternatively is, an organic fluid, which typically comprises an organic oil including a volatile and/or semi-volatile hydrocarbon, ester, and/or ether. General examples of such organic fluids include volatile hydrocarbon oils, such as $C_6$-$C_{16}$ alkanes, $C_8$-$C_{16}$ isoalkanes (e.g. isodecane, isododecane, isohexadecane, etc.) $C_8$-$C_{16}$ branched esters (e.g. isohexyl neopentanoate, isodecyl neopentanoate, etc.), and the like, as well as derivatives, modifications, and combinations thereof. Additional examples of suitable organic fluids include aromatic hydrocarbons, aliphatic hydrocarbons, alcohols having more than 3 carbon atoms, aldehydes, ketones, amines, esters, ethers, glycols, glycol ethers, alkyl halides, aromatic halides, and combinations thereof. Hydrocarbons include isododecane, isohexadecane, Isopar L ($C_{11}$-$C_{13}$), Isopar H ($C_{11}$-$C_{12}$), hydrogenated polydecene. Ethers and esters include isodecyl neopentanoate, neopentylglycol heptanoate, glycol distearate, dicaprylyl carbonate, diethylhexyl carbonate, propylene glycol n-butyl ether, ethyl-3 ethoxypropionate, propylene glycol methyl ether acetate, tridecyl neopentanoate, propylene glycol methylether acetate (PGMEA), propylene glycol methylether (PGME), octyldodecyl neopentanoate, diisobutyl adipate, diisopropyl adipate, propylene glycol dicaprylate/dicaprate, octyl ether, octyl palmitate, and combinations thereof.

In some embodiments, the vehicle comprises, alternatively is, an organic solvent. Examples of the organic solvent include those comprising an alcohol, such as methanol, ethanol, isopropanol, butanol, and n-propanol; a ketone, such as acetone, methylethyl ketone, and methyl isobutyl ketone; an aromatic hydrocarbon, such as benzene, toluene, and xylene; an aliphatic hydrocarbon, such as heptane, hexane, and octane; a glycol ether, such as propylene glycol methyl ether, dipropylene glycol methyl ether, propylene glycol n-butyl ether, propylene glycol n-propyl ether, and ethylene glycol n-butyl ether; a halogenated hydrocarbon, such as dichloromethane, 1,1,1-trichloroethane and methylene chloride; chloroform; dimethyl sulfoxide; dimethyl formamide, acetonitrile; tetrahydrofuran; white spirits; mineral spirits; naphtha; n-methylpyrrolidinone; and the like, as well as derivatives, modifications, and combination thereof.

Other vehicles may also be utilized in the adhesive composition. For example, in some embodiments, the vehicle comprises, alternatively is, an ionic liquid. Examples of ionic liquids include anion-cation combinations. Generally, the anion is selected from alkyl sulfate-based anions, tosylate anions, sulfonate-based anions, bis(trifluoromethanesulfonyl)imide anions, bis(fluorosulfonyl)imide anions, hexafluorophosphate anions, tetrafluoroborate anions, and the like, and the cation is selected from imidazolium-based cations, pyrrolidinium-based cations, pyridinium-based cations, lithium cation, and the like. However, combinations of multiple cations and anions may also be utilized. Specific examples of the ionic liquids typically include 1-butyl-1-methylpyrrolidinium bis(trifluoromethanesulfonyl)imide, 1-methyl-1-propylpyrrolidinium bis-(trifluoromethanesulfonyl)imide, 3-methyl-1-propylpyridinium bis(trifluoromethanesulfonyl)imide, N-butyl-3-methylpyridinium bis(trifluoromethanesulfonyl)imide, 1-methyl-1-propylpyridinium bis(trifluoromethanesulfonyl)imide, diallyldimethylammonium bis(trifluoromethanesulfonyl)imide, methyltrioctylammonium bis(trifluoromethanesulfonyl)imide, 1-butyl-3-methylimidazolium bis(trifluoromethanesulfonyl)imide, 1,2-dimethyl-3-propylimidazolium bis (trifluoromethanesulfonyl)imide, 1-ethyl-3-methylimidazolium bis(trifluoromethanesulfonyl)imide, 1-vinylimidazolium.bis(trifluoromethanesulfonyl)imide, 1-allyl imidazolium bis(trifluoromethanesulfonyl)imide, 1-allyl-3-methylimidazolium bis(trifluoromethanesulfonyl) imide, lithium bis(trifluoromethanesulfonyl)imide, and the like, as well as derivatives, modifications, and combinations thereof.

The amount of the vehicle present in the adhesive composition depends on various factors (e.g. the amount and/or type of the functionalized siloxane compound, the manner by which the adhesive composition is formulated, curing conditions to which the adhesive composition is intended to be exposed, etc.), and may be readily determined by one of skill in the art. In general, where present, the adhesive composition comprises the vehicle in an amount of from 1 to 99, alternatively from 1 to 75, alternatively from 2 to 60, alternatively from 2 to 50 wt. %, based on the total weight of the adhesive composition.

In particular embodiments, the adhesive composition comprises a tackifying agent. General examples of suitable tackifying agents typically include those comprising an aliphatic hydrocarbon resin (e.g. a hydrogenated polyolefin having 6 to 20 carbon atoms), a hydrogenated terpene resin, a rosin ester, a hydrogenated rosin glycerol ester, or a combination thereof. Specific examples of suitable tackifying agents include natural or modified rosins such as gum rosin, wood rosin, tall-oil rosin, distilled rosin, hydrogenated rosin, dimerized rosin, and polymerized rosin; glycerol and pentaerythritol esters of natural or modified rosins, such as glycerol esters of pale wood rosins, glycerol esters of hydrogenated rosins, glycerol esters of polymerized rosins, pentaerythritol esters of hydrogenated rosins, and phenolic-modified pentaerythritol esters of rosin; copolymers and/or terpolymers of natural terpenes, such as styrene/terpene and/or alpha methyl styrene/terpene polymers; polyterpene resins having a softening point, as determined by ASTM method E28, of from 60 to 150° C., such as those produced via the polymerization of terpene hydrocarbons (e.g. pinene) in the presence of Friedel-Crafts catalysts, as well as the hydrogenation products thereof (e.g. hydrogenated polyterpenes); phenolic modified terpene resins and hydrogenated derivatives thereof, such as those produced via acid-mediated condensation of a bicyclic terpene and a phenol; aliphatic petroleum hydrocarbon resins, such as those produced via the polymerization of monomers consisting of primarily of olefins and diolefins, those having a ring and ball softening point of from 60 to 135° C., and also hydrogenated aliphatic petroleum hydrocarbon resins; alicyclic petroleum hydrocarbon resins and hydrogenated derivatives thereof; aliphatic/aromatic or cycloaliphatic/aromatic copolymers and hydrogenated derivatives thereof; and combinations thereof. In some embodiments, the adhesive composition comprises a solid tackifying agent (i.e., a tackifying agent having a ring and ball softening point above 25° C.). Other examples of suitable tackifying agents include commercially available varieties, such as the aliphatic hydrocarbon resins exemplified by ESCOREZ 1102, 1304, 1310, 1315, and 5600 from Exxon Chemical, and Eastotac H-100, H-115E, and H-130L from Eastman; the hydrogenated terpene resins exemplified by Arkon P 100 from Arakawa Chemicals, and Wingtack 95 from Goodyear; the hydrogenated rosin glycerol esters exemplified by Staybelite Ester 10 and Foral from Hercules; the polyterpenes exemplified by Piccolyte A125 from Hercules; the aliphatic/aromatic and/or cycloaliphatic/aromatic resins exemplified by ECR 149B and ECR 179A from Exxon Chemical; and combinations thereof. The amount of the tackifying agent present in the adhesive composition depends on various factors (e.g. the amount and/or type of the functionalized siloxane compound, the type and/or amount of other components of the adhesive composition, an intended use of the adhesive composition, etc.), and may be readily determined by one of skill in the art. In general, where present, the adhesive composition comprises the tackifying agent in an amount of from 1 to 20 parts by weight, based on the combined weights of all components in the adhesive composition.

In certain embodiments, the adhesive composition comprises a corrosion inhibitor. Examples of suitable corrosion inhibitors include benzotriazoles, mercaptabenzotriazoles, and the like, as well as combinations thereof. Specific examples of suitable corrosion inhibitors are known in the art and commercially available, such as CUVAN® 826 (e.g. a 2,5-dimercapto-1,3,4-thiadiazole derivative) and CUVAN® 484 (an alkylthiadiazole), which are available from R. T. Vanderbilt of Norwalk, Conn., U.S.A.

The amount of the corrosion inhibitor present in the adhesive composition depends on various factors (e.g. the amount and/or type of the functionalized siloxane compound, an intended use of the adhesive composition, curing conditions to which the adhesive composition is intended to be exposed, etc.), and may be readily determined by one of skill in the art. In general, where present, the adhesive composition comprises the corrosion inhibitor in an amount of from 0.05 to 0.5 wt. % based on total weight of the adhesive composition.

As introduced in various sections above, various components of the adhesive composition may be utilized for multiple purposes, and thus certain additives may overlap with regard to the components described herein. For example, certain alkoxysilanes may be useful as filler treating agents, as adhesion promoters, and as crosslinkers. Additionally, the adhesive composition may further comprise additional additives not described above, such as catalyst inhibitors, curing promotors, color-change additives, etc. Such additional additives are independently selected, and each utilized in the adhesive composition in an amount selected based on the indented use thereof, as readily determined by one of skill in the art. Typically, where present, the adhesive composition comprises each of such additional additives in an amount of from 0.001 to 10, alternatively from 0.01 to 5, alternatively from 0.1 to 1 wt. % based on total weight of the adhesive composition.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples are intended to illustrate the invention and are not to be viewed in any way as limiting to the scope of the invention. The brief summary immediately below provides information as to certain abbreviations, shorthand notations, and components utilized in the Examples.

Organosilanol Compounds

"AMA-Silanol" is an organosilanol compound having the general formula:

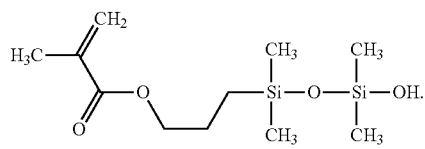

lp;1p

"ETM-Silanol" is an organosilanol compound having the general formula:

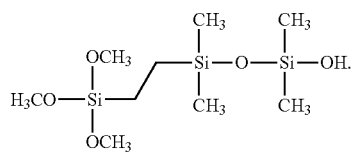

"VCMX-Silanol" is an organosilanol compound having the general formula:

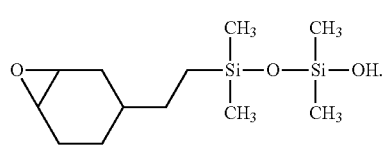

"AGE-Silanol" is an organosilanol compound having the general formula:

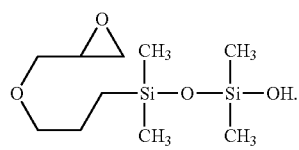

Multifunctional Organosilicon Compound

"Difunctional-AMA Si—H Converter," or "Silicon Hydride Dimethacrylate Converter" is a multifunctional organosilicon compound having the general formula:

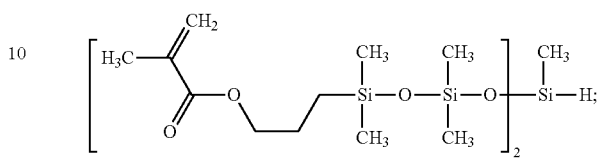

and is prepared in Example 2 below.

"Vinyl Dimethacrylate Si-Vinyl Converter" is a multifunctional organosilicon compound having the general formula:

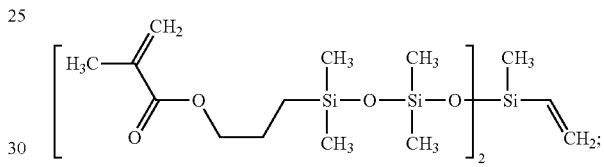

and is prepared in Example 3 below.

"Trifunctional-AMA Si—H Converter" is a multifunctional organosilicon compound having the general formula:

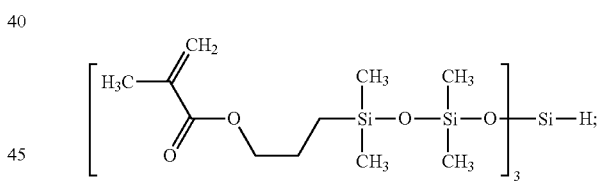

and is prepared in Example 4 below.

"Trifunctional-AMA Si-Hexenyl Converter," or "Hexenyl Trimethacrylate Converter" is a multifunctional organosilicon compound having the general formula:

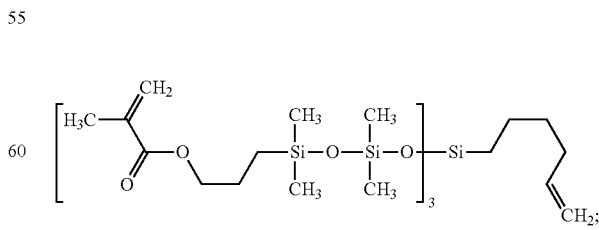

and is prepared in Example 5 below.

"Mixed AMA:ETM Si—H Converter" is a multifunctional organosilicon compound having the general formula:

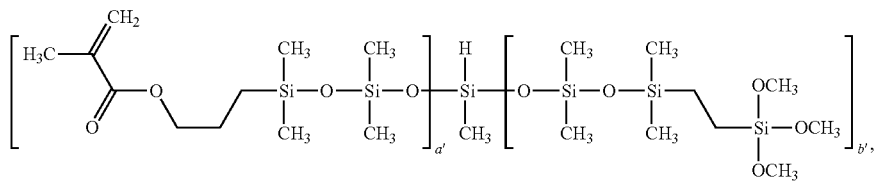

where a'+b'=2; and is prepared in Example 6 below.

"Difunctional-VCMX Si-Vinyl Converter" is a multifunctional organosilicon compound having the general formula:

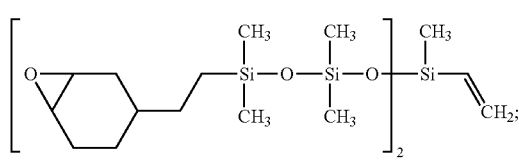

and is prepared in Example 7 below.

"Difunctional-AGE Si—H Converter" is a multifunctional organosilicon compound having the general formula:

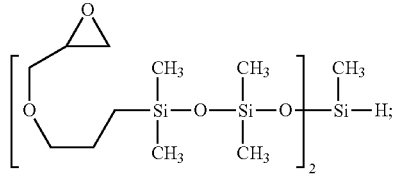

and is prepared in Example 8 below.

"Difunctional-ETM Si—H Converter" is a multifunctional organosilicon compound having the general formula:

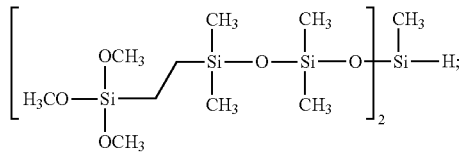

and is prepared in Example 9 below.

"Difunctional-ETM Si-Vinyl Converter" is a multifunctional organosilicon compound having the general formula:

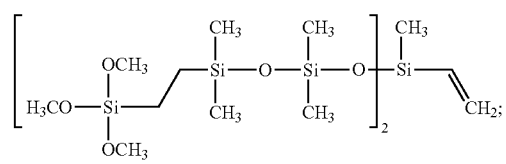

and is prepared in Example 10 below.

"Difunctional-AGE Si-Vinyl Converter" is a multifunctional organosilicon compound having the general formula:

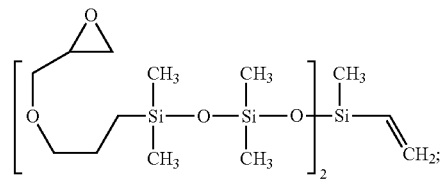

and is prepared in Example 11 below.

"Difunctional-VCMX Si—H Converter" is a multifunctional organosilicon compound having the general formula" is a multifunctional organosilicon compound having the general formula:

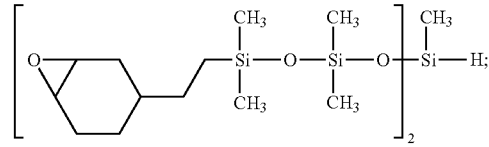

and is prepared in Example 12 below.

"Mixed AMA:AGE Si—H Converter" is a multifunctional organosilicon compound having the general formula:

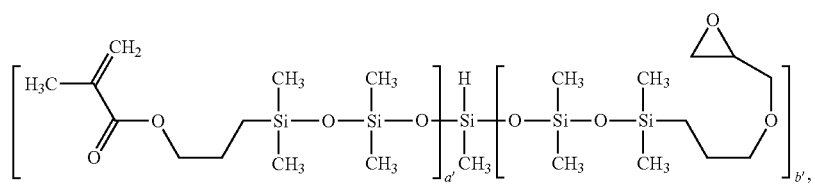

where a'+b'=2; and is prepared in Example 13 below.

Polysiloxanes

"Si—H Compound" is 1,1,1,3,5,5,5-Heptamethyl Trisiloxane.

"$M^{Vi}D_{493}M^{Vi}$" is a vinyl-functional MD silicone polymer, where each $M^{Vi}$ represents a vinyldimethylsiloxy unit and each D represents a dimethylsiloxy unit.

"$M^{Vi}D_{178.5}M^{Vi}$", is a vinyl-functional MD silicone polymer, where each $M^{Vi}$ represents a vinyldimethylsiloxy unit and each D represents a dimethylsiloxy unit.

"$MD_{92.3}D'_{6.2}M$" is a hydrido-functional MD silicone fluid, where each M represents a trimethylsiloxy unit, each D represents a dimethylsiloxy unit, and each D' represents a methylhydrogensiloxy unit.

"$M'D_{100.35}M'$" is a hydrido-functional MD silicone polymer, where each M' represents a hydrogendimethylsiloxy unit and each D represents a dimethylsiloxy unit.

"Silicone Resin 1" is a vinyl-functional MQ silicone resin.

"Telechelic Vinyl Siloxane (~810 dp)" is a vinyl-functional siloxane having a vinyl content of 0.090% and a degree of polymerization (DP) of ~810.

"Telechelic Vinyl Siloxane (~125 dp)" is a vinyl-functional siloxane having a vinyl content of 0.585% and a degree of polymerization (DP) of ~125.

Hydrosilylation Catalysts

"Hydrosilylation Catalyst 1" is a 1 wt. % solution of Pt in isopropyl alcohol (IPA).

Inhibitors

"BHT" is butylated hydroxytoluene.

Adhesive Additives

"Alkoxy Silane Adhesion Promoter Slurry" is a mixture of glycidyloxytrimethoxysilane and aminopropyltrimethoxysilane.

MULTIFUNCTIONAL ORGANOSILICON COMPOUND EXAMPLES

Example 1: Condensation of Trimethylchlorosilane with AMA-Silanol

A 40 mL vial equipped with a magnetic stir bar is charged with AMA-Silanol (4.1193 g), THF (10 mL) and $NEt_3$ (2340 µL; 1.05 eq.) to form a mixture. A solution of trimethylchlorosilane (2000 µL; 1.05 eq.) in THF (4 mL) is slowly added to the mixture to give a reaction mixture, which is stirred overnight at room temperature under a nitrogen atmosphere. Hexane (20 mL) is then added to the reaction mixture, and the resulting mixture filtered through a fine fritted funnel to remove salts. The filtrate is concentrated to strip off THF and hexanes, and additional salt precipitates filtered from the concentrate with a 20 micron syringe filter. Remaining volatiles are removed to give the product ("Monofunctional-AMA Si-Me Compound"), which is then analyzed via NMR (recovered: 5.1 g; yield: 98%; purity: 95%).

Example 2: Preparation of Difunctional-AMA Si—H Converter

A 1000 mL 3-neck flask is equipped with a nitrogen outlet and a thermocouple, an addition funnel and nitrogen inlet, and a mechanical stirrer with a Teflon stir bar. The flask is charged with $MeHSiCl_2$ (10.6 mL; 100 mmol) and diethyl ether (400 mL) to give a solution, which is stirred and cooled to 0° C. using an ice bath. The addition funnel is charged with AMA-Silanol (55.22 g; 200 mmol) and pyridine (16.1 mL; 200 mmol), and the resulting mixture added dropwise to the stirred solution in the flask over the course of ~15 min (~5 mL/min) to give a reaction mixture. A white precipitate immediately forms upon addition. After the addition is complete, GCMS indicates ~97% silanol conversion and formation of condensation products. The precipitate salt is then removed via filtration, and the filter cake washed with diethyl ether (~100 mL). The organics are combined, washed with HCl (1 M; 150 mL), sat. $NaHCO_3$ (150 mL), and brine (150 mL), dried with $MgSO_4$ (~10 g), filtered, and concentrated (rotary evaporator) to give a clear liquid, which is then dried under high vacuum for 2 hours to give the product (88.9% via GCMS).

Example 3: Preparation of Difunctional-AMA Si-Vinyl Converter

A 100 mL 3-neck flask is equipped with a magnetic stir bar, a nitrogen outlet and a thermocouple, an addition funnel, and a nitrogen inlet. The flask is charged with $MeViSiCl_2$ (1.63 mL; 12.5 mmol) and toluene (50 mL) to give a mixture, which is stirred and cooled to 0° C. using an ice bath. The addition funnel is charged with AMA-Silanol (6.9 g; 25 mmol) and pyridine (2.2 mL; 27.5 mmol), which are then added dropwise to the stirred mixture in the flask over the course of ~15 min to give a reaction mixture. A white precipitate immediately forms upon addition. After the addition is complete, GCMS indicates ~90% silanol conversion and formation of condensation products. An additional portion of $MeViSiCl_2$ (0.16 mL) and pyridine (0.22 mL) is then added. The precipitate (salt) is then removed via filtration, and the filter cake washed with toluene. The organics are combined, washed with HCl (1 M; 50 mL), sat. $NaHCO_3$ (50 mL), and brine (50 mL), dried with $MgSO_4$, filtered, and concentrated (rotary evaporator) to give a clear liquid, which is then dried under high vacuum to give the product (recovered: 6.52 g; yield: 84%; purity: 89.3% via GCMS).

Example 4: Preparation of Trifunctional-AMA Si—H Converter

A 200 mL 3-neck flask is equipped with a magnetic stir bar, a nitrogen outlet and a thermocouple, and an addition funnel. The flask is charged with $HSiCl_3$ (1.4 mL; 14 mmol) and diethyl ether (75 mL) to give a solution, which is stirred and cooled to 0° C. using an ice bath. The addition funnel is charged with AMA-Silanol (10.4 g; 40 mmol), pyridine (3.75 mL; 40.7 mmol), and diethyl ether (~5 mL; total volume of 20 mL), which are then added dropwise to the stirred solution in the flask over the course of ~25 min to give a reaction mixture. A white precipitate forms upon addition. After the addition is complete, GCMS indicates >99% silanol conversion and formation of condensation products. The reaction mixture is then filtered through a 0.45 µm frit into a separatory funnel to remove precipitate (salt), the filter cake washed with diethyl ether (~50 mL), and the combined organics washed with HCl (1 M; 20 mL), sat. $NaHCO_3$ (20 mL), and brine (20 mL), dried with $MgSO_4$ (~2 g), filtered, and concentrated (rotary evaporator) to give a clear liquid, which is then dried under high vacuum to give the product (recovered: 10.8 g; yield: 95%; purity: 77% via GCMS).

Example 5: Preparation of Trifunctional-AMA Si-Hexenyl Converter

A 250 mL 3-neck flask is equipped with a magnetic stir bar, a nitrogen outlet and a thermocouple, an addition funnel, and a nitrogen inlet. The flask is charged with $CH_2CH(CH_2)_4SiCl_3$ (3.3 mL; 16.66 mmol) and toluene (100 mL) to give a solution, which is stirred and cooled to 0° C. using an ice bath. The addition funnel is charged with AMA-Silanol (13.8 g; 50 mmol) and pyridine (4.4 mL; 55 mmol), which are then added dropwise to the stirred solution in the flask over the course of ~25 min to give a reaction mixture. A white precipitate forms upon addition. After the addition is complete, GCMS indicates ~90% silanol conversion. The reaction mixture is then filtered to remove precipitate (salt), and the filtrate washed with HCl (1 M), sat. $NaHCO_3$, and brine, dried with $MgSO_4$, filtered, and concentrated to give the a reaction product comprising the product, which is then analyzed via NMR (recovered: 14.62 g; 66% triconverter (product), 11% diconverter, 11% silanol, 12% other).

Example 6: Preparation of Mixed AMA:ETM Si—H Converter

A 250 mL 3-neck flask is equipped with a magnetic stir bar, a nitrogen feed, a thermocouple, and a septum. The flask is charged with diethyl ether (100 mL), and cooled to 0° C. using an ice bath. $MeHSiCl_2$ (2.5 mL; 25.2 mmol) is then added to the flask to form a mixture. A mixture of ETM-Silanol (4.77 g; 16 mmol), AMA-Silanol (8.89 g), and pyridine (4 mL; 50.4 mmol) is then added the stirred mixture in the flask over the course of ~30 min via syringe pump to give a reaction mixture. A white precipitate forms immediately upon addition. After the addition is complete, the reaction mixture is stirred for 5 min, and analyzed via GCMS (indicating ~90% silanol conversion). An additional portion of $MeHSiCl_2$ (0.25 mL) and pyridine (0.4 mL) is then added, the reaction mixture stirred for 35 min, and analyzed via GCMS ((indicating ~95% silanol conversion). The reaction mixture is then filtered to remove precipitate (salt), and the filtrate washed with HCl (1 M), sat. $NaHCO_3$, and brine, dried with $MgSO_4$, filtered, and concentrated (rotary evaporator) to give a reaction product comprising the product, which is then dried under high vacuum with stirring overnight to give the product (recovered: 12 g; yield: 82%; purity: 51% mixed adduct (a'=1; b'=1), 32% di-AMA adduct (a'=2; b'=0), 6.5% di-ETM adduct (a'=0; b'=2)).

Example 7: Preparation of Difunctional-VCMX Si-Vinyl Converter

A 100 mL 3-neck flask is equipped with a magnetic stir bar, a nitrogen outlet and a thermocouple, an addition funnel, and a nitrogen inlet. The flask is charged with $MeViSiCl_2$ (0.82 mL; 6.25 mmol) and diethyl ether (25 mL) to give a solution, which is stirred and cooled to 0° C. using an ice bath. The addition funnel is charged with VCMX-Silanol (3.35 g; 12.2 mmol) and pyridine (1.1 mL; 13.75 mmol), which are then added dropwise to the stirred solution in the flask over the course of ~10 min to give a reaction mixture. A white precipitate forms upon addition. The precipitate (salt) is then removed via filtration, and the filtrate washed with HCl (1 M), sat. $NaHCO_3$, and brine, dried with $MgSO_4$, filtered, and concentrated to give the product (recovered: 3 g; yield: 81%; purity: ~85% via GCMS).

Example 8: Preparation of Difunctional-AGE Si—H Converter

A 50 mL 3-neck flask is equipped with a magnetic stir bar, a nitrogen feed, a thermocouple, and a septum. The flask is charged with $MeHSiCl_2$ (0.27 mL; ~2.6 mmol; 1 eq.) and toluene (10 mL) to give a mixture, which is stirred and cooled to 0° C. using an ice bath. AGE-Silanol (1.32 g, 5 mmol; ~1.9 eq.) and pyridine (0.89 mL, 11 mmol) are combined in a syringe, and then added slowly to the stirring mixture in the flask to give a reaction mixture, which is stirred under nitrogen for 40 min. Precipitates (salt) formed during the reaction are then removed via filtration, and the filtrate washed with HCl (1 M), sat. $NaHCO_3$, and brine, dried with $MgSO_4$, filtered, and concentrated to give a reaction product comprising the product, which is then dried under high vacuum with stirring overnight to give the product (recovered: 1.15 g; yield: 85%; purity: ~80%).

Example 9: Preparation of Difunctional-ETM Si—H Converter

A 500 mL 3-neck flask is equipped with a magnetic stir bar, a nitrogen outlet and a thermocouple, an addition funnel, and a nitrogen inlet. The flask is charged with $MeHSiCl_2$ (5.4 mL; 51.25 mmol) and toluene (200 mL) to give a solution, which is stirred and cooled to 0° C. using an ice bath. The addition funnel is charged with ETM-Silanol (29.85 g; 100 mmol), pyridine (9 mL; 112.5 mmol), and toluene (~10 mL), which are then added dropwise to the stirred solution in the flask over the course of ~40 min (~1 mL/min) to give a reaction mixture. A white precipitate forms upon addition. The reaction mixture is then filtered to remove precipitate (salt), and the filtrate washed with HCl (1 M; 50 mL), sat. $NaHCO_3$ (50 mL), and brine (50 mL), dried with $MgSO_4$, filtered, and concentrated (rotary evaporator) to give the reaction product (recovered: 27.7 g; yield: 93%).

Example 10: Preparation of Difunctional-ETM Si-Vinyl Converter

A 100 mL 3-neck flask is equipped with a magnetic stir bar, a nitrogen outlet and a thermocouple, an addition funnel, and a nitrogen inlet. The flask is charged with $MeViSiCl_2$ (0.82 mL; 6.25 mmol) and toluene (25 mL) to give a solution, which is stirred and cooled to 0° C. using an ice bath. The addition funnel is charged with ETM-Silanol (3.72 g; 12.5 mmol) and pyridine (1.1 mL; 13.75 mmol), which are then added dropwise to the stirred solution in the flask over the course of ~15 min to give a reaction mixture. The reaction mixture is then filtered to remove precipitate (salt), and the filtrate washed with HCl (1 M), sat. $NaHCO_3$, and brine, dried with $MgSO_4$, filtered, and concentrated (rotary evaporator) to give the reaction product (recovered: 2.6 g; yield: 63%).

Example 11: Preparation of Difunctional-AGE Si-Vinyl Converter

A 1000 mL 3-neck flask is equipped with a nitrogen outlet and a thermocouple, an addition funnel and nitrogen inlet, and a mechanical stirrer with a Teflon stir bar. The flask is charged with $MeViSiCl_2$ (9.7 mL; 74.2 mmol) and toluene (285 mL) to give a solution, which is stirred and cooled to 0° C. using an ice bath. The addition funnel is charged with AGE-Silanol (37.85 g; 143 mmol) and pyridine (12 mL; 148 mmol), and the resulting mixture added dropwise to the stirred solution in the flask over the course of ~30 min (~2 mL/min) to give a reaction mixture. Upon addition, a white precipitate forms immediately and a mild exotherm (~3° C.) is observed. The reaction mixture is stirred for 1 hour, phase separated with HCl (1 M), and the organics removed and washed with NaOH (1 M), then brine, dried with $MgSO_4$ (~10 g), filtered, and concentrated (rotary evaporator) to give a reaction product comprising the product, which is then dried under high vacuum to give the product (recovered: 36.13 g; yield: 84.8%).

Example 12: Preparation of Difunctional-VCMX Si—H Converter

A 1000 mL 3-neck flask is equipped with a nitrogen outlet and a thermocouple, an addition funnel and nitrogen inlet, and a mechanical stirrer with a Teflon stir bar. The flask is charged with $MeHSiCl_2$ (10.6 mL; 101 mmol) and toluene (400 mL) to give a solution, which is stirred and cooled to 0° C. using an ice bath. The addition funnel is charged with VCMX-Silanol (52.8 g; 192.3 mmol) and pyridine (17.5 mL; 211.5 mmol), and the resulting mixture added dropwise to the stirred solution in the flask over the course of ~60 min (~2 mL/min) to give a reaction mixture. Upon addition, a white precipitate forms immediately and a mild exotherm (~3° C.) is observed. The reaction mixture is filtered to remove precipitate (salt), the filter cake washed with toluene, and the combined organics washed with HCl (1 M; 150 mL), sat. $NaHCO_3$ (150 mL), and brine (150 mL), dried with $MgSO_4$ (~2 g), filtered, and concentrated (rotary evaporator) to give a liquid, which is then dried under high vacuum to give the product (recovered: 39.24 g; yield: 69%; purity: 93% via NMR).

Example 13: Preparation of Mixed AMA:AGE Si—H Converter

A 100 mL 3-neck flask is equipped with a magnetic stir bar, a nitrogen feed, a thermocouple, and a septum. The flask is charged with toluene (20 mL), which is cooled to 0° C. using an ice bath. The flask is then charged with $MeHSiCl_2$ (0.48 mL; 4.6 mmol) to give a mixture, which is stirred at 0° C. AGE-Silanol (0.78 g, 2.94 mmol), AMA-Silanol (1.63 g; 5.88 mmol), and pyridine (0.78 mL, 9.7 mmol) are combined in a syringe, and then added slowly to the stirring mixture in the flask over the course of 10 minutes to give a reaction mixture. Upon addition, a white precipitate forms immediately. The reaction mixture is stirred under nitrogen for 1 hour, filtered to remove precipitate (salt), washed with HCl (1 M), sat. $NaHCO_3$, and brine, dried with $MgSO_4$, filtered, and concentrated (rotary evaporator) to give the product (recovered: 2.3 g; yield: 85%; purity: 88% via NMR; ~2:1 AMA to AGE via $^1H$ integration (i.e., on avg.: a'=1.33; b'=~0.67)).

FUNCTIONALIZED SILOXANE COMPOUND EXAMPLES

Example 14: Hydrosilylation of $M^{Vi}D_{493}M^{Vi}$ and Difunctional-AMA Si—H Converter A 1000 mL 3-neck flask is charged with $M^{Vi}D_{493}M^{Vi}$ (338.54 g) and Difunctional-AMA Si—H Converter (11.76 g) to form a mixture, which is then mixed and heated to 80° C. for ~45 minutes. Once the temperature is stable at 80° C., Hydrosilylation Catalyst 1 (180 µL) is added to give a reaction mixture, with no exotherm observed upon catalyst addition. The reaction mixture is stirred at 80° C. until full Si—H conversion is shown via FT-IR (~1 hour), and then cooled to room temperature to give the product.

Example 15: Hydrosilylation of $M^{Vi}D_{178.5}M^{Vi}$ and Difunctional-AMA Si—H Converter A 1000 mL 3-neck flask is charged with $M^{Vi}D_{178.5}M^{Vi}$ (300.35 g) and Difunctional-AMA Si—H Converter (28.12 g) to form a mixture, which is then mixed and heated to 75° C. for ~45 minutes. Once the temperature is stable at 75° C., Hydrosilylation Catalyst 1 (89 µL) is added to give a reaction mixture, with no exotherm observed upon catalyst addition. The reaction mixture is stirred at 75° C., and then heated to and held at 80° C. for 2 hours. An additional portion of Hydrosilylation Catalyst 1 (45 µL) is added to the reaction mixture, which is then stirred at 80° C. until full Si—H conversion is shown via FT-IR (~45 min). The reaction mixture is then cooled to room temperature to give the product.

Example 16: Hydrosilylation of 1,1,1,3,5,5,5-Heptamethyl Trisiloxane and Trifunctional-AMA Si-Hexenyl Converter A 0.5 oz sample vial equipped with a magnetic stir bar is charged with Si—H Compound (0.67 g), Trifunctional-AMA Si-Hexenyl Converter (3.47 g), and Hydrosilylation Catalyst 1 (6.0 µL) at room temperature to give a reaction mixture, which is then heated to and held at 70° C. for 1 hour with mixing. An additional portion of Hydrosilylation Catalyst 1 (1 µL) is added to the reaction mixture, which is then stirred at 70° C. for 3 hours, at which time full Si—H conversion is shown via FT-IR. The reaction mixture is then cooled to room temperature to give the product.

Example 17: Hydrosilylation of $MD_{92.3}D'_{6.2}M$ and Trifunctional-AMA Si-Hexenyl Converter A 0.5 oz sample vial equipped with a magnetic stir bar is charged with $MD_{92.3}D'_{6.2}M$ (5.32 g), Trifunctional-AMA Si-Hexenyl Converter (5.30 g), and BHT (0.01 g) to give a mixture. The mixture is heated to 60° C. with mixing, with an addition of Hydrosilylation Catalyst 1 (0.11 g) when the mixture reaches 55° C., to give a reaction mixture. The reaction mixture crosslinks to form a gel within ~15-30 minutes of catalyst addition, at which time the solution is removed from heat and cooled to room temperature to give the product.

Example 18: Hydrosilylation of $M'D_{100.35}M'$ and Trifunctional-AMA Si-Hexenyl Converter A 0.5 oz sample vial equipped with a magnetic stir bar is charged with $M'D_{100.35}M'$ (7.73 g) and Trifunctional-AMA Si-Hexenyl Converter (2.48 g) to give a mixture. The mixture is heated to 60° C. with mixing, with an addition of Hydrosilylation Catalyst 1 (0.05 g) when the mixture reaches 57° C., to give a reaction mixture. Upon catalyst addition, an exotherm of ~6° C. is observed, along with bubbling. The reaction mixture is held at 60° C. for ~1 hour, at which time full Si—H conversion is shown via FT-IR. The reaction mixture is then cooled to room temperature to give the product.

Example 19: Hydrosilylation of $MD_{92.3}D'_{6.2}M$ and Difunctional-AMA Si-Vinyl Converter A 0.5 oz sample vial equipped with a magnetic stir bar is charged with $MD_{92.3}D'_{6.2}M$ (6.14 g) and Difunctional-AMA Si-Vinyl Converter (3.92 g) to give a mixture. The mixture is heated to 60° C. with mixing, and then charged with Hydrosilylation Catalyst 1 (0.19 g) with no exotherm observed upon addition. The reaction mixture is held at 60° C. for ~1 hour, during which time small gels form in the reaction mixture. The reaction mixture is then cooled to room temperature to give the product.

Example 20: Hydrosilylation of 'M'D$_{100.35}$M' and Difunctional-AMA Si-Vinyl Converter A 0.5 oz sample vial equipped with a magnetic stir bar is charged with M'D$_{100.35}$M' (8.41 g) and Difunctional-AMA Si-Vinyl Converter (1.79 g) to give a mixture. The mixture is heated to 60° C. with mixing, and then charged with Hydrosilylation Catalyst 1 (0.15 g). The reaction mixture is held at 60° C. for ~1.5 hour, at which time full Si—H conversion is shown via FT-IR. The reaction mixture is then cooled to room temperature to give the product.

Example 21: Hydrosilylation of a Vinyl-Functional MQ Silicone Resin and Difunctional-AMA Si—H Converter A 0.5 oz sample vial equipped with a magnetic stir bar is charged with Silicone Resin 1 (10.10 g; diluted by 78.19 wt. % in xylene) and Difunctional-AMA Si—H Converter (1.11 g) to give a mixture. The mixture is heated to 75° C. with mixing, and then charged with Hydrosilylation Catalyst 1 (3 µL). The reaction mixture is held at 75° C. for 2 hours, at which time full Si—H conversion is shown via FT-IR. The reaction mixture is then cooled to room temperature to give the product.

Example 22: Hydrosilylation of a Telechelic Vinyl Siloxane (~810 dp) with Difunctional-AMA Si—H Converter A 250 mL 3-neck flask is equipped with a stirring mechanism, a water-cooled condenser, a heating mantle, and a thermocouple. The flask is then charged with Telechelic Vinyl Siloxane (~810 dp) (98.10 g), Difunctional-AMA Si—H Converter (1.90 g; Si—H:vinyl stoichiometric ratio of 0.98), and BHT (0.03 g) to form a mixture, which is then blended and heated to 70° C. under nitrogen. Upon reaching 70° C., a dilute solution of Karstedt's catalyst (0.08 g, ~4 ppm platinum by weight) is added, and the resulting reaction mixture held at 70° C. with mixing for 1 hour. The reaction mixture is then cooled to room temperature and poured down into a 125 mL Nalgene bottle to give the product (Difunctional-Methacrylate Converted Polymer 1). A sample of the product is analyzed via $^1$H NMR to show full Si—H conversion (no residual Si—H and trace vinyl functionality remaining) indicating a complete reaction. The viscosity of the product is analyzed using a Brookfield DV-II rotational viscometer under ambient conditions, providing a viscosity of 98,500 cP.

Example 23: Hydrosilylation of a Telechelic Vinyl Siloxane (~125 dp) with Difunctional-AMA Si—H Converter A 250 mL 3-neck flask is equipped with a stirring mechanism, a water-cooled condenser, a heating mantle, and a thermocouple. The flask is then charged with Telechelic Vinyl Siloxane (~125 dp) (89.10 g), Difunctional-AMA Si—H Converter (10.90 g; Si—H:vinyl stoichiometric ratio of 0.95), and BHT (0.03 g) to form a mixture, which is then blended and heated to 60° C. under nitrogen. Upon reaching 60° C., a dilute solution of Karstedt's catalyst (0.04 g, ~4 ppm platinum by weight) is added, and the resulting reaction mixture heated to and held at 70° C. with mixing for 1 hour. The reaction mixture is then cooled to room temperature and poured down into a 125 mL Nalgene bottle to give the product. A sample of the product is analyzed via $^1$H NMR to show full Si—H conversion (no residual Si—H and trace vinyl functionality remaining) indicating a complete reaction.

Example 24: Hydrosilylation of a Telechelic Vinyl Siloxane (~810 dp) with Trifunctional-AMA Si—H Converter A 250 mL 3-neck flask is equipped with a stirring mechanism, a water-cooled condenser, a heating mantle, and a thermocouple. The flask is then charged with Telechelic Vinyl Siloxane (~810 dp) (27.08 g), Trifunctional-AMA Si—H Converter (0.73 g; Si—H:vinyl stoichiometric ratio of 0.95), BHT (0.008 g), and toluene (28.0 g; reagent grade) to form a mixture, which is then blended and heated to 100° C. under nitrogen. Upon reaching 100° C., a dilute solution of Karstedt's catalyst (0.085 g, ~15 ppm platinum by weight) is added, and the resulting reaction mixture held at 100° C. with mixing for 20 hours, at which time a sample of the product is analyzed via $^1$H NMR to show full Si—H conversion (no residual Si—H and trace vinyl functionality remaining) indicating a complete reaction. The reaction mixture is then stripped using a rotary-evaporator (bath temperature: 120° C.; vacuum: 15 mmHg), cooled to room temperature, and poured down into a 125 mL Nalgene bottle to give the product. The viscosity of the product is analyzed using a Brookfield DV-II rotational viscometer under ambient conditions, providing a viscosity of 103,200 cP.

Example 25: Hydrosilylation of a Telechelic Vinyl Siloxane (~810 dp) with Mixed AMA:ETM Si—H Converter A 250 mL 3-neck flask is equipped with a stirring mechanism, a water-cooled condenser, a heating mantle, and a thermocouple. The flask is then charged with Telechelic Vinyl Siloxane (~125 dp) (98.05 g), Mixed AMA:ETM Si—H Converter (1.95 g; SiH:vinyl stoichiometric ratio of 0.98), and BHT (0.03 g) to form a mixture, which is then blended and heated to 70° C. under nitrogen. Upon reaching 70° C., a dilute solution of Karstedt's catalyst (0.04 g, ~4 ppm platinum by weight) is added, and the resulting reaction mixture held at 70° C. with mixing for 1 hour. The reaction mixture is then cooled to room temperature and poured down into a 125 mL Nalgene bottle to give the product. A sample of the product is analyzed via $^1$H NMR to show full Si—H conversion (no residual Si—H and trace vinyl functionality remaining) indicating a complete reaction. The viscosity of the product is analyzed using a Brookfield DV-II rotational viscometer under ambient conditions, providing a viscosity of 123,700 cP.

ADHESIVE EXAMPLES

Example 26: Adhesive Formulation Prepared with a Difunctional-AMA Converted Polymer A 200 mL dental cup is charged with Difunctional-Methacrylate Converted Polymer 1 (89.133 g; as prepared in Example 22), iron oxide pigment (0.301 g), fumed silica (7.59 g), and 10-micron ground quartz (46.40 g), and the components incorporated by a cycle of hand mixing with a spatula and then using a dual-axis centrifugal mixer (1800 rpm; 30 seconds). The component incorporation cycle is repeated until the filler is dispersed, and the resulting mixture transferred to an aluminum pan. The pan is then placed into a vacuum oven heated to 70° C. and evacuated to ~27 inHg for 1 hour. The pan is then removed from the oven, cooled to room temperature, and the mixture transferred into a 200 mL dental cup. To the cool mixture, an alkoxy silane adhesion promoter slurry (3.022 g) is added, and the components incorporated by four cycles of hand mixing with a spatula followed by using the dual-axis centrifugal mixer (1200 rpm; 30 seconds). Methylbenzoyl peroxide (3.45 g, 50 wt. % active paste) and titanium(IV) bis(ethyl acetoacetato) diisopropoxide (i.e., "titanium(IV) diisopropoxydiethylacetoacetate" or "TDIDE") (0.149 g) are then added, and the components incorporated by two cycles of hand mixing with a spatula followed by using the dual-axis centrifugal mixer (1200 rpm; 30 seconds). The resulting material is then vacuum de-aired for 5 minutes under vacuum (~27 inHg).

The resulting adhesive is testing using a Moving Die Rheometer for characterization purposes using a 30-minute test and 100° C. pre-heated plates. The adhesive achieves 90% of the Final Torque (14.5 in-lb) in 8.3 minutes with a max rate of 3.92 in-lb/min, which is faster curing than the mono-methacrylate based polymer based adhesive analogue prepared and analyzed in Example 27 below.

Example 27: Comparative Adhesive Prepared with Monofunctional-AMA Converted Polymer The procedure of Example 26 above is repeated using a monofunctional-methacrylate polymer to prepare a comparative adhesive composition. In particular, the procedure of Example 22 is repeated using the Monofunctional-AMA Si-Me Compound of Example 1 to give a Monofunctional-Methacrylate Converted Polymer. A 200 mL dental cup is then charged with the Monofunctional-Methacrylate Converted Polymer (89.081 g), iron oxide pigment (0.311 g), fumed silica (7.589 g), and 10-micron ground quartz (46.401 g) to give a mixture. The components of the mixture are then incorporated via cycles of hand mixing with a spatula followed by use of the dual-axis centrifugal mixer (1800 rpm; 30 seconds), with the component incorporation cycle repeated until the filler is dispersed. The resulting incorporated mixture is transferred to an aluminum pan, which is then placed into a vacuum oven heated to 70° C. and evacuated to ~27 inHg for 1 hour. The pan is then removed from the oven, cooled to room temperature, and the mixture transferred into a 200 mL dental cup. To the cool mixture, an alkoxy silane adhesion promoter slurry (3.017 g) is added, and the components incorporated by four cycles of hand mixing with a spatula followed by using the dual-axis centrifugal mixer (1200 rpm; 30 seconds). Methylbenzoyl peroxide (3.45 g, 50 wt. % active paste) and TDIDE (0.150 g) are then added, and the components incorporated by two cycles of hand mixing with a spatula followed by using the dual-axis centrifugal mixer (1200 rpm; 30 seconds). The resulting material is then vacuum de-aired for 5 minutes under vacuum (~27 inHg).

The resulting adhesive is testing using a Moving Die Rheometer for characterization purposes using a 30-minute test and 100° C. pre-heated plates. The adhesive achieved 90% of the Final Torque (12.9 in-lb) in 15.4 minutes with a max rate of 1.73 in-lb/min, which is slower to cure than the difunctional-methacrylate based polymer based adhesive analogue of Example 26 above.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

The invention claimed is:

1. A multifunctional organosilicon compound having the following general formula:

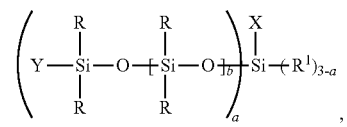

where X is selected from H, alkenyl groups, and alkynyl groups; each Y independently comprises a functional moiety selected from alkoxysilyl moieties, acryloxy moieties, and epoxide moieties, wherein at least one Y is selected from alkoxysilyl and acryloxy moieties; each R is an independently selected hydrocarbyl group; each $R^1$ is an independently selected hydrocarbyl group; subscript a is 2 or 3; and each subscript b is independently 0, 1, or 2.

2. The multifunctional organosilicon compound of claim 1, wherein X is selected from H and alkenyl moieties having the formula $—(CH_2)_n CHCH_2$, where subscript n is from 0 to 4.

3. The multifunctional organosilicon compound of claim 1, wherein at least one Y is of formula $-D-R^2$, where each D is an independently selected divalent linking group and each $R^2$ independently comprises an alkoxysilyl group or an acryloxy group.

4. The multifunctional organosilicon compound of claim 3, wherein in at least one moiety Y: (i) divalent linking group D comprises a hydrocarbon group of formula $—(CH_2)_m—$, where subscript m is from 1 to 6; (ii) divalent linking group D comprises an ether moiety; or (iii) both (i) and (ii).

5. The multifunctional organosilicon compound of claim 3, wherein:

(i) $R^2$ of at least one moiety Y is an alkoxysilyl group having the formula:

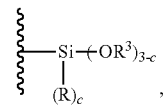

where each $R^3$ is an independently selected hydrocarbyl group, subscript c is 0, 1, or 2, and each R is as defined above;

(ii) $R^2$ of at least one moiety Y is an acryloxy group having the formula:

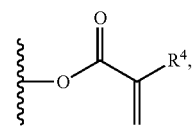

where $R^4$ is an independently selected hydrocarbyl group or H;

(iii) $R^2$ of at least one moiety Y is an epoxide group having one of formulas (I) and (II):

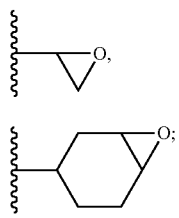

or (iv) any combination of (i) to (iii).

6. The multifunctional organosilicon compound of claim 1, wherein: (i) each R is methyl; (ii) subscript a is 2 and $R^1$ is methyl; (iii) subscript b is independently 0 or 1 in each moiety designated by subscript a; or (iv) any combination of (i) to (iii).

7. A method of preparing a multifunctional organosilicon compound, said method comprising:
reacting (A) an organosilanol compound and (B) a silane compound having at least two hydrolysable groups, thereby preparing the multifunctional organosilicon compound;
wherein the multifunctional organosilicon compound is the multifunctional organosilicon compound of claim 1.

8. The method of claim 7, wherein the organosilanol compound (A) has the following formula:

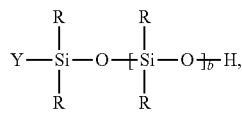

where Y comprises a functional moiety selected from alkoxysilyl moieties, acryloxy moieties, and epoxide moieties, with the proviso that Y is an alkoxysilyl moiety or an acrloxy moiety in at least one molecule of the organosilanol compound (A); each R is an independently selected hydrocarbyl group; and subscript b is 0, 1, or 2.

9. The method of claim 7, wherein the silane compound (B) has the following formula:

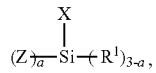

where each Z is an independently selected hydrolysable group; X is selected from H and ethylenically unsaturated moieties; each $R^1$ is an independently selected hydrocarbyl group; and subscript a is 2 or 3.

10. The method of claim 9, wherein: (i) each hydrolysable group Z is independently selected from halogens, acetoxy groups, alkoxy groups, oxime groups, and aminoxy groups; (ii) X is selected from H and alkenyl moieties having the formula —$(CH_2)_n CHCH_2$, where subscript n is from 0 to 4; (iii) subscript a is 2 and $R^1$ is methyl; or (iv) any combination of (i) to (iii).

11. The method of claim 7, further comprising reacting the organosilanol compound (A) and the silane compound (B): (i) in the presence of (C) a reaction catalyst; (ii) at a temperature of less than 25° C.; or (iii) both (i) and (ii).

12. The method of claim 11, wherein the organosilanol compound (A) and the silane compound (B) are reacted in the presence of the reaction catalyst (C), and wherein the reaction catalyst (C) comprises: (i) a base catalyst; (ii) an acid catalyst; (iii) a transition metal catalyst; or (iv) any combination of (i) to (iii).

13. A multifunctional organosilicon compound prepared according to the method of claim 7.

14. A functionalized siloxane compound having the following general formula:

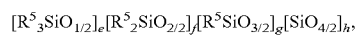

where subscripts e, f, g, and h are each mole fractions such that e+f+g+h=1, with the proviso that e+f+g>0; each $R^5$ is independently selected from substituted and unsubstituted hydrocarbyl groups and A, with the proviso that at least one $R^5$ is A; wherein each A is independently of the following formula:

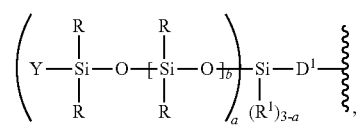

where each Y is independently selected from alkoxysilane moieties, acryloxy moieties, and epoxide moieties, wherein at least one Y is selected from alkoxysilyl and acryloxy moieties; each R is an independently selected hydrocarbyl group; each $R^1$ is an independently selected hydrocarbyl group; $D^1$ is a divalent hydrocarbon group; subscript a is 2 or 3; and each subscript b is independently 0, 1, or 2.

15. The functionalized siloxane compound of claim 14, wherein in at least one moiety A: (i) each R is methyl; (ii) each $R^1$ is methyl; (iii) subscript b is independently 0 or 1 in each moiety designated by subscript a; (iv) $D^1$ comprises an ethylene group; or (v) any combination of (i) to (iv).

16. A method of preparing a functionalized siloxane compound, said method comprising:
reacting a multifunctional organosilicon compound and a polysiloxane in the presence of a hydrosilylation catalyst, thereby preparing the preparing the functionalized siloxane compound;
wherein the multifunctional organosilicon compound is the multifunctional organosilicon compound of claim 1;
with the proviso that when X of the multifunctional organosilicon compound is H, the polysiloxane includes at least one silicon-bonded ethylenically unsaturated group, and when X of the multifunctional organosilicon compound is an ethylenically unsaturated moiety, the polysiloxane includes at least one silicon-bonded hydrogen atom.

17. An adhesive comprising the functionalized siloxane compound of claim 14.

18. The multifunctional organosilicon compound of claim 1, wherein subscript a is 3.

19. The multifunctional organosilicon compound of claim 1, wherein each Y is an alkoxysilyl moiety or an acrloxy moiety.

20. The functionalized siloxane compound of claim 14, wherein each Y is an alkoxysilyl moiety or an acrloxy moiety.

\* \* \* \* \*